(12) United States Patent
Völkl et al.

(10) Patent No.: US 10,843,364 B2
(45) Date of Patent: Nov. 24, 2020

(54) CUTTING MACHINE AS WELL AS METHOD FOR CUTTING ELASTIC STRINGS, IN PARTICULAR MEAT STRINGS

(71) Applicant: TVI Entwicklung & Produktion GmbH, Irschenberg (DE)

(72) Inventors: Thomas Völkl, Bruckmuhl (DE); Martin Mayr, Eiselfing (DE)

(73) Assignee: TVI Entwicklung & Produktion GmbH, Irschenberg (DE)

( * ) Notice: Subject to any disclaimer, the term of this patent is extended or adjusted under 35 U.S.C. 154(b) by 0 days.

(21) Appl. No.: 16/096,897

(22) PCT Filed: Apr. 27, 2017

(86) PCT No.: PCT/EP2017/060014
§ 371 (c)(1),
(2) Date: Mar. 28, 2019

(87) PCT Pub. No.: WO2017/186828
PCT Pub. Date: Nov. 2, 2017

(65) Prior Publication Data
US 2019/0223459 A1   Jul. 25, 2019

(30) Foreign Application Priority Data
Apr. 28, 2016 (DE) .................. 10 2016 107 849

(51) Int. Cl.
*B26D 7/30* (2006.01)
*A22C 25/08* (2006.01)
(Continued)

(52) U.S. Cl.
CPC .............. *B26D 7/30* (2013.01); *A22C 17/002* (2013.01); *A22C 17/0033* (2013.01);
(Continued)

(58) Field of Classification Search
CPC ... B26D 5/02; B26D 5/04; B26D 5/06; B26D 5/08; B26D 5/083; B26D 7/27;
(Continued)

(56) References Cited

U.S. PATENT DOCUMENTS 2,241,807 A * 5/1941 Cotner .................. B30B 15/26
91/524
2,565,245 A * 8/1951 Lebovitz .................. A22C 7/00
100/38

(Continued)

FOREIGN PATENT DOCUMENTS

CN          204935713 U    1/2016
DE           3540904 A1    5/1987
(Continued)

*Primary Examiner* — Andrea L Wellington
*Assistant Examiner* — Richard D Crosby, Jr.
(74) *Attorney, Agent, or Firm* — Husch Blackwell LLP

(57) ABSTRACT

A cutting machine for cutting up pre-compressed meat strands into slices and a method for slicing pre-compressed meat strands, wherein the blade is moved forward in the feed direction to a limited extent after the blade has completely cut off a slice, and is either subsequently or simultaneously moved backward in the transversal direction. In this way, the forward movement of the meat strand to cut off the next slice can be started earlier.

7 Claims, 38 Drawing Sheets

(51) Int. Cl.
*A22C 25/18* (2006.01)
*B26D 3/16* (2006.01)
*B26D 5/02* (2006.01)
*B26D 5/08* (2006.01)
*B26D 7/06* (2006.01)
*A22C 25/10* (2006.01)
*A22C 17/00* (2006.01)
*B26D 5/30* (2006.01)
*B26D 7/01* (2006.01)
*A22C 17/02* (2006.01)
*B26D 5/06* (2006.01)

(52) U.S. Cl.
CPC ............. *A22C 17/02* (2013.01); *A22C 25/08* (2013.01); *A22C 25/10* (2013.01); *A22C 25/18* (2013.01); *B26D 3/16* (2013.01); *B26D 5/02* (2013.01); *B26D 5/06* (2013.01); *B26D 5/08* (2013.01); *B26D 5/086* (2013.01); *B26D 5/30* (2013.01); *B26D 7/01* (2013.01); *B26D 7/0625* (2013.01); *B26D 7/0641* (2013.01); *B26D 7/0683* (2013.01); *B26D 2007/013* (2013.01); *B26D 2210/02* (2013.01); *B26D 2210/04* (2013.01)

(58) Field of Classification Search
CPC .. B26D 7/28; B26D 7/30; A22C 17/00; A22C 17/0006; A22C 17/002; A22C 17/0033
USPC .......................................................... 100/910
See application file for complete search history.

(56) References Cited

U.S. PATENT DOCUMENTS

| | | | | |
|---|---|---|---|---|
| 3,703,064 A * | 11/1972 | Lugiewicz | ............. | B65B 39/00 53/122 |
| 3,975,795 A * | 8/1976 | Kupcikevicius | ........ | A22C 11/02 452/38 |
| 4,193,167 A * | 3/1980 | Orlowski | ............. | A22C 7/0076 100/264 |
| 5,097,876 A * | 3/1992 | Lagares | ................. | A22C 11/02 141/249 |
| 5,112,634 A * | 5/1992 | Swearingen | ............. | A22C 7/00 100/910 |
| 6,482,079 B1 * | 11/2002 | Nakamura | ........... | A22C 11/006 452/46 |
| 8,282,449 B2 | 10/2012 | Maile | | |
| 10,245,745 B2 * | 4/2019 | Volkl | ..................... | A22C 17/02 |
| 2002/0104414 A1 * | 8/2002 | Schill | ....................... | B26D 7/27 83/19 |
| 2015/0321372 A1 * | 11/2015 | Fox | ...................... | B26D 7/0625 53/514 |
| 2017/0312931 A1 | 11/2017 | Volkl et al. | | |

FOREIGN PATENT DOCUMENTS

| | | |
|---|---|---|
| DE | 10353114 A1 | 5/2005 |
| DE | 102004041915 A1 | 3/2006 |
| DE | 102007019106 A1 | 11/2007 |
| DE | 102008020246 A1 | 11/2009 |
| DE | 102010035657 A1 | 9/2011 |
| DE | 102011111602 A1 | 1/2013 |
| EP | 2366508 | 9/2011 |
| EP | 2489485 A1 | 8/2012 |
| EP | 2537651 A1 | 12/2012 |
| JP | 2000288983 A | 10/2000 |
| WO | 2006024467 A2 | 3/2006 |
| WO | 2017186826 A1 | 11/2017 |
| WO | 2017186827 A1 | 11/2017 |
| WO | 2017186828 A1 | 11/2017 |

\* cited by examiner

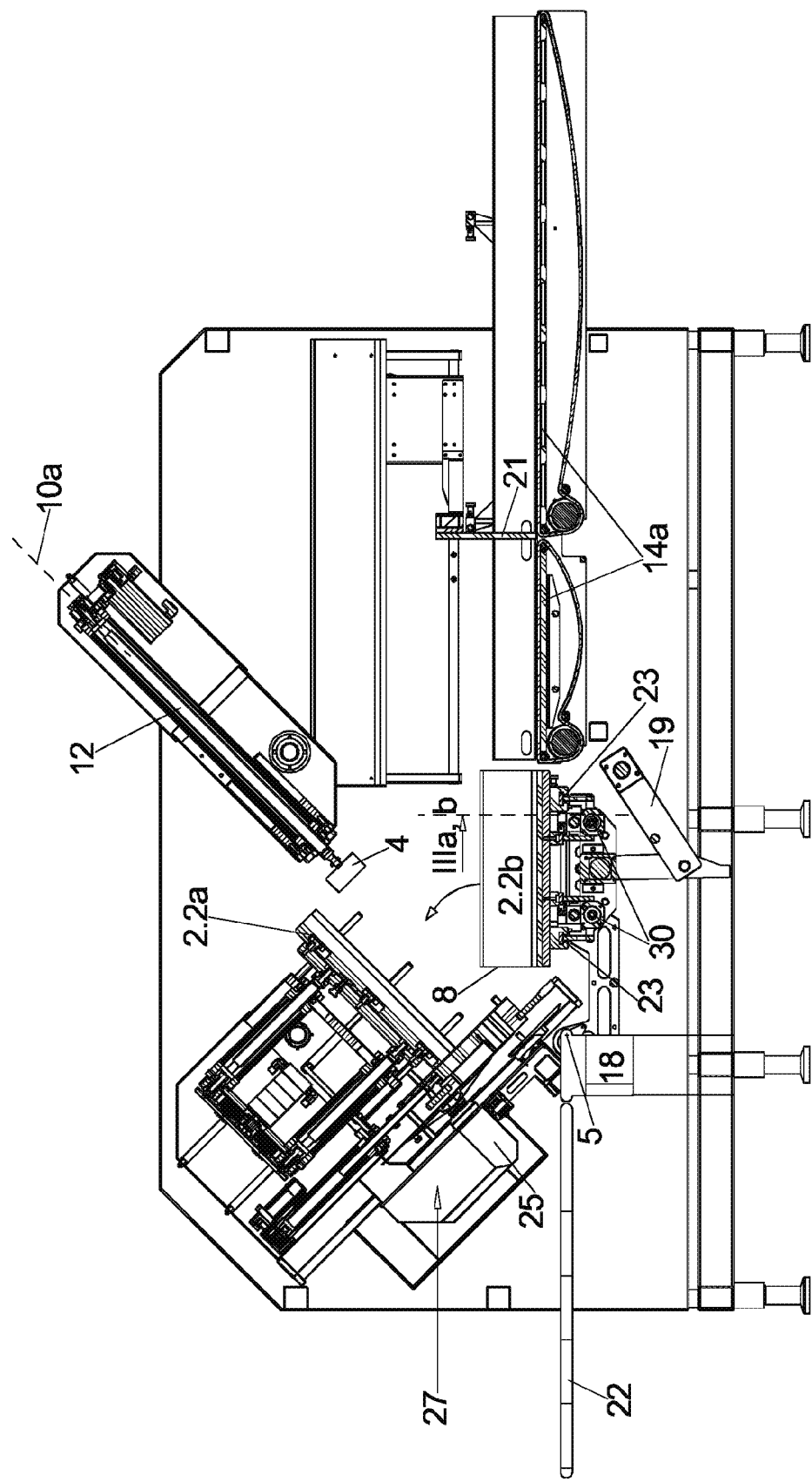

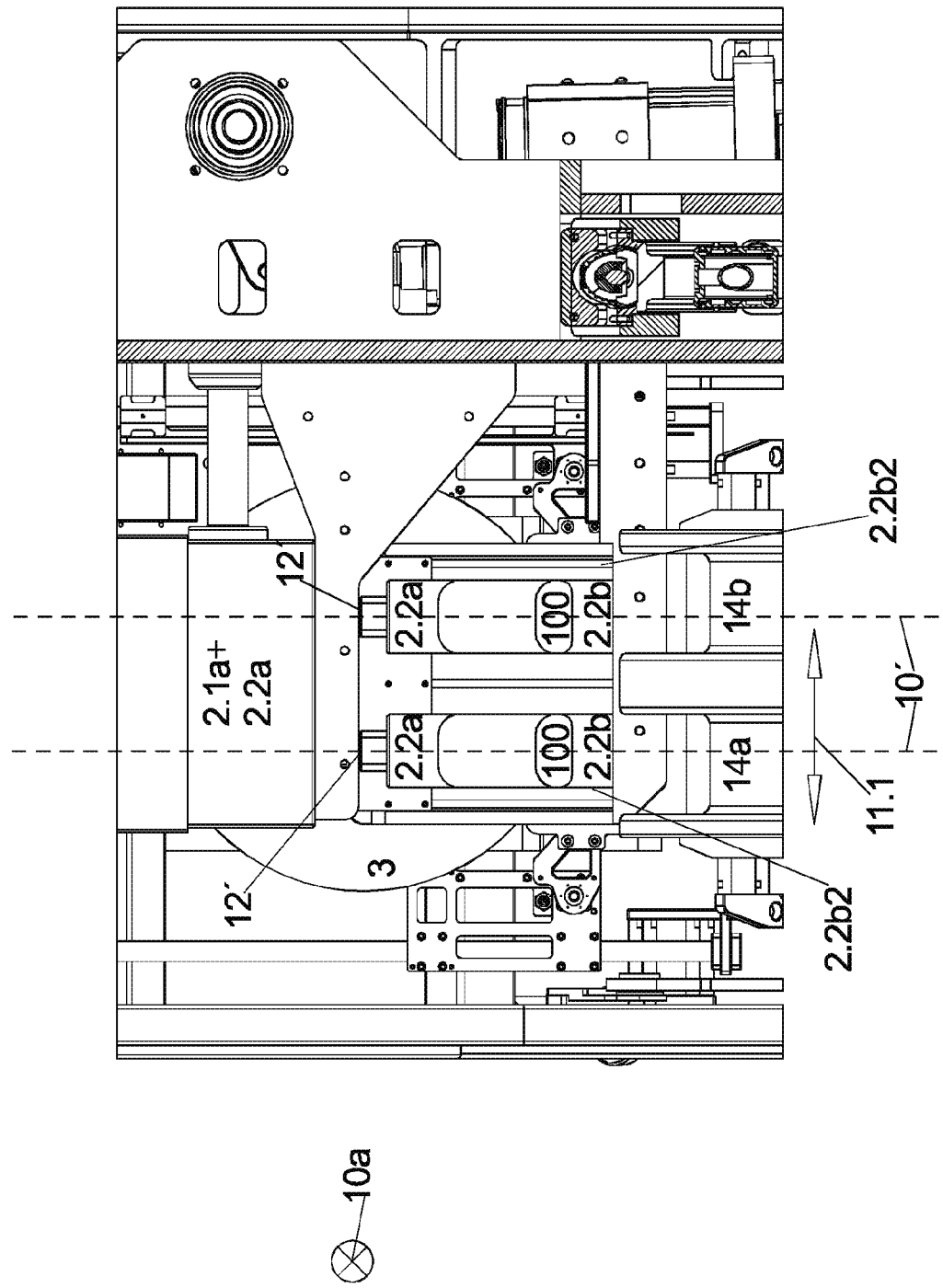

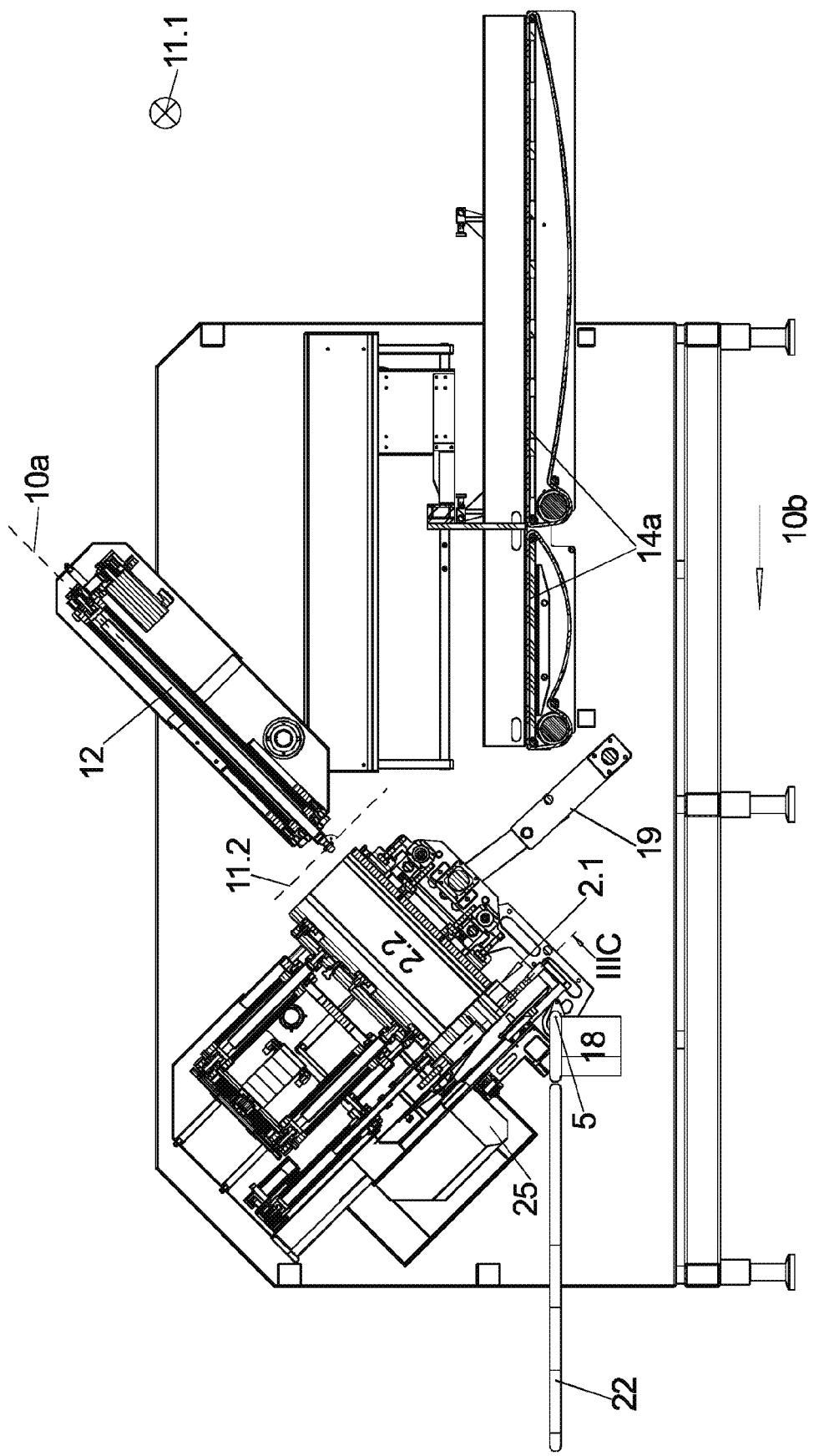

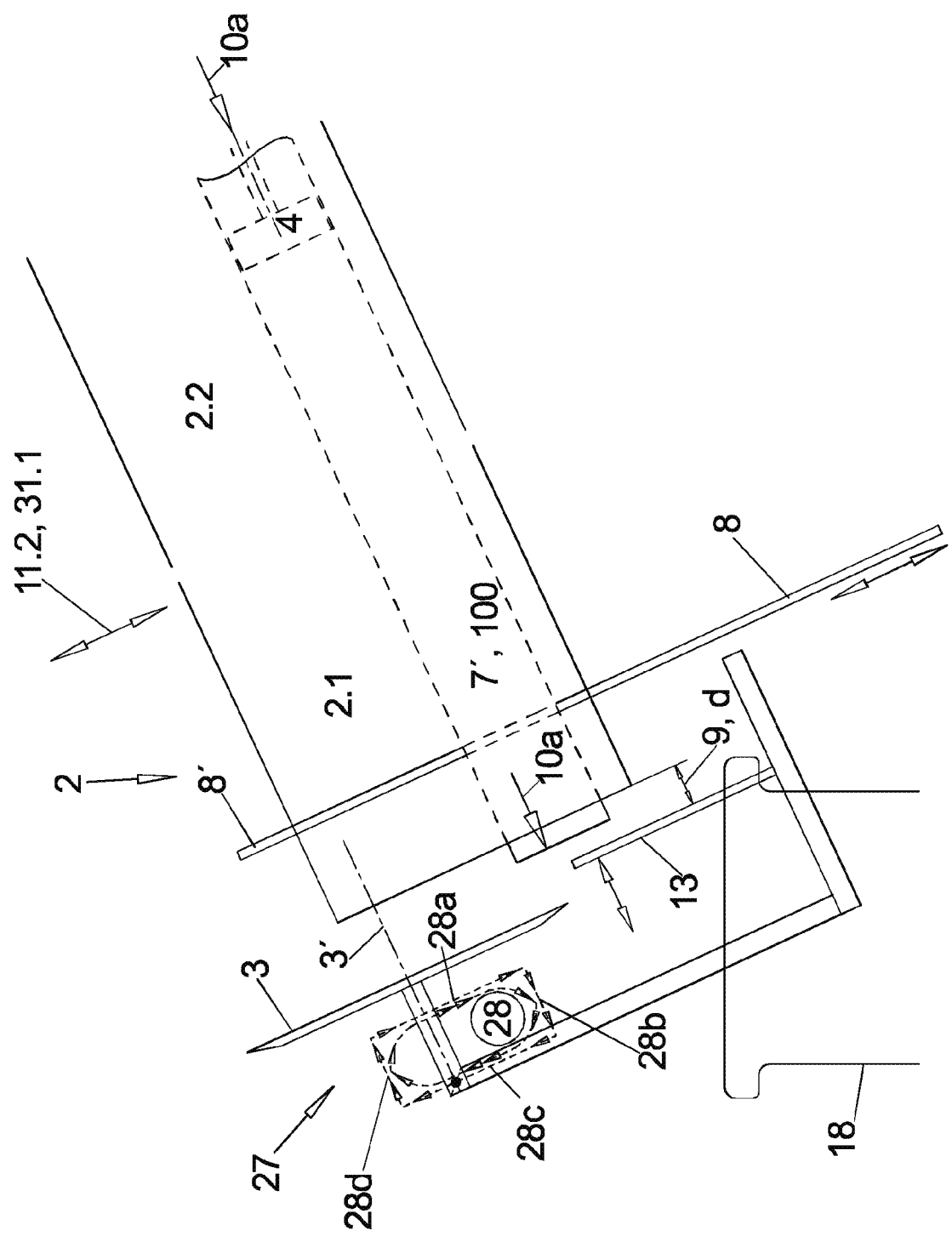

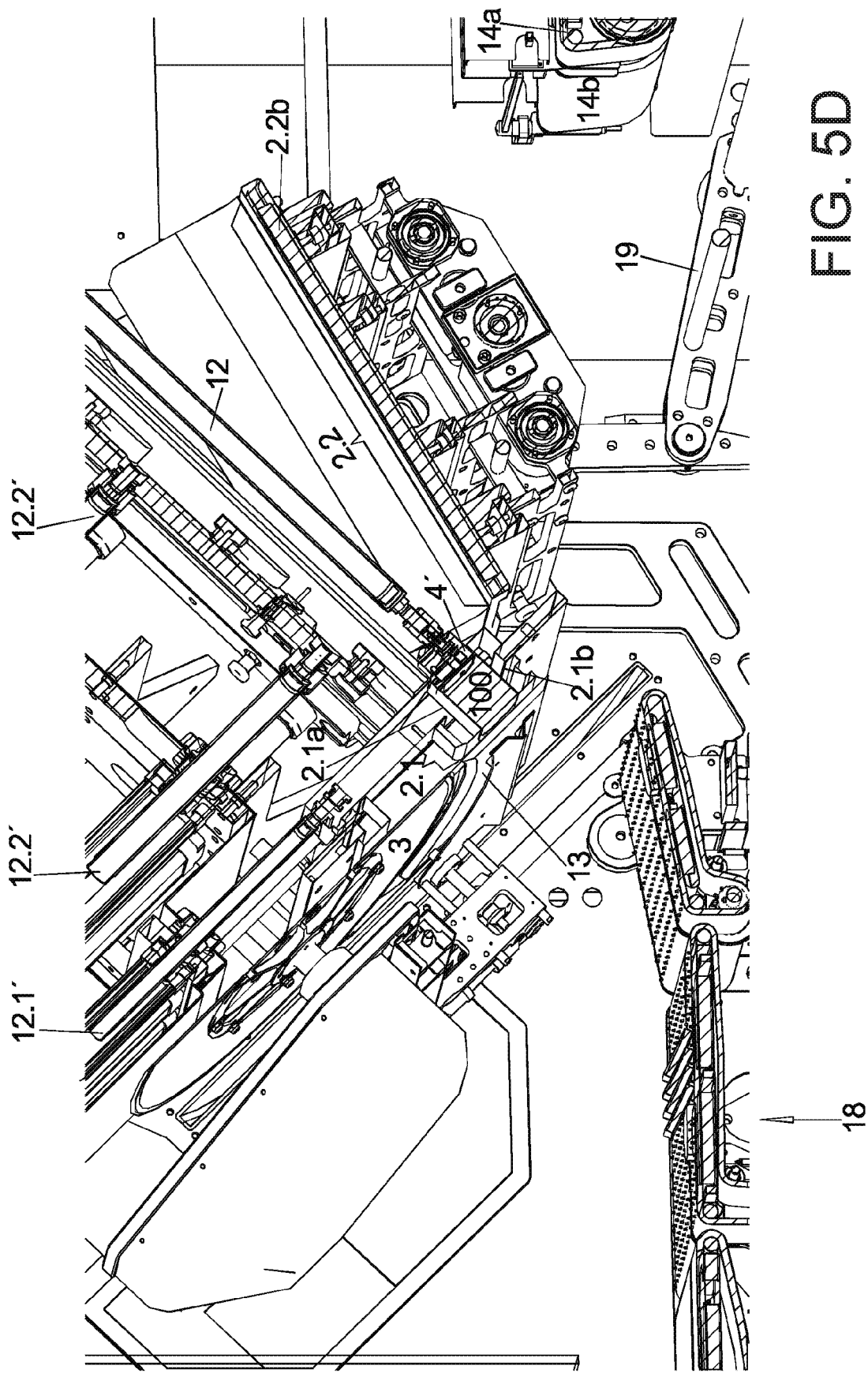

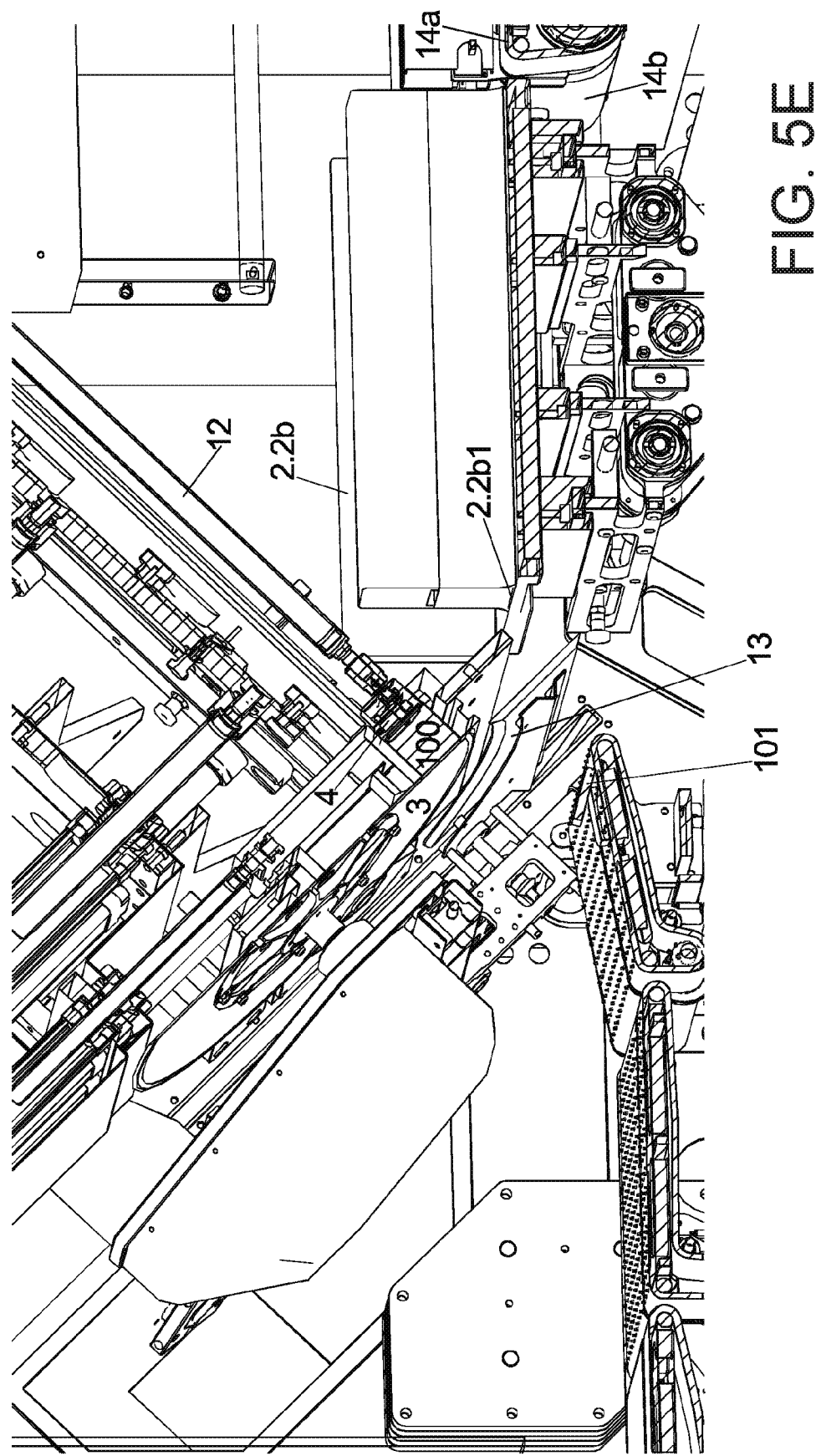

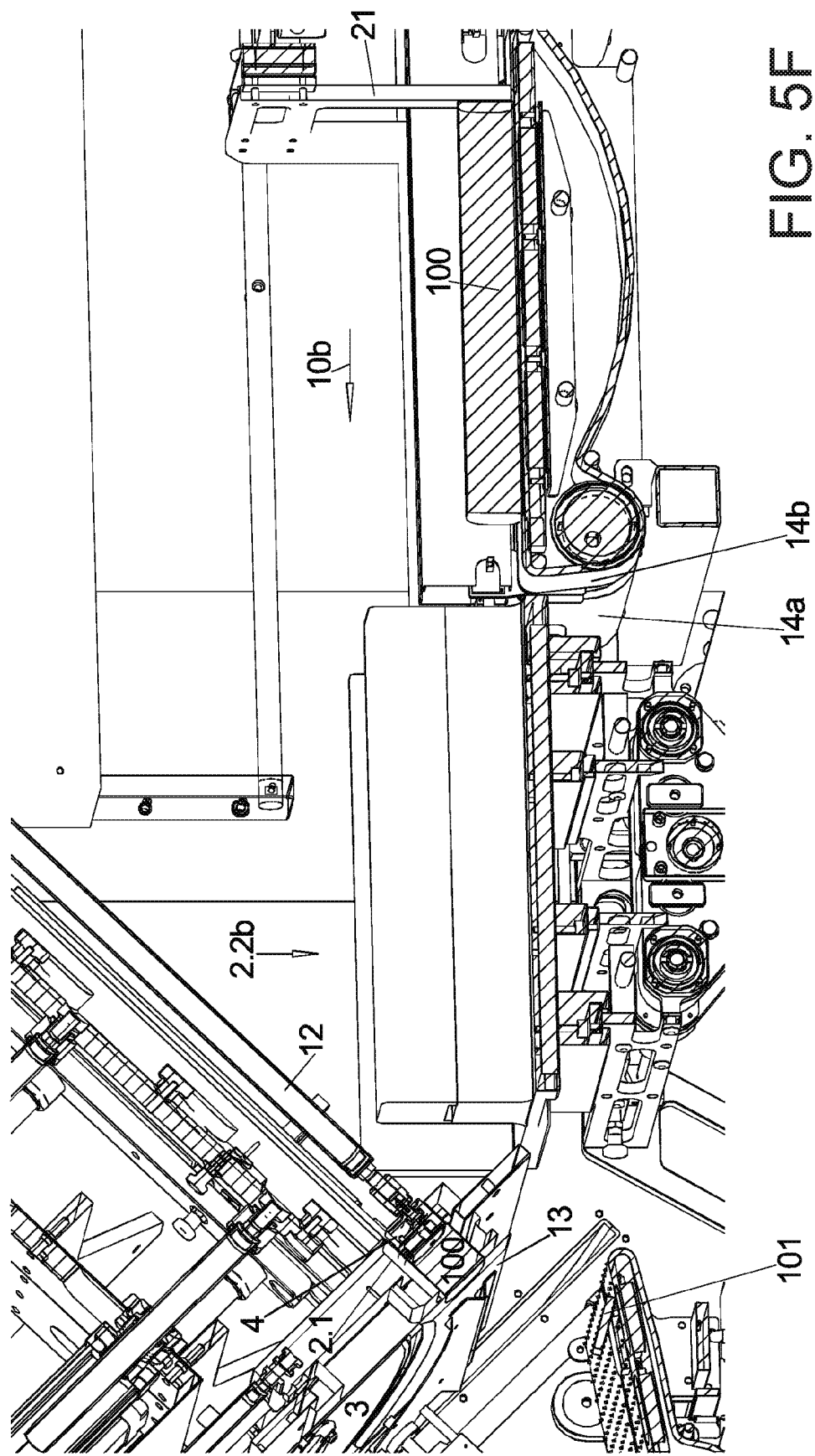

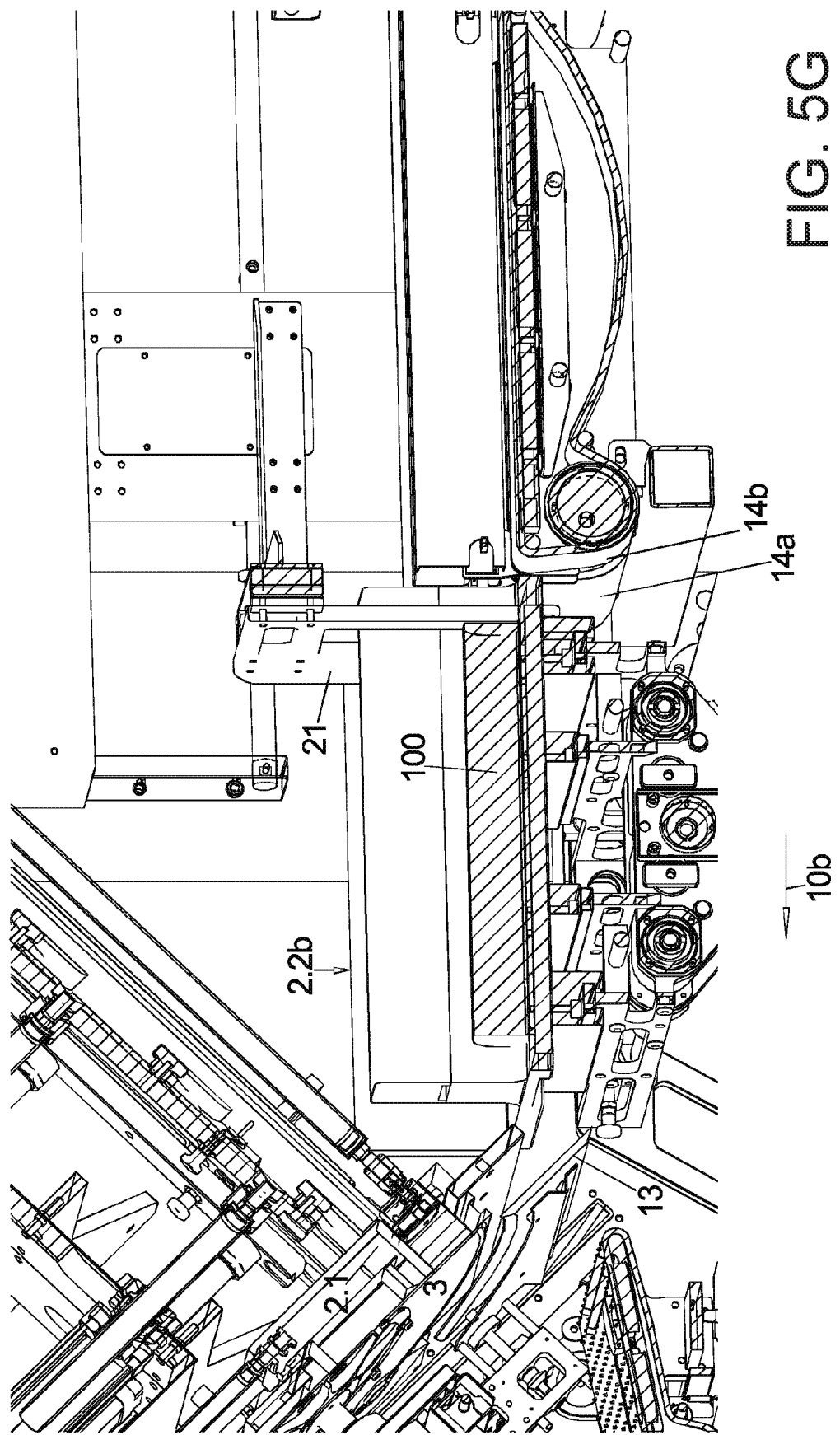

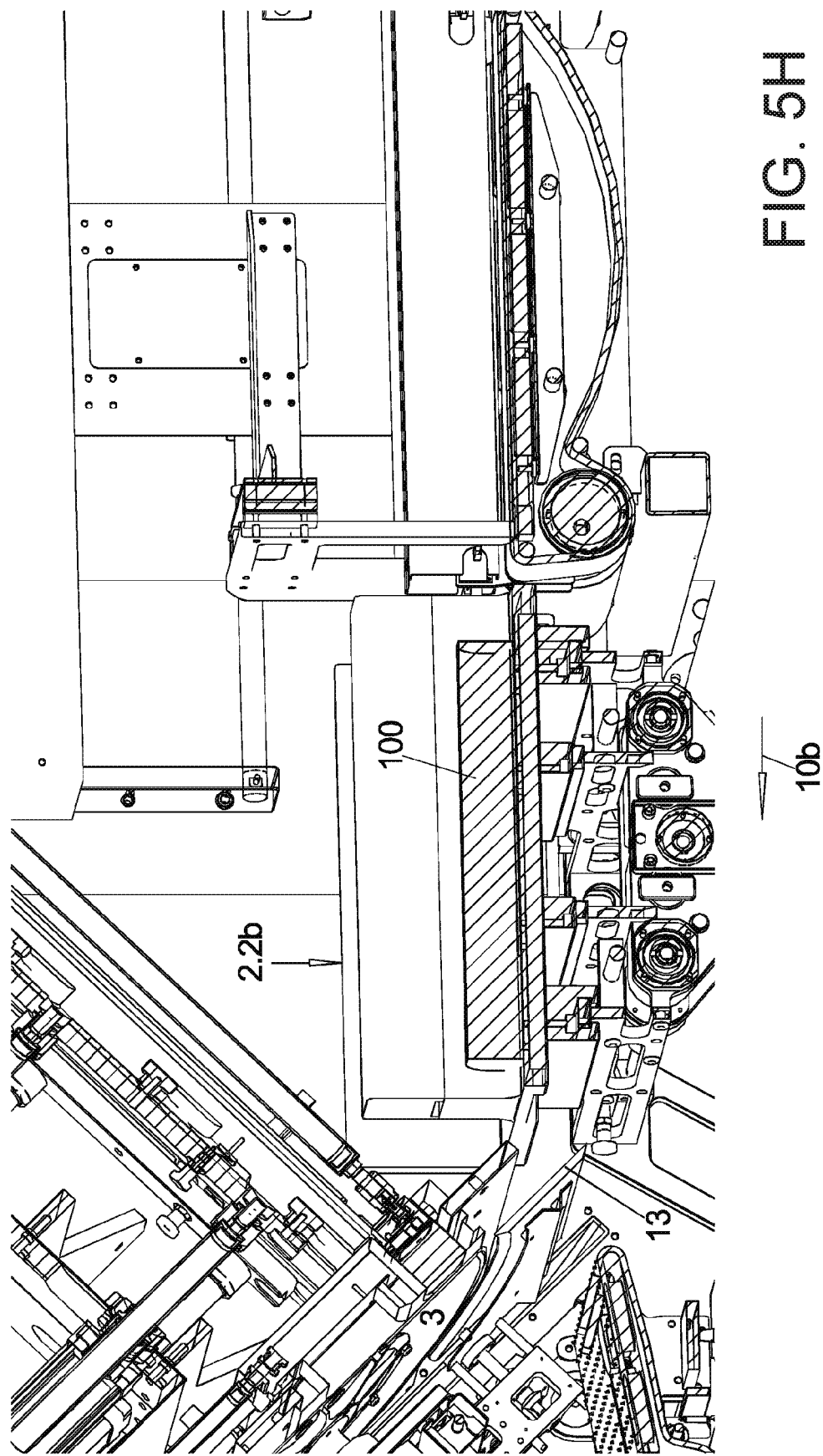

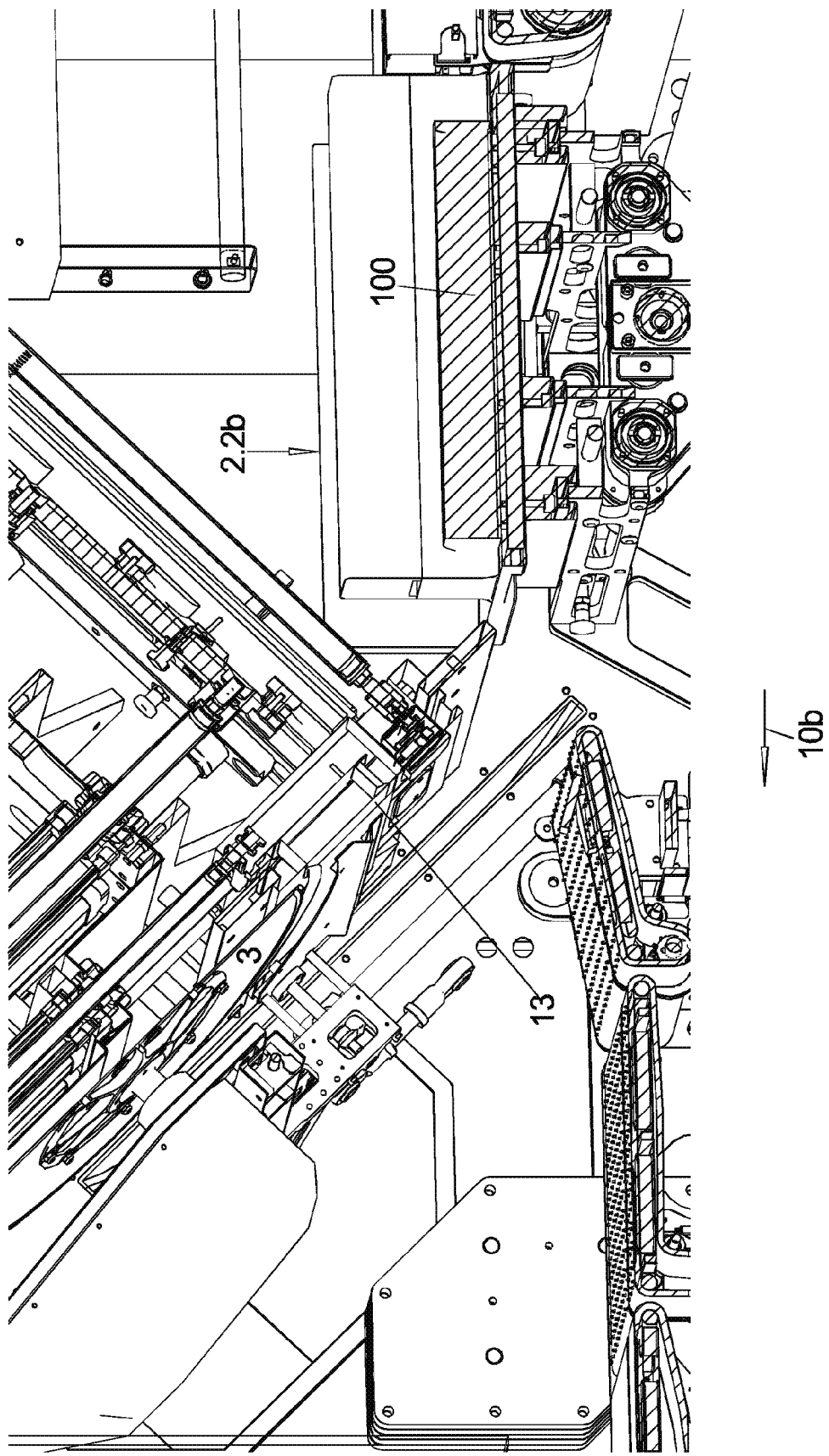

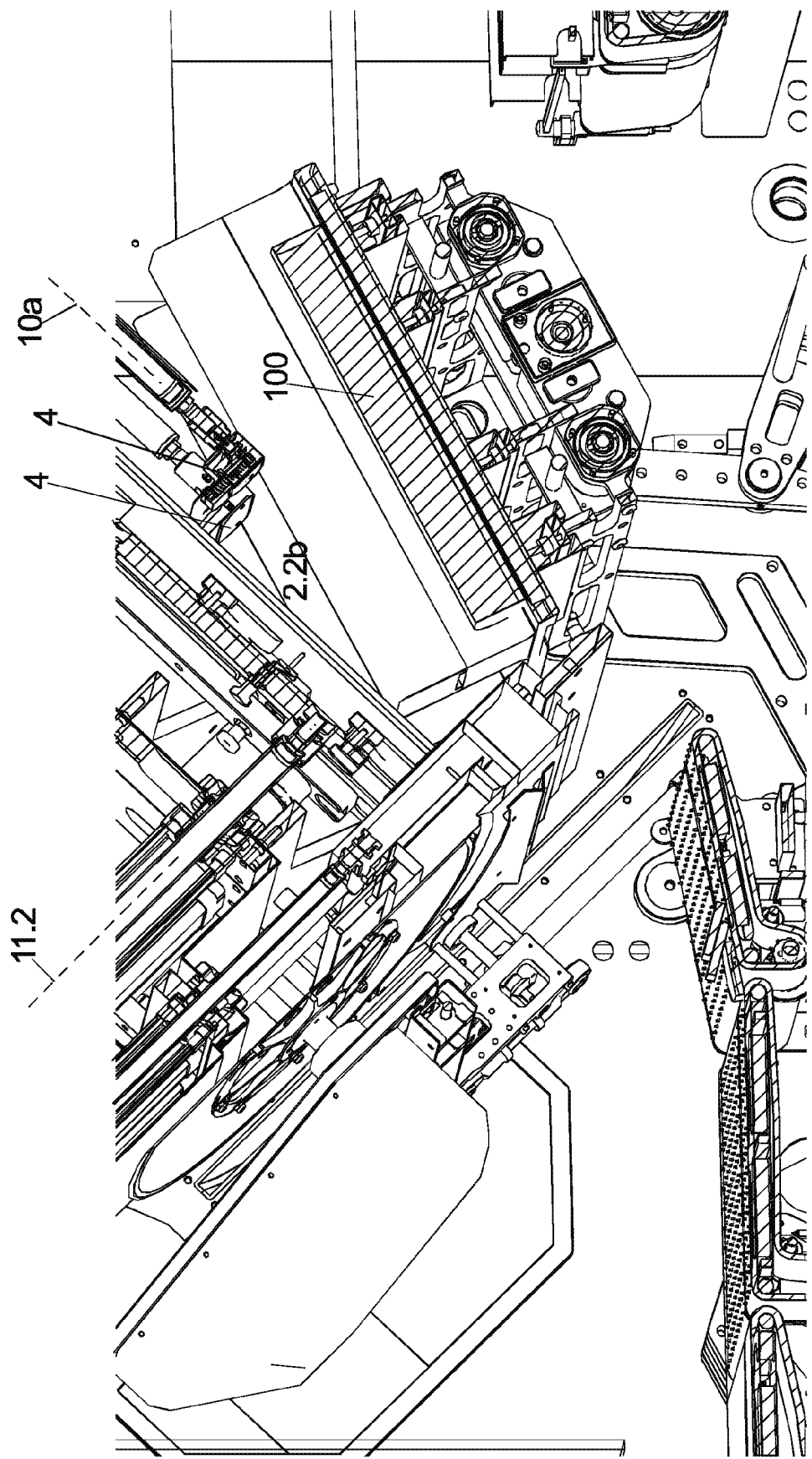

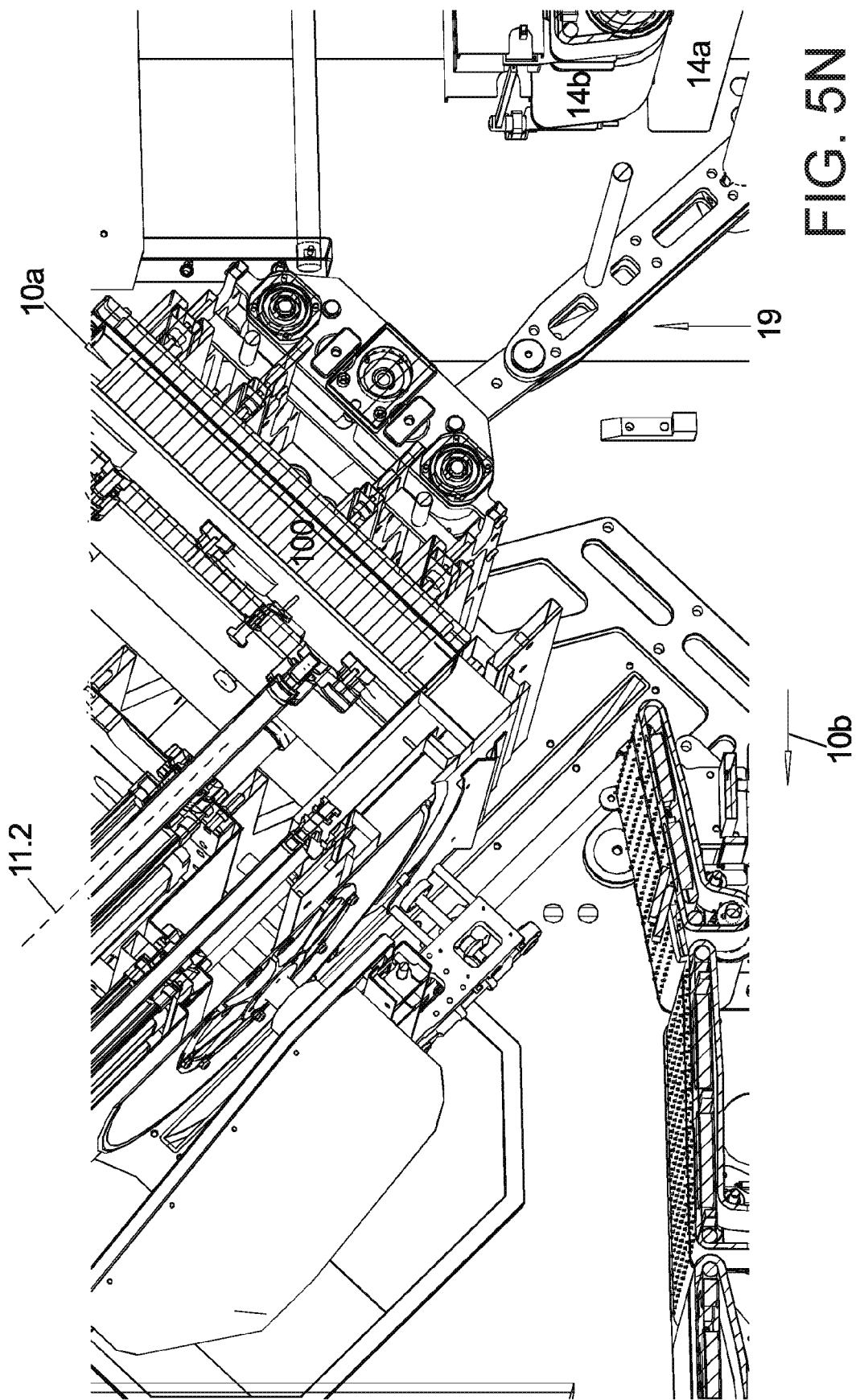

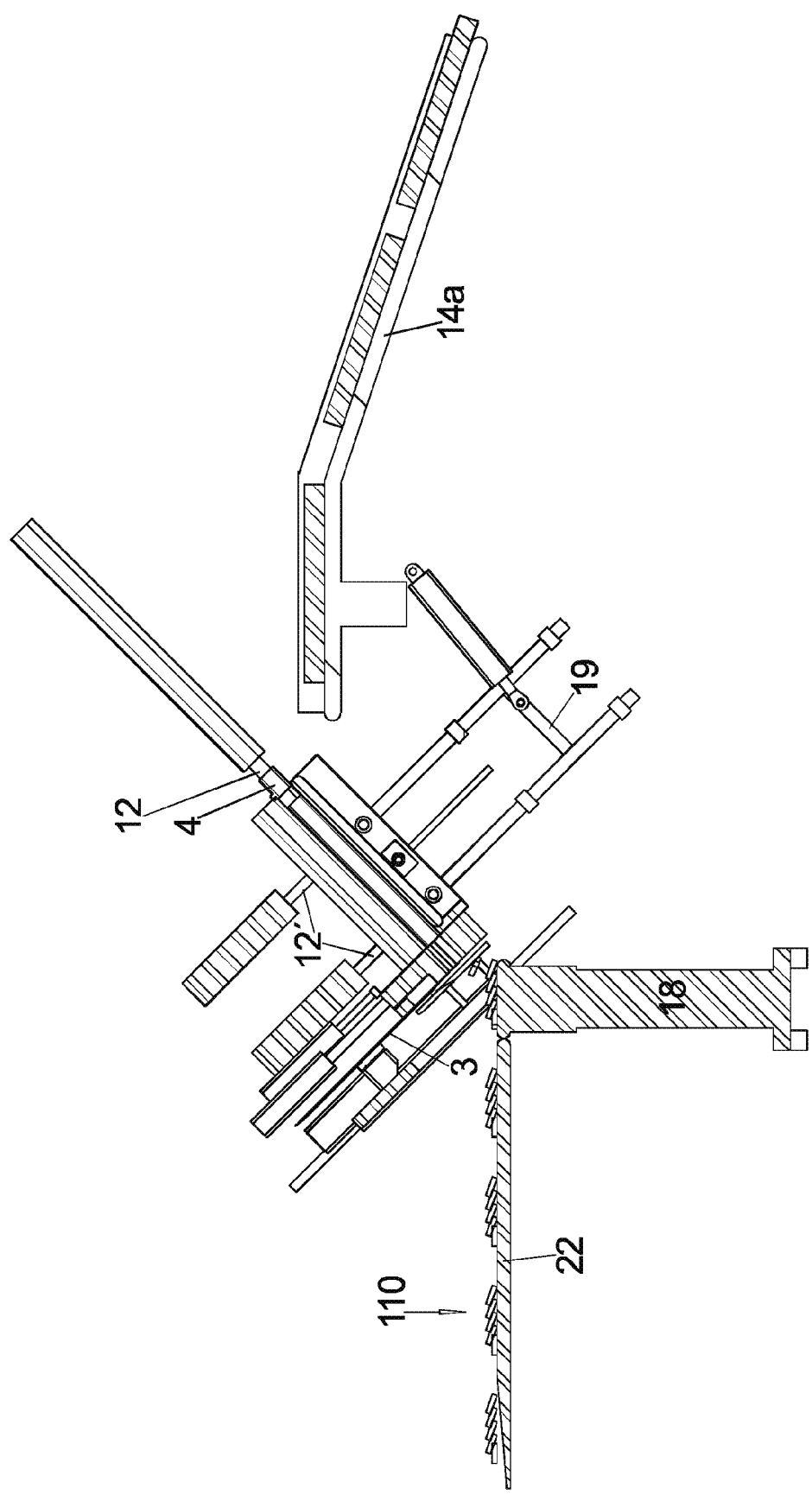

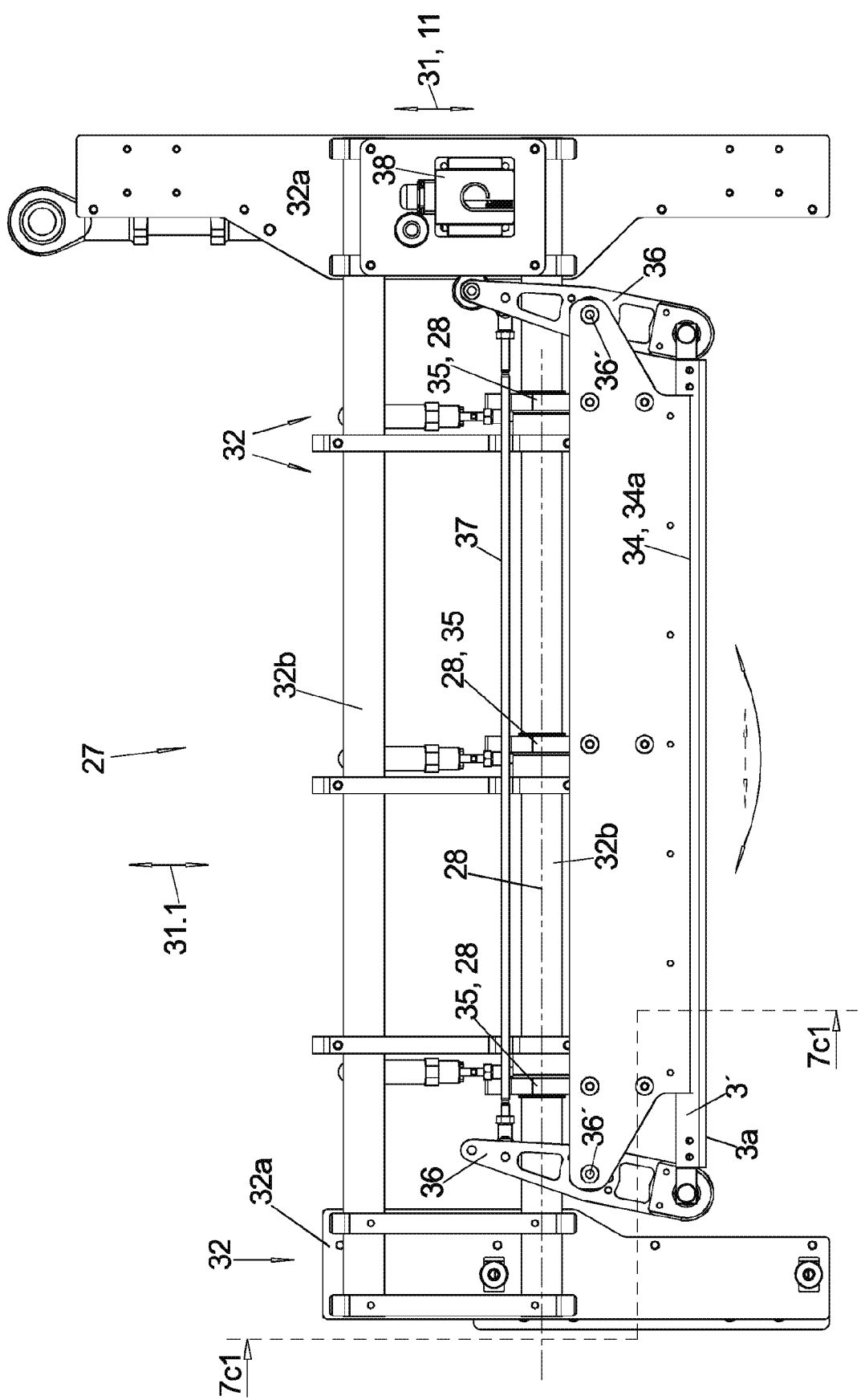

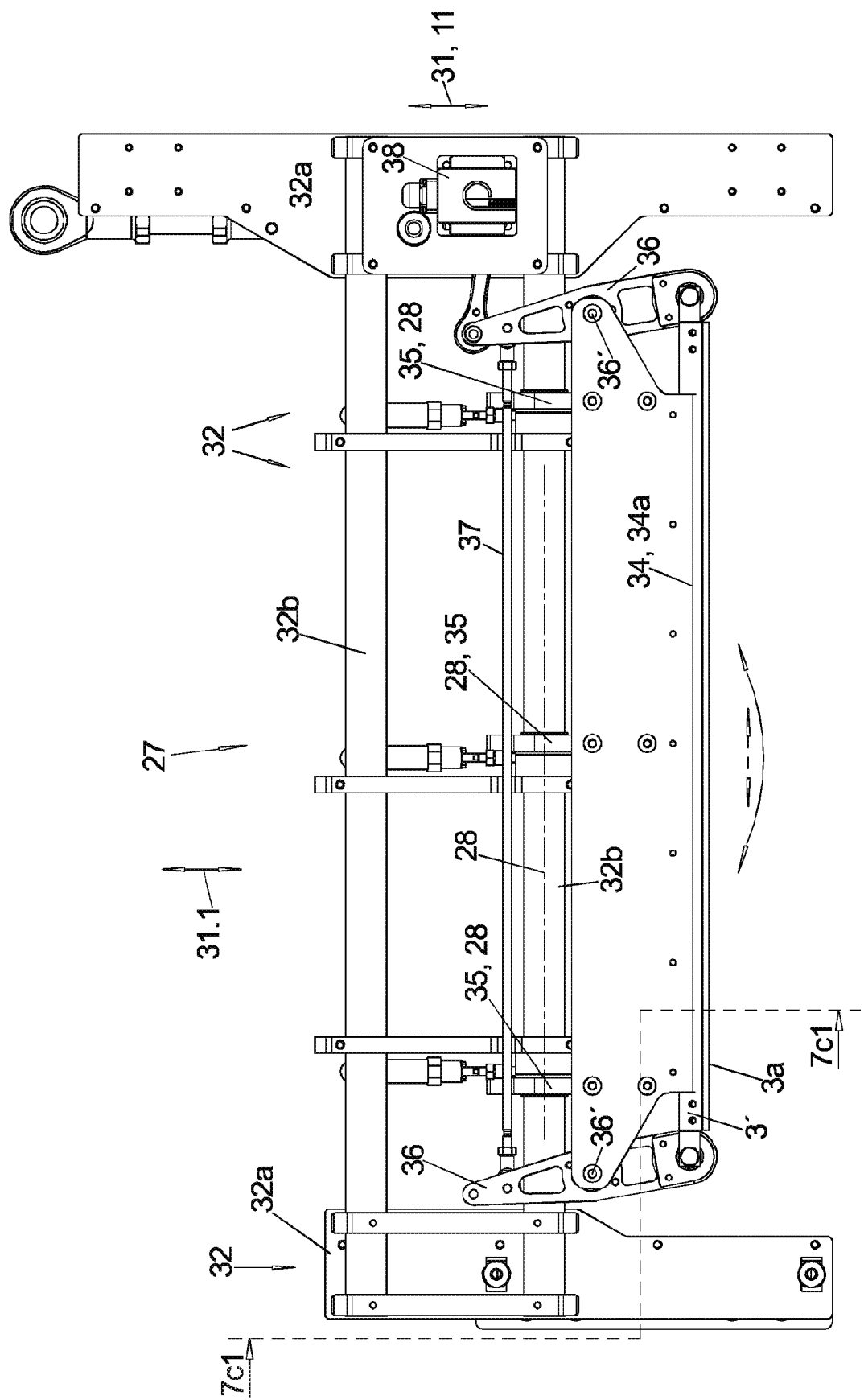
FIG. 7B2

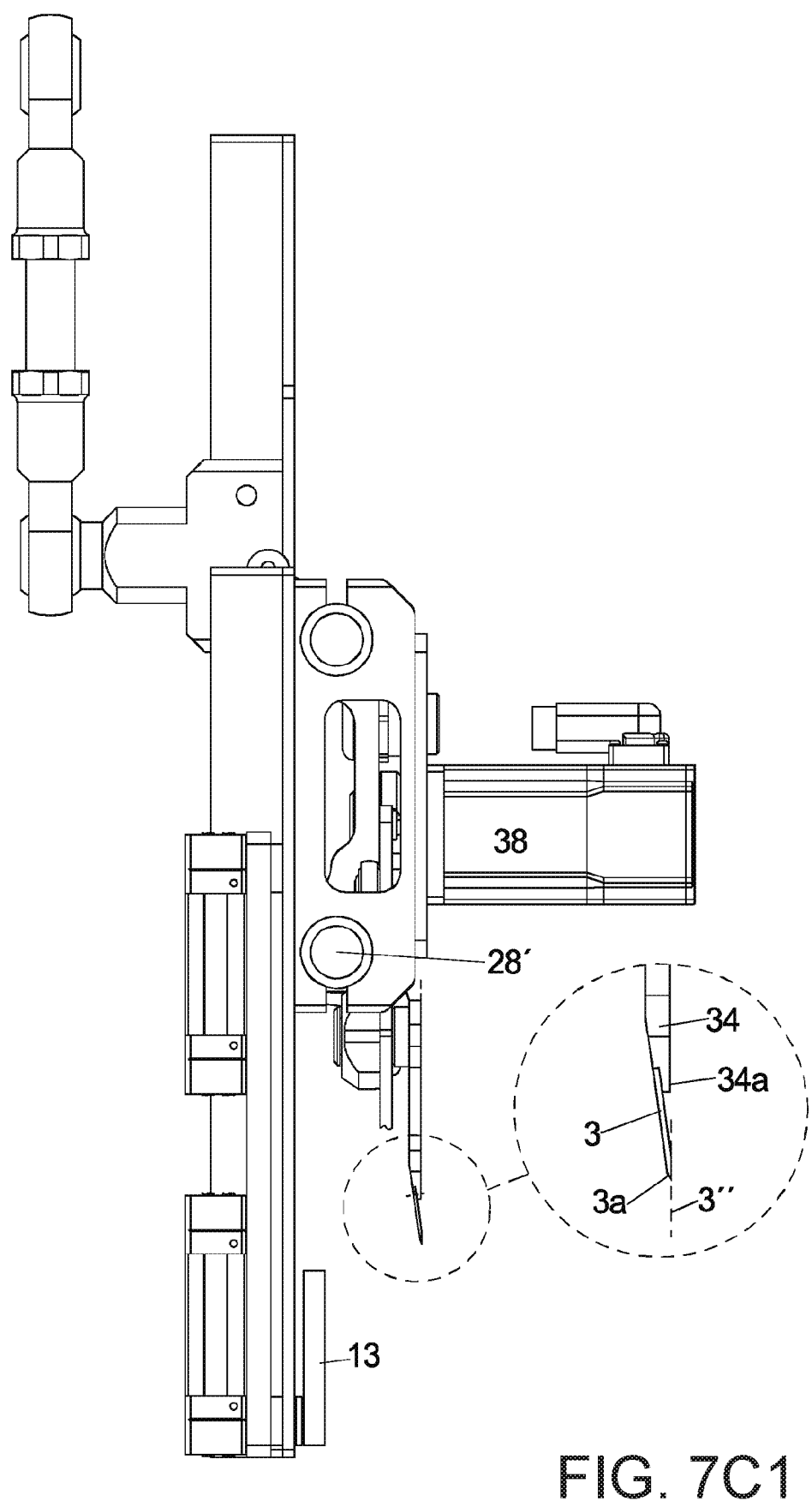
FIG. 7C1

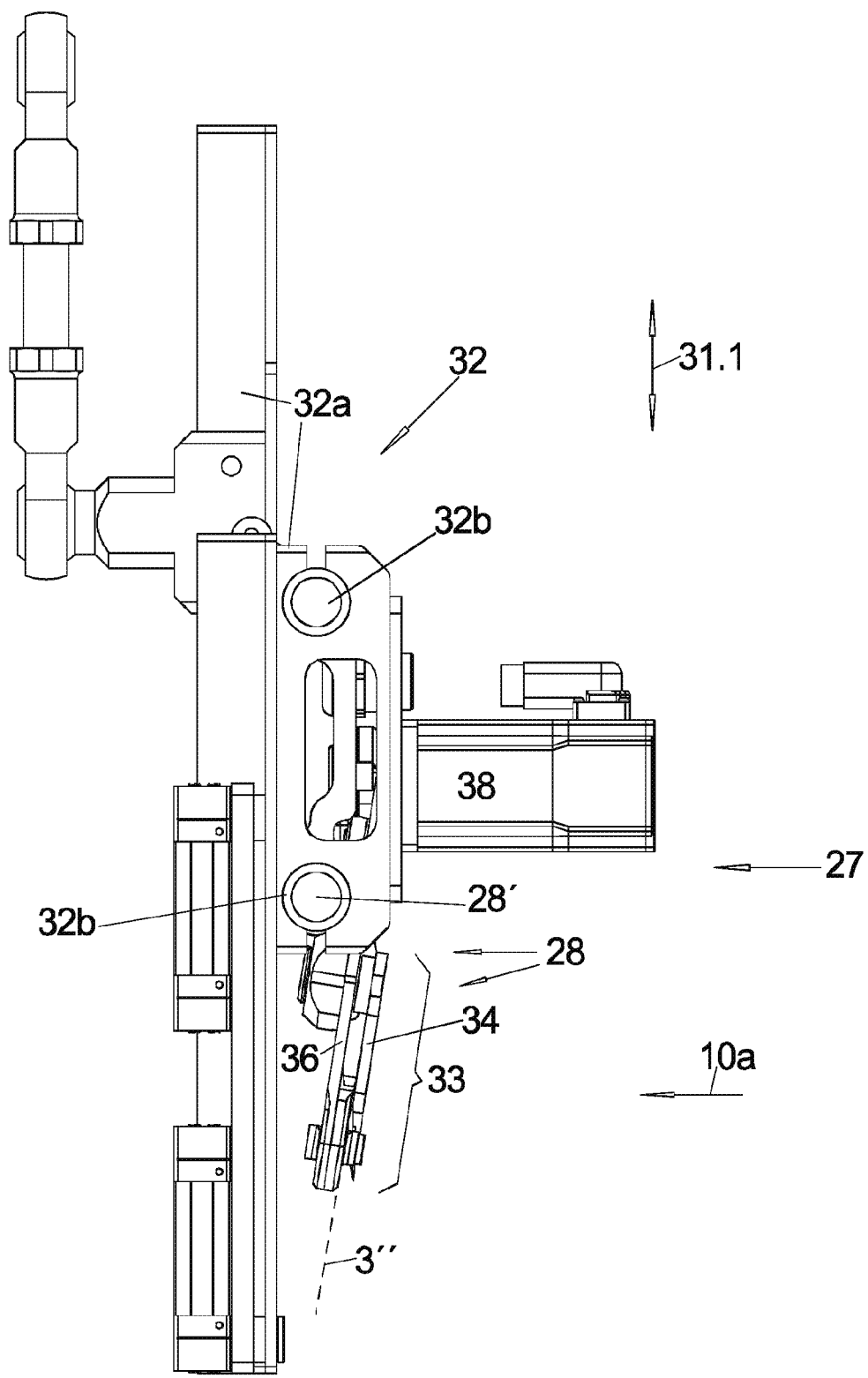
FIG. 7C2

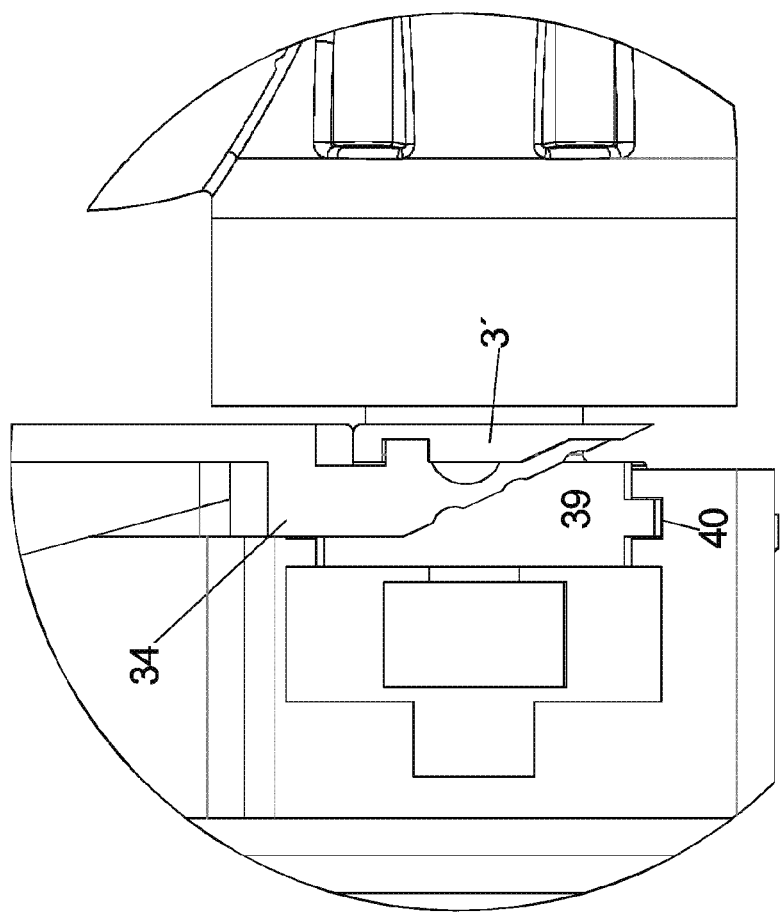
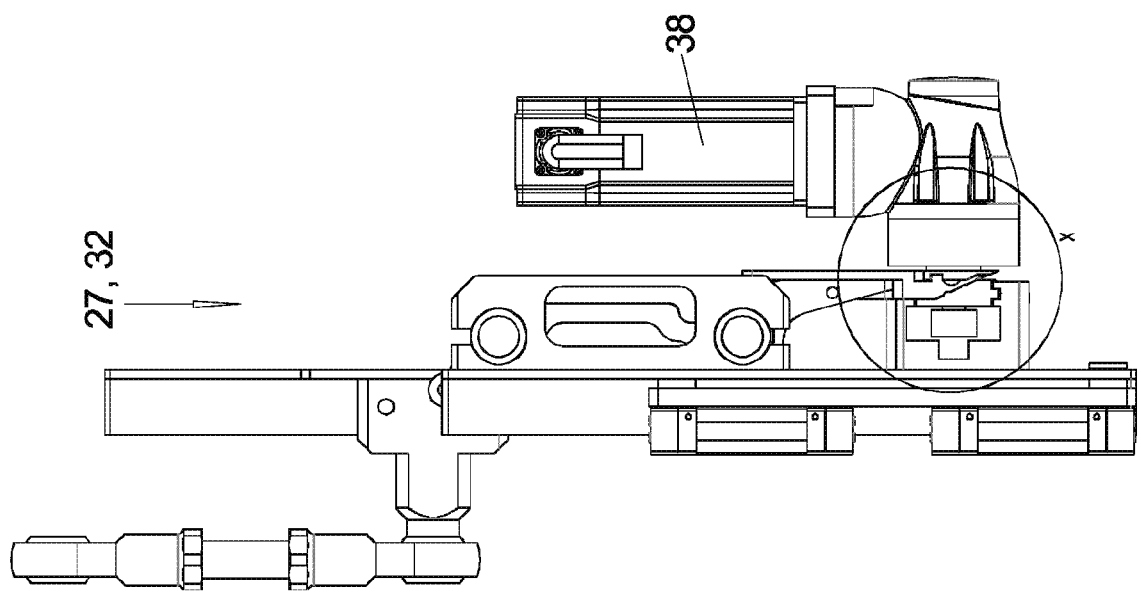
FIG. 7D1

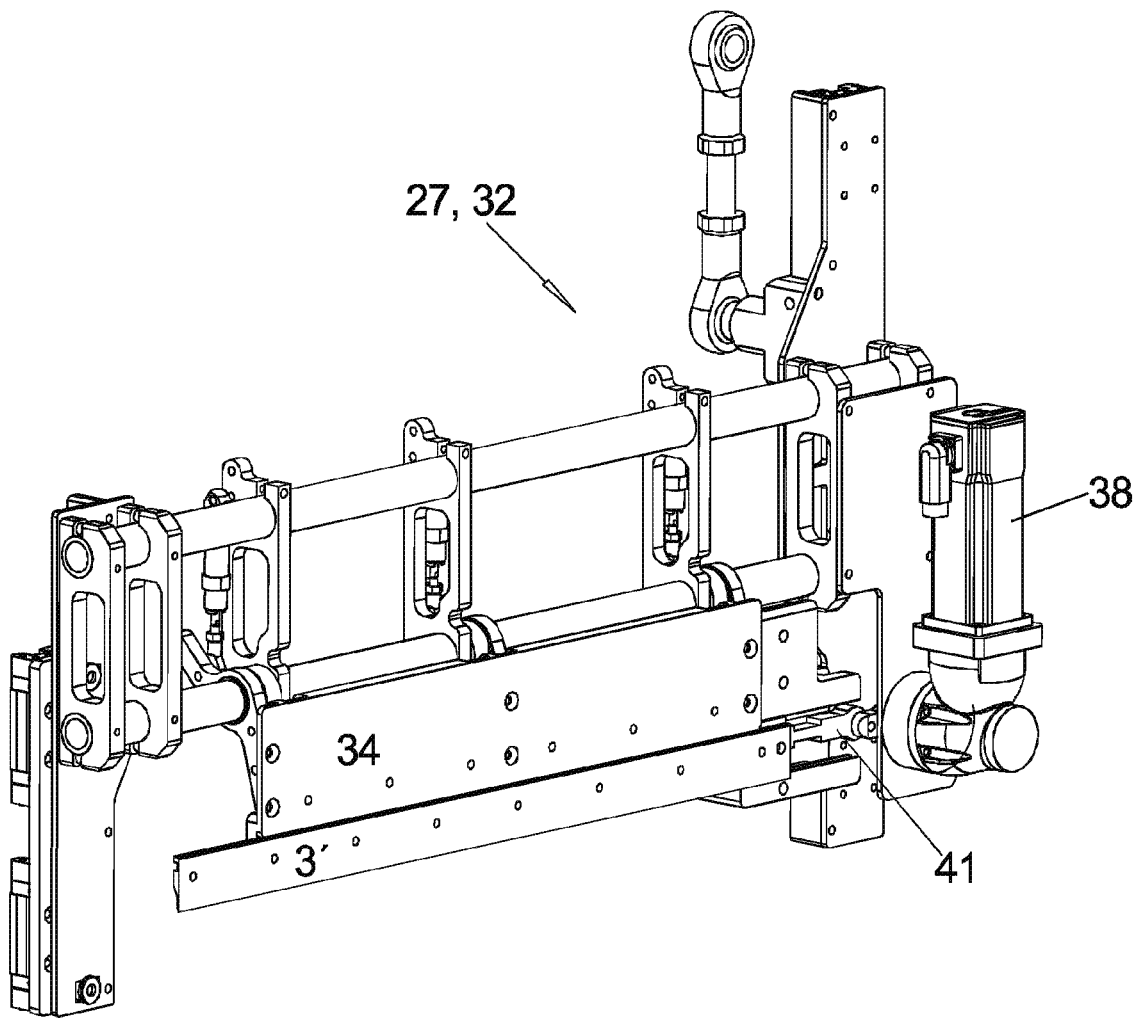
FIG. 7D2

CUTTING MACHINE AS WELL AS METHOD FOR CUTTING ELASTIC STRINGS, IN PARTICULAR MEAT STRINGS

CROSS-REFERENCE TO RELATED APPLICATIONS

This application claims the benefit of PCT Application No. PCT/EP2017/060014 filed on Apr. 27, 2017 and German Application No. 102016107849.2 filed on Apr. 28, 2016 to Thomas Völkl and Martin Mayr, the entire disclosure of which is incorporated herein by reference.

FIELD OF THE INVENTION

The invention relates to slicing an elastic strand like e.g. a meat strand into weight precise slices.

BACKGROUND OF THE INVENTION

Producing weight precise slices or portions from an elastic strand material is rather simple when the strand material has an identical cross section over its entire length and it is made from a homogenous material that can be cut everywhere with the same ease, like e.g. sausage or cheese.

For this purpose so called slicers are known which cut off a respective slice with a typically circular or spiral shaped rotating blade which can be moved back and forth respectively transversal to the strand, whereas the typically exposed strand is moved forward continuously.

A meat strand e.g. roast beef however does not have these properties since each piece has a different configuration and additionally a cross section that changes over time and the meat strand includes material with different consistency hardness and elasticity for example fat portions, the muscle strand, the enveloping fascia and optionally also bones like in a pork chop which have quite different mechanical properties.

In this context it is already known to shape a salmon initially so that it has a defined, known cross section at least at an end where the next slice is being cut off advantageously over an entire length, at least at a point in time when the slice is cut off. Then a relationship between the adjustable thickness of the slice and the weight of the slice can be established though not 100% since a consistency of the meat can change from one slice to another wherein the components of the meat have different specific weights.

In order to achieve this deformation the typically slightly frozen salmon is initially inserted into a form tube and pressed in the axial direction by a longitudinal press plunger against a stop so that a cross section of the salmon expands to that it fills an entire inner pre space of the form tube.

Thus form tubes with different cross sections can be used depending on the dimension of the salmon and a cross section of the form tube can be adjusted additionally after the salmon is inserted, for example in that two opposite side walls of the form tube are moved towards each other which also causes a transversal compression of the salmon which acts gently upon the structure of the fish.

In cutting machines of this type the salmon can only be inserted into the form tube after the longitudinal press plunger or the transversal press plunger were removed from the form rube and a loading opening, typically a rear opening of the form tube is freely accessible.

This causes rather long idle times between the cutting phases and has required hand loading to this date.

In order to integrate a cutting machine of this type into a processing line, typically including a froster, one or plural cutting machines operating in parallel, a scale, a portioning/insertion device for inserting the portions/slices into a dish and optionally a sealing machine for tight sealing of the dishes. It is disadvantageous that either an employee for loading one to three cutting machines is required for this purpose or a high level of automation is required in order not to need this employee.

Additionally the individual form tubes, thus meat strands have to be handle able individually since cutlets have to be able to cut from a top shell after removing the quality cut off.

On the other hand side minute steaks can be cut from a pork back after removing the quality cut off and the residual piece made from red meat can be used for roast beef.

SUMMARY OF THE INVENTION a) Technical Object

Thus it is an object of the invention to provide a cutting machine and a cutting method which facilitates in spite of a simple configuration and operation to achieve short idle times and thus a high through put while be able to produce weight precise slices and portions.

b) Solution

This object is achieved by the features of claims 1 and 23. Advantageous embodiments can be derived from the dependent claims.

For the purpose of the instant invention subsequently only meat strands are discussed without limiting the invention with the special type of a strand made from an elastic material.

The object is also achieved by the following method.

One measure for reducing idle times consists in moving the blade, which represents a component of a cutting unit, axially forward in the transversal direction, that is, in the feed direction, in particular by approximately the thickness of one slice, immediately after the foremost slice has been cut off, and namely either before or at the latest during the backward movement.

As a result, the strand, in particular the meat strand, can be moved forward to beyond the front end of the form tube, in particular up to the stop plate, which can begin not only at the point in time when the blade has completely moved out of the cross-sectional area of the inner free space of the form tube, but already before that, in particular as soon as the forward movement of the blade in the feed direction has begun, whereby the time interval between two subsequent steps is considerably reduced and thus the efficiency of the machine is increased.

Of course, following this procedure, that is, when the blade has completely moved out of the cross-sectional area of the form tube in the transversal direction, the blade has to be returned to its axial cutting position, the starting position, in the axial direction counter to the feed direction, so that the blade in the side view onto the longitudinal direction, on the one hand, and the movement direction of the blade, in particular the so-called second transversal direction, on the other hand, move along a path that is closed in a ring-shaped manner, for example a rectangular or trapezoid path, in every step.

Preferably, a stop plate for the strand is provided, and in particular represents a component of the cutting unit, and is thus connected to the blade. Preferably, the stop plate does not move along on this ring-shaped, closed path of the blades, but moves together with the blade only in the transversal direction, and—as long as the desired slice thickness is not changed—thus remains at the same axial position as a strand is being cut. In that case, only its axial distance and/or its distance in the other transversal direction to the blade can be altered.

With a rotating, non-circular-disc-shaped blade of the flying circle of the blade, the stop plate and the blade preferably do not overlap with each other as viewed in the feed direction, but instead a small gap for passing the cut-off slice is present between them.

Among other things, the shape retention of the strand and thus of the cut-off slices is ensured by means of the following measures:

The strand to be cut, such as for example a strand of meat, is arranged inside a form tube extending in the longitudinal direction in such a way that its greatest extension, its longitudinal direction, corresponds to the longitudinal direction of the form tube. Subsequently, the strand is compressed in at least one transversal direction, the so-called second transversal direction, by using the form tube, so that it gets a defined cross section which is substantially constant across the entire length.

In this transversally compressed condition, the strand thus transversally compressed is at first longitudinally compressed in the longitudinal direction against a stop inside the form tube either previously, simultaneously or subsequently, in particular by means of a longitudinal press plunger, and is subsequently moved forward to beyond the so-called blade end of the form tube, so that a slice can be respectively cut off from the strand in front of the cutting end of the form tube.

The compression is used to completely fill the free cross section of the form tube with the strand, and thus the slices have a defined surface area transversal to their longitudinal direction.

Cutting off a respective slice can be performed with the same blade and in the same process step in all form tubes, and thus in all meat strands. In order to cut off the slices, the blade is advantageously moved back and forth for each step in a transversal direction, in particular in the second transversal direction.

In addition to the transversal compression in the second transversal direction, a transversal compressing in a first transversal direction, which is preferably positioned perpendicularly to the second transversal direction, may—in particular previously—occur, either already in the form tube, in particular before the circumferentially closed form tube is closed, or already before inserting into the form tube.

The approach as it has been described so far as well as the approach that will be described in the following can also be performed in multiple form tubes that extend next to each other, in particular in parallel to each other, and inside of which respectively one strand is inserted and processed. Here, the longitudinal and/or transversal compressing can be performed in the individual form tubes independently of each other. In particular, the cutting off of slices from the individual strands is performed by the same blade by means of the same cutting movement across multiple, in particular all, form tubes.

When the slices are cut off, the blade, for example a rotating circular disc-shaped or sickle-shaped blade or an oscillating bar-shaped or strip-shaped blade or a circumferential continuous band-shaped blade is controlled with respect to its speed and/or the velocity of its transversal movement in such a manner that, in a manner adapted to the material to be cut, the performed step is a so-called pulling cut to the desired extent, that is, a particular point of the cutting edge moves in the circumferential direction with a velocity that is greater by a predetermined factor than the velocity in the transversal direction.

Thus the transversal compressing can be performed in the second transversal direction which is advantageously perpendicular to the first transversal direction and advantageously both are perpendicular to the longitudinal direction with a transversal press plunger with a predetermined non variable width corresponding to a final dimension during transversal compressing in the first transversal direction, advantageously for the individual meat strands independently from each other with respect to the degree of transversal compression in the second transversal direction.

Moving the compressed at least one meat strand forward can be performed synchronously or independently from each other and thus in the same process step for differently advanced meat strands also slices with different thickness and due to the individually adjustable transversal compression in the transversal direction also slices with different cross section and thus size can be cut off in one process step.

The meat strand is advantageously pressed in longitudinal direction against a stop element that is respectively arranged in front of a forward end of the form tube, in particular a stop plate which is advantageously adjustable for each form tube independently from each other with its axial distance from the axial cutting position of the cutting blade corresponding to a desired thickness of the slice to be cut off. Since the blade is in contact with the forward cutting end of the form tube or at a fixed very small axial distance therefrom the stop element is adjusted at a particular axial distance from the forward cutting end of the form tube.

Another measure for reducing the dead times includes that the form tube is configured in two components in its longitudinal direction and made from a front form tube terminating at the forward cutting edge end and a rear form tube adjacent thereto in a rear direction.

Thus, it is possible for the rear form tube to be already loaded with a new strand to be cut, while the rest of the old strand that remains to be cut is located only in the front form tube and is moved further forward inside it, in particular by means of the longitudinal press plunger, and is completely cut up.

For this purpose, the rear form tube can preferably be brought from a circumferentially closed into a circumferentially opened loading position.

Between the front form tube and the rear form tube, an intermediate plate is insertable and extractable in a transversal direction, in particular the second transversal direction.

The transversal compression in the front form tube can be performed as a function of the transversal compression in the rear form tube arranged behind the front form tube.

In the circumferentially closed compressing position of the form tube the cross sections of the front form tube and the rear form tube are certainly set identical since the same meat strand filling the entire cross section shall move through both of them.

Advantageously no transversal compressing is performed in the front form tube in both transversal directions but only in the second transversal direction.

The front form tube and the rear form tube can be operated independently from each other with respect to a strength of the transversal compression at least in one transversal direction, advantageously in both transversal directions independently from each other.

As soon as, during cutting the meat strand, a rear end portion of the meat strand is located only in the longitudinal portion of the front form tube and is moved further forward by the press plunger pressing axially from behind for further cutting simultaneously the lower rear form tube of the rear form tube can be lowered in its entirety or at least its rear portion into a loading position that is aligned with the feeder for new meat strands and in particular aligned horizontally.

Thus in particular the inner free cross section of the rear form tube is enlarged with respect to its cross section, advantageously height enlarged and/or advantageously also width enlarged.

Thus already during cutting the rest of the preceding meat strand in the front form tube a new meat strand can already be inserted into the open rear form tube of the same form tube, in particular below the piston rod of the longitudinal press plunger extending into the front form tube and can be transported forward to the front end of the rear form tube, in particular an intermediate plate arranged therein.

This saves valuable time again compared to a solution where the form tube is only opened after completely slicing the first meat strand so that the next meat strand can be inserted.

In order to increase the inner free cross section of the rear form tube either the lower rear form element which is configured U-shaped in cross section with an upward oriented opening parallel to the upper rear form element which is configured as a transversal press plunger that is insert able into the opening of the U-shape can be removed therefrom or also about a transversal axis which is arranged in particular proximal to or at the front end of the lower rear form element, the rear end of the rear form tube element can be pivoted downward.

Additionally a side wall of two rear form tubes arranged adjacent to one another advantageously the outer side wall can be configured as a separate component that is moveable in the first transversal direction relative to the rest of the entire U-shaped lower rear form element and can be run in outward direction compared thereto in order to facilitate providing an interior space for inserting a new meat strand.

As soon as the new meat strand is inserted typically by inserting a slide that is moveable in the longitudinal direction for example a slide that protrudes from above into the free space of the U-shaped lower form element initially if provided the side wall that is moveable in the first transversal direction is moved inward as a transversal pressing wall of the rear form tube for inserting a width of the U-shaped lower rear form portion in this transversal direction, wherein optionally also a transversal compressing of the meat strand can occur in the first transversal direction.

The new meat strand is now arranged in the lower portion of the open rear form tube and the preceding meat strand is still cut up completely and the longitudinal press plunger is pulled back beyond the rear end of the newly inserted meat strand which can be respectively determined by a sensor so that the pull-back movement of the longitudinal press plunger advantageously is only performed up to this location.

Then the rear form tube is closed again thus the lower rear form element, the U-element is moved in upward direction or pivoted upward until it is aligned with the lower front form tube and thus not only approached to the non-down folded transversal press plunger. The transversal press plunger thus also penetrates into the U-element. Loading the transversal press plunger in the second transversal direction, for example by at least one pneumatic or hydraulic operating cylinder performs the transversal compressing in the second transversal direction.

The longitudinal compressing of the meat strand commences thereafter with a pre-compression up to the intermediate plate as a forward stop at the front end of the rear form tube which was moved before longitudinal compressing into the closing position in the transversal direction so that it closes the free inner cross section of the form tube. Thus forces occurring during longitudinal compression do not have to be absorbed by another element, e.g. the stop plate which thus can be configured with reduced weight which yields speed advantages in view of the continuous acceleration and breaking action during slicing.

Thus, the meat strand is pushed further forward after pre compression exclusively in the rear form tube after removing the intermediate plate from the free cross section of the rear form tube wherein the forward movement is performed into the front form tube, then the front form tube is previously set to the same size, in particular height and/or width of the free inner cross section like the rear form tube. Advantageously the front form tube has a constant width and during pre-compression in the rear form tube, the rear form tube is set precisely to the width of the inner free cross section of the front form tube.

In the second transversal direction this can be optionally achieved very simply in that the transversal press plunger which performs the transversal compression in the second transversal direction continues through the front form tube and the rear form tube and is moved jointly relative to the remaining form tube components in the transversal direction, thus typically lowered from a top down or lifted up.

Advantageously the transversal compressing is already performed in the second transversal direction while the meat strand is still exclusively in the portion of the rear form tube.

Thereafter the intermediate plate is moved so that it releases the free inner cross section of the form tube and the transversally compressed meat strand is moved further forward by the longitudinal press plunger into the front form tube and through the front form tube until in particular to the stop plate and then slicing the new meat strand can commence.

A transversal compression in the first transversal direction is thus advantageously not performed in the front form tube but the entire front form tube has a fixed width in the first transversal direction corresponding to the closed compressing condition of the rear form tube in the first transversal direction.

Instead of performing the transversal compression in the rear form tube the transversal compression can be performed alternatively in the first transversal direction also in front of the rear form tube in pass through direction in a separate transversal pressing device in particular a transversal pressing tube which is configured in analogy to the lower rear formed element that is U-shaped in cross section.

In order for the meat strands to be easily moveable into the open rear form tube from behind the rear end of the rear form tube should be arrange able in alignment in the loading position relative to a base of its groove shaped inner free space with the adjacent front end of the feeder, typically configured as a conveyor belt or the conveyor belt should terminate slightly higher and should optionally be sloped downward.

In order to prevent that a meat strand resting on the downward sloping portion of the conveyor slides forward unintentionally advantageously the portion of the feeder adjacent to the rear form tube is configured vertically moveable in that as soon as a meat strand is arranged thereon the front end of the feeder is folded downward and in an aligned position with a rear portion of the inner free space of the rear form tube or for the same purpose instead the rear end of the rear form tube is pivoted upward.

In order to facilitate inserting the meat strand into the form tube at least one wall of the form tube advantageously the lower wall, optionally also the opposite upper wall of the form tube can be configured move able in the longitudinal direction, e.g. configured as a conveyor belt and is moved together with the meat strand to be inserted and in particular also driven to move the meat strand axially forward.

The cut off slices and/or the portions built therefrom are weighed immediately after being cut off from the meat strand if possible.

Should it become apparent during weighing the individual slices or portions downstream of the blade that the subsequent slices or the portions that are being accumulated do not have the target weight in this setting the subsequent slices to be cut off can be selected thicker or thinner through a corresponding axial adjustment of the slice thickness so that the next slice has the target weight or the completed portion has the nominal weight.

Regarding the cutting machine the object is achieved by the following configuration which among other things facilitates the previously described method during slicing.

A blade for cutting off slices from the meat strands is arranged in front of the forward cutting edge of the form tube in the known manner.

The blade and in particular the cutting unit that supports the blade is advantageously moveable back and forth and controllable by means of a control in a first blade transversal direction in which it passes completely through the cross section of the meat strand during cutting of the slice in order to perform the cutting process and the blade is additionally moveable back and forth in a controlled manner by a limited distance also in the longitudinal direction thus the feed direction.

In this way, the blade, in particular the entire cutting unit, can move along a path that is closed in a ring-shaped manner, in particular a rectangular or trapezoid path, during each cut-off procedure by way of a cutting motion, as viewed in the side view onto the feed direction and the blade transversal direction.

The blade is advantageously a bar shaped or strip shaped blade which has a straight or cambered cutting edge and in which the cutting edge, advantageously certainly the entire blade performs an oscillating movement in an oscillating direction whose largest component is disposed in a direction of the cutting edge.

For a straight cutting edge the oscillating direction advantageously coincides with the extension of the cutting edge or extends at least at an acute angle to the extension in the blade plane.

For a curved cutting edge the statement relates to the extension of the cutting edge on a tangent of the cutting edge in particular the connection line between the beginning and the end of the curved cutting edge.

An alternative is a circular disc shaped or cycle shaped blade with a cutting edge arranged at an outside of a circumference of the blade wherein the blade is drive able to rotate about an axis which extends through the center of the blade for a circular disc shaped blade in top view.

Thus, the blade can be sized so that its cutting edge for a rotating cycle shaped blades its throwing circuit extends in the second blade transversal direction which is perpendicular to the first blade transversal direction over the inner free spaces of all form tubes that are arranged parallel to each other and thus cuts a slice of a meat strand in each form tube during a cutting movement or an individual separate blade can be provided per form tube.

The cutting machine includes at least one form tube that is open in the front and in the back, and extends in the longitudinal direction which—in the circumferentially closed state of the form tube—is at the same time the longitudinal compressing direction, and into which respectively one strand can be inserted.

What is preferably present are multiple, preferably two, form tubes that are arranged next to each other, in particular in parallel next to each other, and inside of which respectively one strand can be inserted and processed, in particular independently of each other.

Provided for each form tube is a longitudinal press plunger which can be inserted from the rear loading end of the form tube from the axial direction, i.e. in the longitudinal compressing direction, into the form tube and closely abuts the inner circumferential walls of its inner free space, and pushes forward the meat strand positioned therein, for example against a stop element that is provided in the front end area, for example the intermediate plate, and thus can perform a compression in the longitudinal direction.

The goal is to know the cross-sectional area of each slice, based on the free inner cross section of the form tube in its compressed position being known from the position of the transversal press plunger and the transversal compression trough, so that slices cut therefrom have a calculable volume when the slice thickness is known, as the cross-sectional area of the slice=free inner cross section of the form tube is also known, because the inner space that is delimited by the inner circumferential walls of the form tube, the stop element and the longitudinal press plunger is completely filled with the material of the meat strand as a result of the compression.

In the circumferential direction, the form tubes consist of multiple form elements that can be moved relative to each other, in particular in the radial direction of the form tube, so that the free inner cross section of the form tube can be varied in both transversal directions, and the form elements can even be brought completely out of mesh with each other in the transversal direction, at least in a portion of the form tube.

Usually, the inner free space has a rhombus-shaped or rectangular cross section, of course with rounded corners, up to the shape of an ellipse, with its edge direction respectively defining one of the transversal directions to the longitudinal direction in which the form tube parts can be moved with respect to each other, preferably in a transversal plane that is perpendicular to the longitudinal direction.

To allow for a time overlap between slicing and inserting the next strand, each form tube is preferably divided in its longitudinal direction and/or across at least a portion of its circumference into the front form tube and the rear form tube.

In addition, the rear form tube can be brought from its position obliquely to the longitudinal compression direction in which it is aligned with the front form tube into a differing position, so that the rear form tube can be loaded with a new strand in this position, while the cutting of the rest of an old strand is still being finished in the front form tube.

In particular for this purpose, the so-called rear form element, the lower portion of the cross section of the rear form tube that has a mostly U-shaped cross section, is configured in such a manner that is can be lowered from the position in which it is aligned with the corresponding circumferential area of the front form tube to facilitate inserting a new strand.

The longitudinal press plungers of the individual form tubes are advantageously controllable independently from each other so that cutting up the meat strands that are pushed out from the individual form tubes can be performed independently from each other by a corresponding control which controls a movement of all move able components of the cutting machine relative to each other.

The form tubes extend in the circumferentially closed cutting condition at a slant angle downward towards its forward cutting edge in particular at an acute angle of 20° to 70°, better 30° to 60°, better 40° to 50° relative to horizontal so that the slices cut off at the front end can drop without problems to a extraction conveyor arranged there under typically a conveyor belt and can be transported away, either individually or after a portion of for example fanned out slices was produced on the extraction conveyor.

A stop plate is advantageously used as a stop element for the forward end of the meat strand that is pushed out from the forward cutting edge of the form tube, wherein the stop plate is arranged before cutting off a slice in front of the cross sectional portion of the forward end of the inner free space of the respective form tube on the side that is located opposite the form tube in the feed direction regarding the blade and advantageously is configured for each form tube separately and not extending overall form tubes so that the individual form tubes can be controlled differently for example to be able to generated slices with different thicknesses.

Most often, the stop plate and the common or individual blade together form a cutting unit since they are move able independently from each other at least in the axial direction but are typically firmly connected with each other in the transversal direction in which the blade runs through the meat strand for slicing.

The axial adjustment of the stop plate relative to the blade adjusts the thickness of the slices to be produced.

The stop plate however cannot only be longitudinally adjustable for adjusting and fixating a particular slice thickness but it can be also automatically adjustable by the control in the longitudinal direction so that the slice thickness can be adjusted even during cutting up a meat strand.

The blade on the other hand side for each individual step in addition to its movement in the transversal direction also performs a movement in and against the longitudinal pressing direction of the meat strand which was described in a context with the procedure, while the stop plate does not change its position in the axial direction preferably while a strand is being cut open, that is, as long as the slice thickness is not changed.

Advantageously there is a small gap in the longitudinal pressing direction between the stop plate and the blade. Thus when the blade is circular disc shaped the edge of the stop plate oriented towards the blade advantageously has a corresponding concave contour. When the blade is configured rotating but not circular disc shaped the same applies for the flying circle of the outer end of the blade.

The gap should be advantageously less than 20 mm, in particular less than 10 mm wide and should be selected in view of the consistency of the material to be received and/or the slice thickness, thus should also increase with increasing slice thickness.

This facilitates on the one hand side a good support of the meat strand through the stop plate before the blade penetrates the meat strand and on the other hand side after completely cutting the meat strand the generated slice can pivot forward and downward without being impeded by the stop plate, wherein the front form tube advantageously has a length between 2% and 50%, better between 5% and 30%, better between 10% and 20% of an entire length of the form tube.

Between the front form tube and the rear form tube in particular for all form tubes respectively a separate intermediate plate or an intermediate plate that is continuous over all form tubes is insert able in the transversal direction so that it completely closes a cross section of the inner free space of the circumferentially closed form tube that is in the slicing position in a completely inserted condition of the intermediate plate, thus the closed condition and completely releases the cross section of the inner free space in the open condition.

The intermediate plate is advantageously moveably arranged at the rear end of the front form tube, in particular its lower front form tube.

The front form tube and the rear form tube differ with respect to its configuration.

The rear form tube is made from at least 2 rear form elements that are moveable relative to each other in one or two transversal directions.

This simplifies a configuration of the form tubes. The inner free space of the form tubes is advantageously rectangular in the longitudinal direction, thus has four walls, wherein the corners should be rounded. The edge directions of the cross sections of the inner free space define the two transversal directions which extend in an orthogonal transversal plane to the longitudinal pressing direction and which the press plungers are moveable.

Among the four walls of the form tube that are provided for a rectangular inner free space, in particular of the rear form tube at least one wall can be formed by a main element of a feed conveyor extending in a pass through direction of the machine, in particular even two walls that are arranged opposite to one another can be formed by a feed conveyor belt of this type.

The rear form tube can be configured in the circumferential direction, for example from a first elbowed rear form element which forms two adjacent walls of the four walls and two additional rear form elements which respectively only form a single wall of the rectangular cross section.

Advantageously the first rear form element with the two walls is made on the one hand side from the recited longitudinally moveable form tube belt forming a lower wall of the form tube cross section and one or two side walls arranged thereon, the form tube wall which thus form two walls of the form tube that are arranged at an angle relative to each other wherein the walls form a simple angle element without the feed conveyor belt.

Opposite to this side wall arranged at a bottom side of the form tube a transversal pressing wall is arranged which is moveable in a first transversal direction, thus along the plane of the bottom side of the inner space of the form tube moveable in the transversal direction towards the opposite side wall for a transversal compression in this first transversal direction.

Thus, the transversal pressing wall moves towards a fixed end position so that after approaching this fixed end position the distance between the transversal pressing wall and the opposite side wall precisely corresponds to the width dimension of a transversal press plunger that is insert able from above there between in a second transversal direction wherein the transversal press plunger forms the fourth wall and facilitates the transversal compression of the meat strand in an interior of the form tube in the second transversal direction.

The in feed conveyor can have a greater width than the distance between the form tube wall and the transversal compression wall in the completely inserted condition and can thus also have a greater width than the greatest diameter of a meat strand that is to be processed.

In case a bottom side and a top side of the cross section of the form tube are formed by a respective in feed conveyor at least the transversal compression wall has an extension at the height of the form tube cross section in closed condition so that the transversal compression wall can penetrate between the upper and the lower in feed conveyor belt.

Advantageously also the side wall which is arranged at the one form tube band or the two form tube bands is arranged between the two in feed conveyor belts.

Typically also the rear form element is made from a lower rear form element which is configured with a U-shaped cross section or from an angle piece or also T-piece and another side wall that is move able transversal to the one side wall of the angle piece, the transversal side wall.

Into the upward oriented opening of this U-piece an additional rear form element is insert able as a transversal press plunger viewed in the longitudinal direction in the second transversal direction tightly contacting the inner flanks of the U-component for transversal compressing in the second transversal direction.

In order to move the inner free space of the form tube from the closed condition transversally compressing the meat strand into a condition with a greater cross section for inserting the meat strand the two lateral walls and the lower wall of the form tube can be lowered, in particular jointly thus in particular for the previously described configuration of the in feed conveyor belt the form tube wall and the transversal compression wall permanently connected there with.

The two or three form tube components of the rear form tube forming the lower U-component are lowered by a predetermined dimension, advantageously using a scissor arrangement in a parallel approximation and offset to the upper transversal press plunger or they are pivoted about a transversal axis which extends in the first transversal direction and which is arranged at or proximal to the front end of the rear form tube.

All rear form elements like e.g. with form tube wall and the transversal pressing wall extend over an entire axial length of the rear form tube and the transversal press plunger even advantageously extends beyond up to the front end of the form tube.

Instead of a configuration of the transversal press plunger that is provided integral in one piece in the longitudinal direction in the front form tube and in the rear form tube the transversal press plunger can also be configured in two separate components that are permanently coupled with each other in the second transversal direction.

Alternatively the transversal compression in the first transversal direction can be performed with a separate transversal pressing tub with two side walls that are moveable towards each other wherein the transversal pressing tub is arranged upstream to the rear formed element in the pass through direction, wherein the transversal pressing tub is then run together to a width in the first transversal direction which corresponds to the width of the U-component of the lower rear form element.

From this transversal pressing tub the meat strand that is transversally compressed in the first transversal direction can be inserted by a plunger into the rear form tube that is lowered into the loading position and aligned with the transversal pressing tub and the in feed conveyor.

In the front form tube advantageously the three lower walls are formed by a one piece U-shaped component which has a recess that is open towards the lower edge wherein the transversal press plunger of the front form tube or the transversal press plunger that is continuous through the front form tube and the rear form tube precisely fits into the recess and can penetrate into the recess from above.

When arranging exacting two form tubes parallel adjacent to each other a side wall is selected as the side wall that is firmly connected with the lower form tube band or a fixed base of the lower rear form element wherein the side wall is oriented towards the respective other form tube so that it is a center wall which is used for both adjacent form tubes while the transversal pressing walls are respectively arranged on an outside of each form tube and move able in the first transversal direction.

In a condition that is completely closed, thus a pressing condition of the form tube the cross sections of the inner free space of the front form tube and the rear form tube are equal in size and identically configured and aligned with each other since the meat strand from the rear form tube through the front form tube to the blade arranged in front thereof and which shall also be compressed longitudinally thereto.

As known in the art the longitudinal and transversal compression facilitates that the possibly e.g. pear shaped meat strand contacts the inner contour of the form tube in the compressed condition everywhere and also contacts the front stop plate and the rear longitudinal press plunger and thus a known cross section of the meat strand and also a known length is provided which facilitates cutting off slices that are equally sized in the transversal direction. Only for a constant cross sectional surface the desired volume and thus weight of the slice can be controlled for adjusting the thickness of the slice in particular for bone free material.

For material including bone the slices are advantageously weighed and additionally a cross section is determined whereas a thickness of the slice is known due to the blade setting or measured separately again.

In order to obtain a circumferentially closed inner free space at least in the pressing closed condition the transversal compressing wall during approximation to the opposite side wall contacts with its lower longitudinal edge as closely as possible on the upward oriented main element of the form tube band forming the lower wall of the form tube or the base arm of the lower rear form element.

During transversal compression the transversal press plunger is advantageously position controlled in particular force limited wherein a size of the cross section of the compressed meat strand is known through the detection of the completely forwarded end position of the transversal plunger through a corresponding position sensor and in view of a distance of the transversal compression wall from the opposite side wall and the known position of the form tube or the form tube band in the closed condition of the form tube and the control can compute the necessary thickness of the slices therefrom so that the slices have the predetermined nominal weight.

Directly downstream of the form tube there is a scale which weighs the cut off slices falling onto the scale or the portions building from the slices. In order to be able to weigh as precisely as possible the scale is advantageously now connected with the cutting machine but placed as a separate component into the ground without a connection to the cutting machine in order to prevent a transfer of vibrations to the scale.

Since an inner cross section of the inner form tube that is desirable in the compressed condition can be different as a function of the meat strand to be compressed in that the forwarded end position of the transversal pressing wall is defined differently and corresponding another upper transversal press plunger with different width is being used also the longitudinal press plunger has to have the corresponding cross section of the closed form tube that is in the compressing condition and thus has to be arranged easily replaceable at the front end of the piston rod moving the form tube.

The rounded corners of the cross section of the inner free space of the form tube facilitate completely filling the inner free space with the meat strand during compressing.

In order to achieve the rounded corners the transversal compressing wall and also the side wall that is firmly connected with the lower wall advantageously the form tube band, has a protrusion at its lower longitudinal edges that are oriented towards the inner free space and also the transversal press plunger has a protrusion at both its lower longitudinal edges wherein the protrusion is bar shaped and extends over an entire length of this component and wherein the protrusion forms a right angle triangle in cross section wherein the hypotenuse of the right angle triangle is cambered concave and configured e.g. as a quarter circle. These protrusions are arranged so that a rectangular cross section with rounded corners is provided through the cooperation of the form tube elements.

One of the rear form elements, advantageously the rear transversal press plunger can include scanning fingers in particular also in an axial portion of the form tube wherein the scanning fingers protrude from a contact surface wherein the scanning fingers can be moved backward through a pressure on a contact surface against a force of a spring and wherein a feeding of the scanning fingers is detected in order to scan the contour of a non-elastic portion of the meat strand, e.g. the bone for a pork chop strand so that a determination of a cross section and thus also of an un homogenous meat strand is facilitated.

c) Embodiments

DESCRIPTION OF THE SEVERAL VIEWS OF THE DRAWINGS

Embodiments according to the invention are subsequently described with reference to drawing figures, wherein:

FIG. 1C illustrates the embodiment of the cutting machine of FIG. 1A in different view;

FIG. 1E illustrates the embodiment of the cutting machine of FIG. 1A in different view;

FIG. 2B illustrates the first embodiment of the cutting machine of FIG. 1A in the slicing position in a different view;

FIG. 5D illustrates different operating condition of the first embodiment respectively in a slightly perspective view;

FIG. 5E illustrates different operating condition of the first embodiment respectively in a slightly perspective view;

FIG. 5F illustrates different operating condition of the first embodiment respectively in a slightly perspective view;

FIG. 5G illustrates different operating condition of the first embodiment respectively in a slightly perspective view;

FIG. 5H illustrates different operating condition of the first embodiment respectively in a slightly perspective view;

FIG. 5I illustrates different operating condition of the first embodiment respectively in a slightly perspective view;

FIG. 5L illustrates different operating condition of the first embodiment respectively in a slightly perspective view;

FIG. 5N illustrates different operating condition of the first embodiment respectively in a slightly perspective view;

FIG. 6B illustrates a second embodiment of the cutting machine in the loading and slicing position;

FIG. 7B1 illustrates a front view of a feed device in different functional positions of the cutting unit according to FIG. 7A;

FIG. 7B2 illustrates a front view of a feed device in different functional positions of the cutting unit according to FIG. 7A;

FIG. 7C1 illustrates the functional positions of the cutting unit according to FIG. 7A in a side view;

FIG. 7C2 illustrates the functional positions of the cutting unit according to FIG. 7A in a side view;

FIG. 7D1 illustrates a perspective view of the a third cutting unit oriented away from the second cutting unit according to FIG. 7A;

FIG. 7D2 illustrates a perspective view of the a third cutting unit oriented away from the second cutting unit according to FIG. 7A;

DETAILED DESCRIPTION OF THE INVENTION

The basic principle of the cutting machine according to the invention is described best with FIGS. 1A-1E, 2A and 2B.

A respective meat strand 100 is processed thus compressed onto tracks arranged adjacent and parallel to each other in a first transversal direction 11. 1 essentially synchronously and then sliced into slices 101.

Figure 2A:
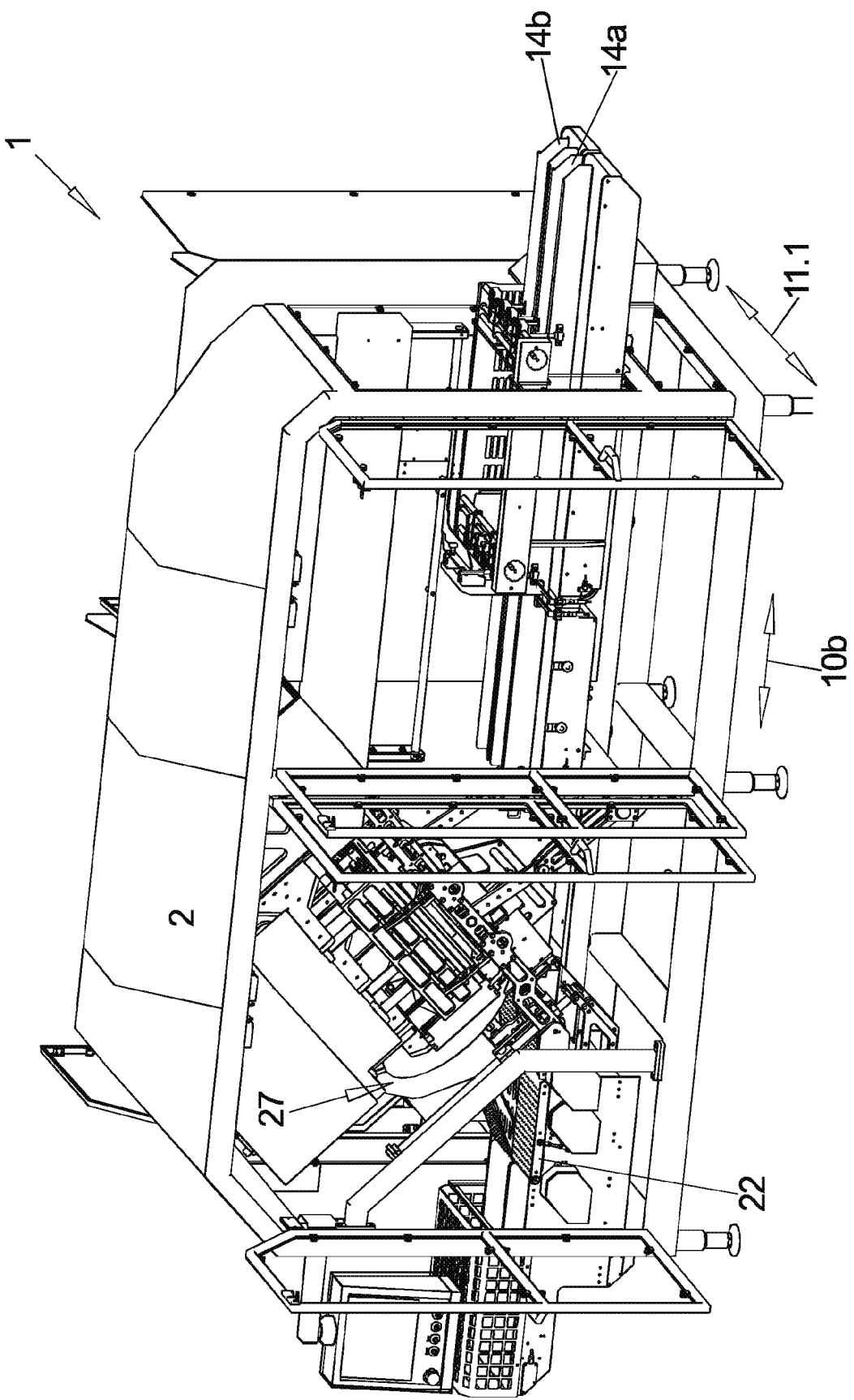
FIG. 2A illustrates the first embodiment of the cutting machine in the slicing position in different views.
Figure 2C:
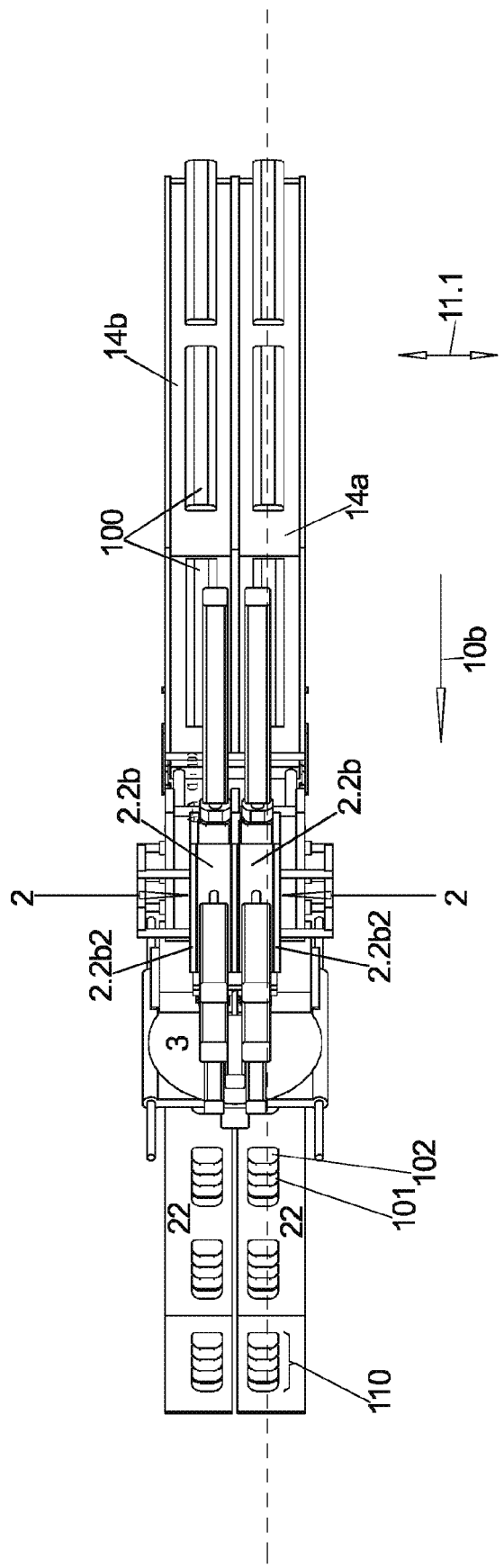
FIG. 2C illustrates the first embodiment of the cutting machine of FIG. 1A in the slicing position in a different view.

For this purpose the cutting machine 1 delivers meat strands to be sliced in a longitudinal direction 10*b*, the pass through direction on a respective feeder 14*a, b* of two parallel feeders that are adjacent to each other and separately drive able as evident from FIG. 2C. Thus the feeders 14*a, b* include side walls to prevent a lateral drop off of the elongated meat strands 100 extending on the feeder in the longitudinal direction 10*b*. instead of the separate feeders 14*a, b* that are arranged adjacent to each other also a single feeder can be used that is continuous in a first transversal direction 11.1, in particular divided by a center wall in two halves, however the two meat strands 100 can then not be fed on the two tracks of the single feeder 14*a* independently from each other. By removing a center wall an entire width of the feeder 14*h* can be used for very large meat strands 100.

Figure 1A:
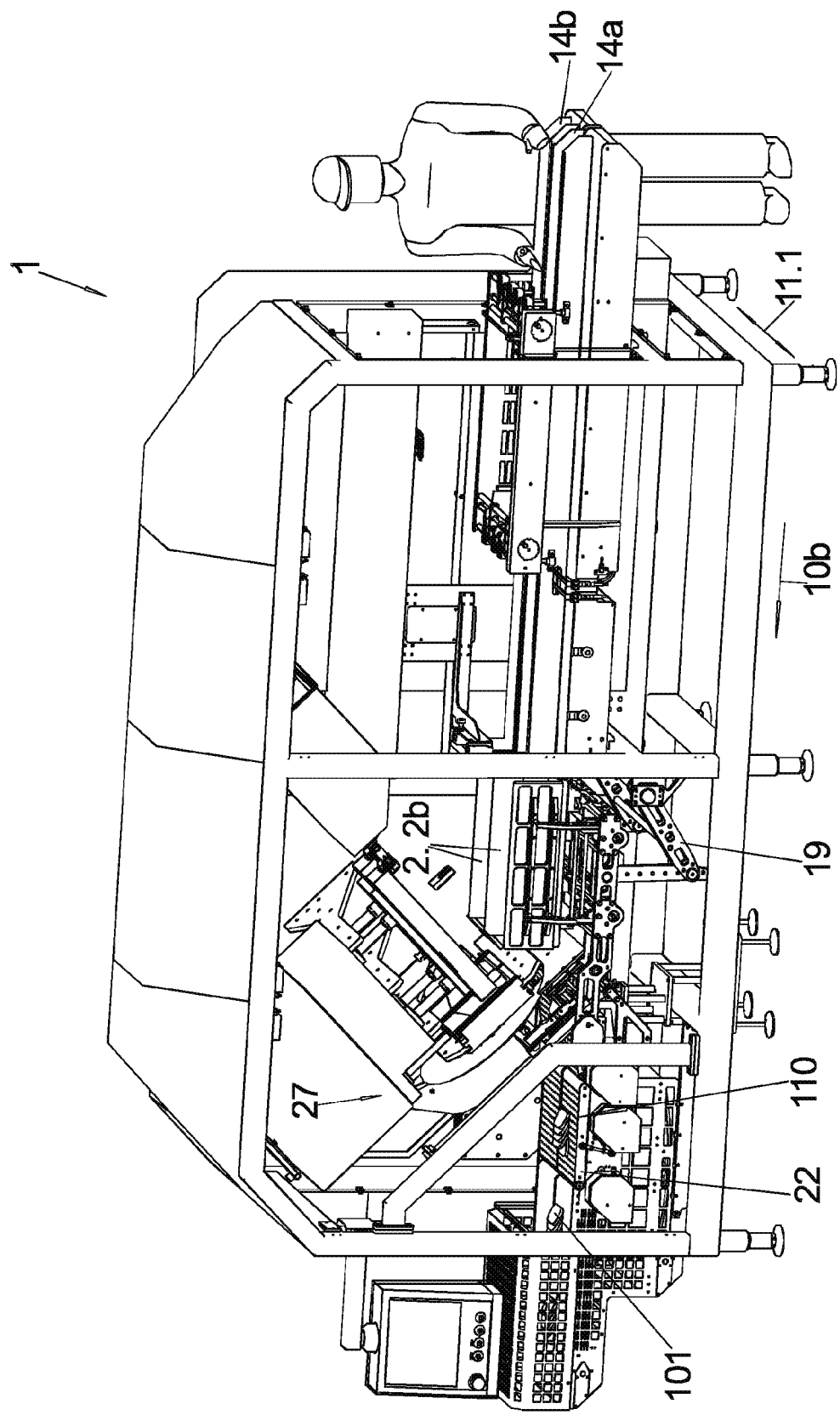
FIG. 1A illustrates a first embodiment of the cutting machine in a loading position in different view.
Figure 1B:
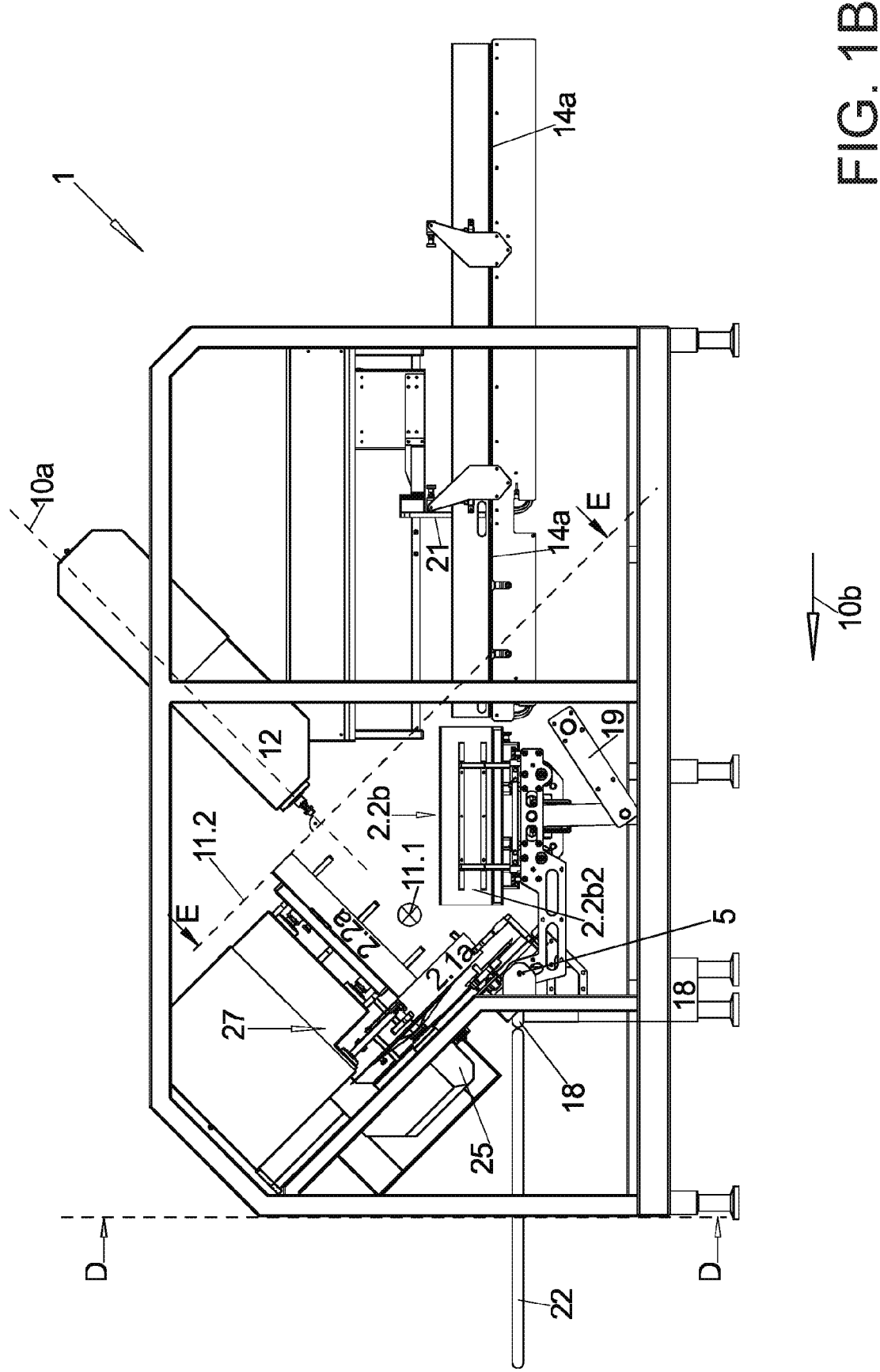
FIG. 1B illustrates the embodiment of the cutting machine of FIG. 1A in different view.

The two meat strands 100 are then inserted in alignment in the longitudinal direction 10*b* into a rear U-element 2.2*b* as illustrated in FIGS. 1A, 1B and 1C that is pivotably arranged in front of a front end of the respective feeder 14*a, b* wherein a U-formed cross section that extends in this pivot position, the loading position in the longitudinal direction 10*b* is open in an upward direction.

Since this insertion is not only possible by itself using the feeder 14 this is performed with support by an insertion device 21 which is moveable in the longitudinal direction 10*b* and reaches downward with each of its 2 downward oriented prongs respectively slightly above a top side of one of the two feeders 14*a, b* and presses against a rear end of a meat strand 100 arranged on the feeder and is configured to move the meat strand forward into a respective U-shaped component 2.2*b* either to a remove able stop provided at this location or better up to a predetermined position of the in feed device.

The respective U-shaped component 2.2*b* extending in the longitudinal direction 10 as a function of the operating position the compression direction 10*a* or the pass through direction 10*b* through the machine or a direction arranged there between forms part of one of two form tubes 2 arranged adjacent to each other which are made from plural form elements that are moveable relative to each other in at least one of the transversal directions 11. 1 and 11.2.

In the longitudinal pressing direction 10*a* of a meat strand through a form tube 2 the form tube 2 is made from a front form tube 2.1 that is in the front feed direction 10*a* and a rear form tube 2.2 (FIG. 2B) arranged there on in a rear in the feed direction.

The rear form tube 2.2 can even be changed by moving at least one of the form elements back and forth between a circumferentially closed condition and a circumferentially open condition.

Figure 3A:
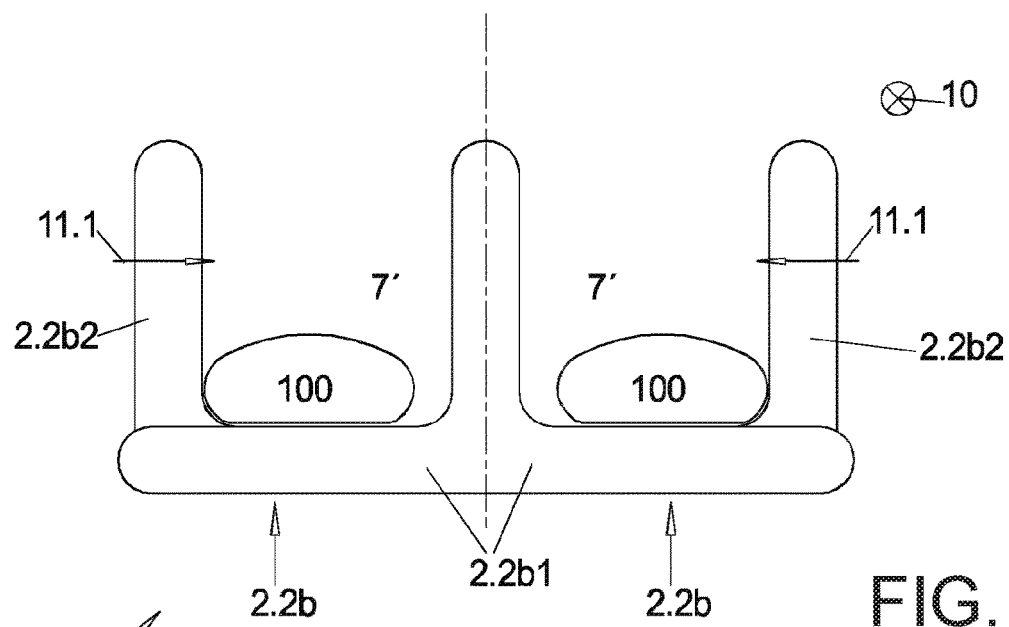
FIG. 3A illustrates a sectional view in the transversal direction through the rear form element during lifting from the loading position according to FIG. 1C.
Figure 3B:
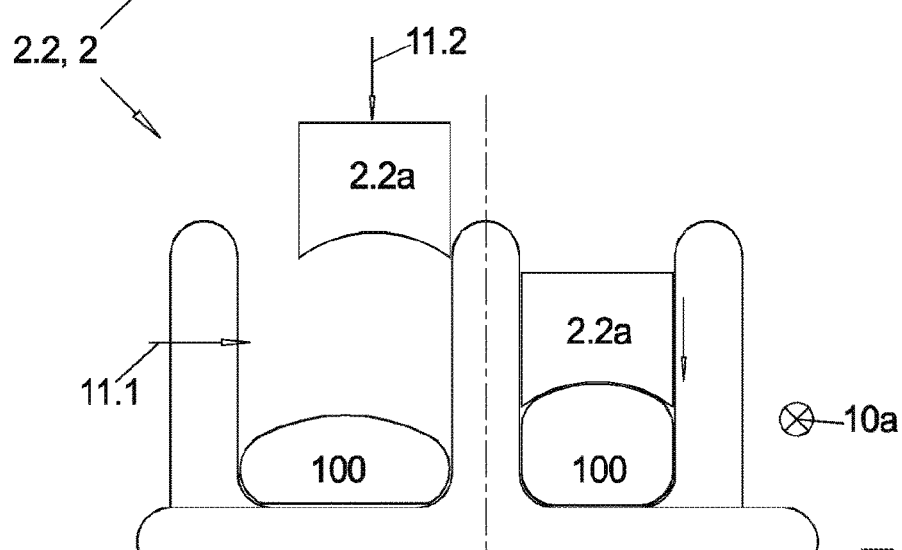
FIG. 3B illustrates a sectional view in the transversal direction through the rear form element during lifting from the loading position according to FIG. 1C.

As illustrated in the cross sectional representations of FIGS. 3A and 3B which are described in more detail infra for the rear form tubes 2.2 in open condition and in circumferentially closed condition each rear form tube 2.2 in the closed condition according to FIG. 3B right is essentially made from one of two adjacent upward open U-components 2.2*b* which have a common center wall and two transversal press plungers 2.2*a* precisely fitting into the width of the transversal openings according FIG. 3B right and insert able from above.

This circumferentially closed condition wherein the transversal press plungers do not only contact the meat strand 100 but also in part pressure thereupon, the so called second transversal compression which is performed in the second transversal direction 1.2 is achieved for the rear form tubes 2.2 in that the two rear U-shaped components 2.2*b* are jointed pivoted upward from the loading position in FIGS. 1A, 1B and 1C, FIG. 1C illustrates this in a longitudinal sectional view into the slicing position according to FIGS. 2A and 2B and thus the transversal pressing plungers 2.2*a* penetrate the respective rear U-component 2.2*b*.

As illustrated best in the side view of FIG. 2B. The 2 form tubes 2 extending in the view direction of FIG. 2B are arranged in parallel with each other in their circumferential closed condition, the slicing position, in a longitudinal pressing direction 10*a* arranged in a vertical longitudinal plane 10' but sloped from behind forward downward at a slant angle relative to the typically horizontal pass through direction 10*b*, the longitudinal direction of the cutting machine 1.

In this circumferentially closed slicing configuration of the form tube 2 according to FIGS. 2A and 2B the meat strand 100 resting in the respective form tube can be moved forward downward in the longitudinal pressing position 10*a*, using a respective longitudinal pressing plunger for inserted into the inner cross section 7' of the respective circumferentially closed form tube 2 precisely fitting and penetrating illustrated in FIG. 1C which is attached at a front end of the one of two parallel piston rods 12 which can be driven in a controlled manner in the longitudinal pressing direction 10*a* advantageously independently from each other.

Figure 1D:
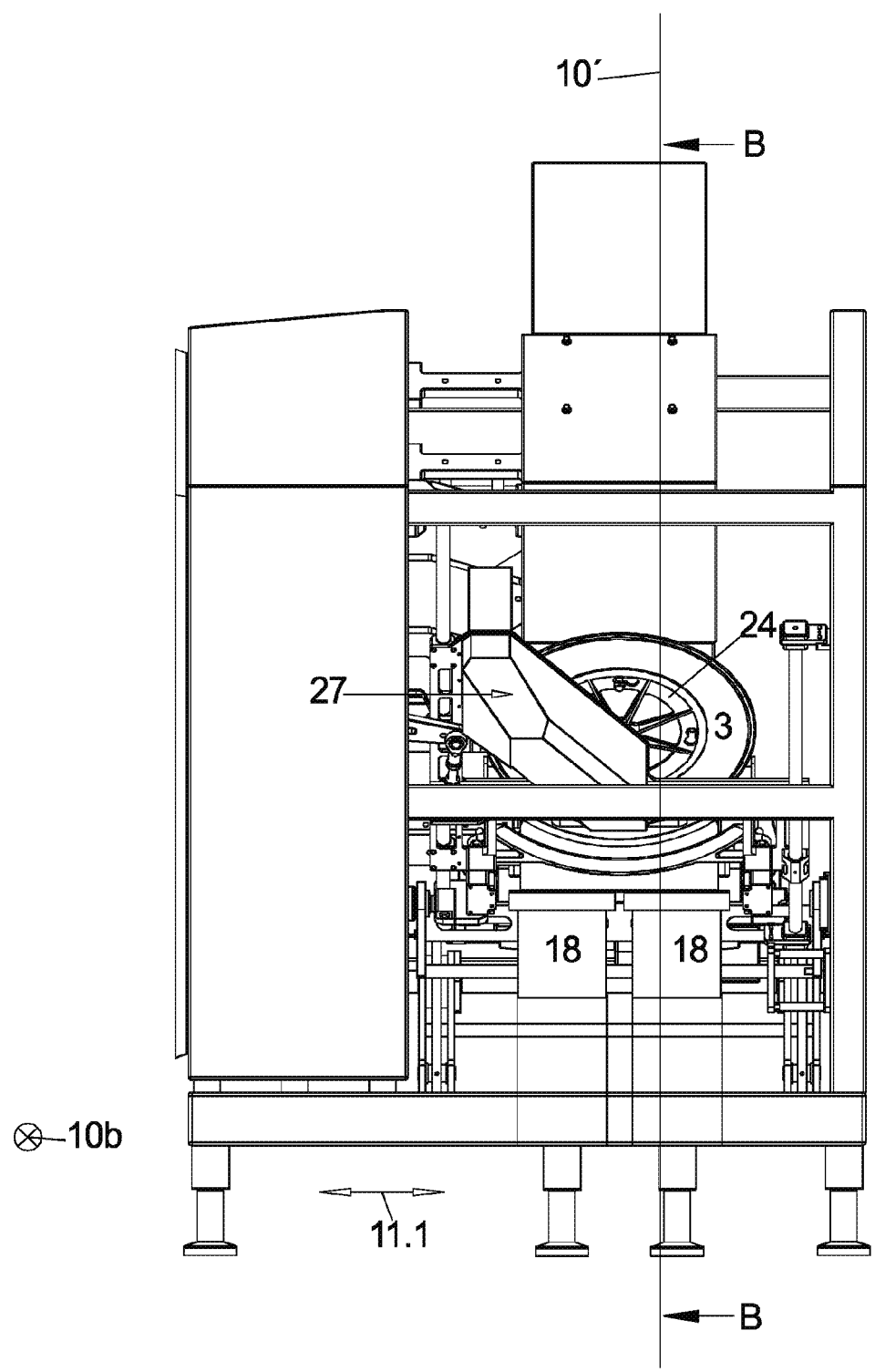
FIG. 1D illustrates the embodiment of the cutting machine of FIG. 1A in different view.
Figure 2D:
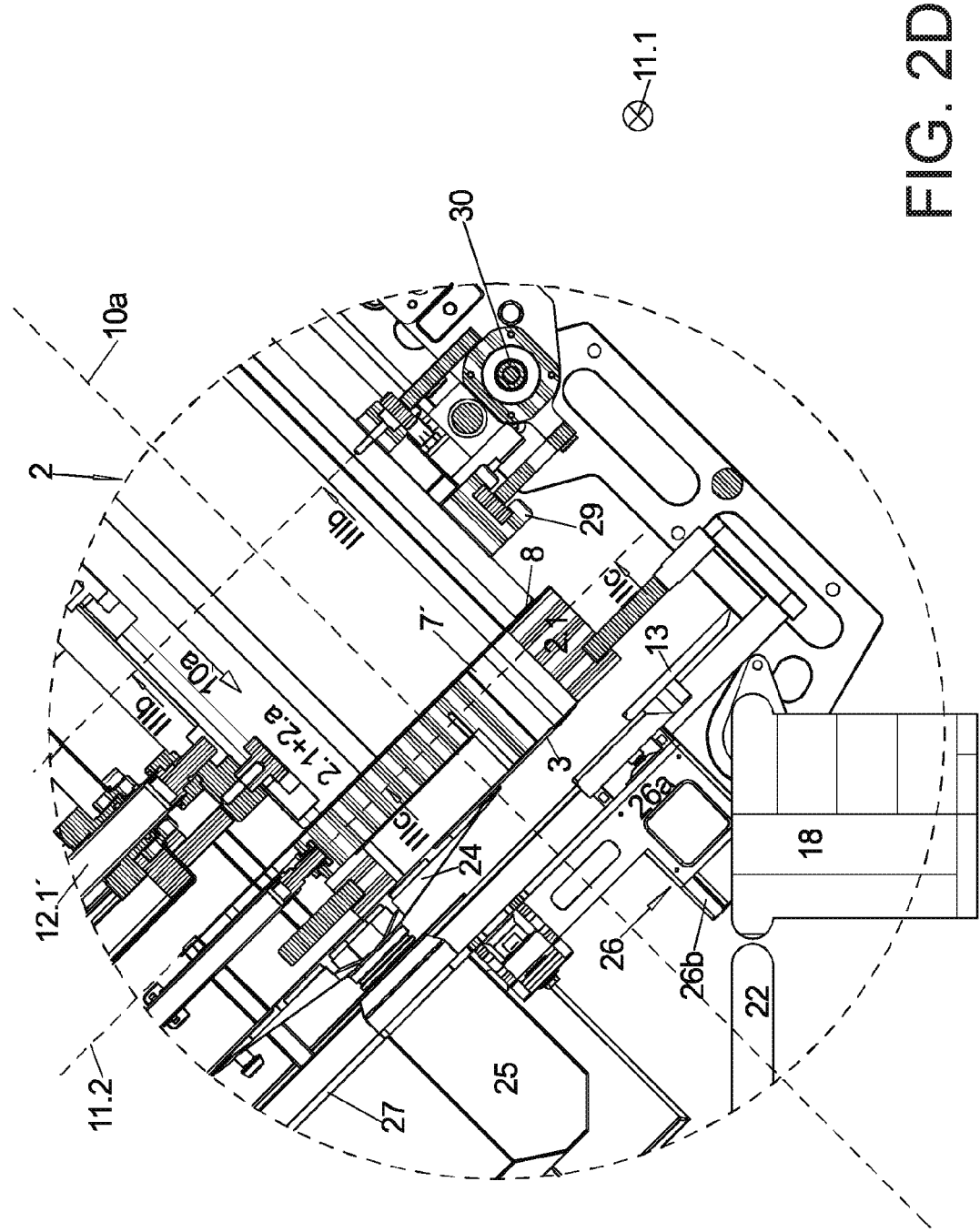
FIG. 2D illustrates the first embodiment of the cutting machine of FIG. 1A in the slicing position in a different view.
Figure 4A:
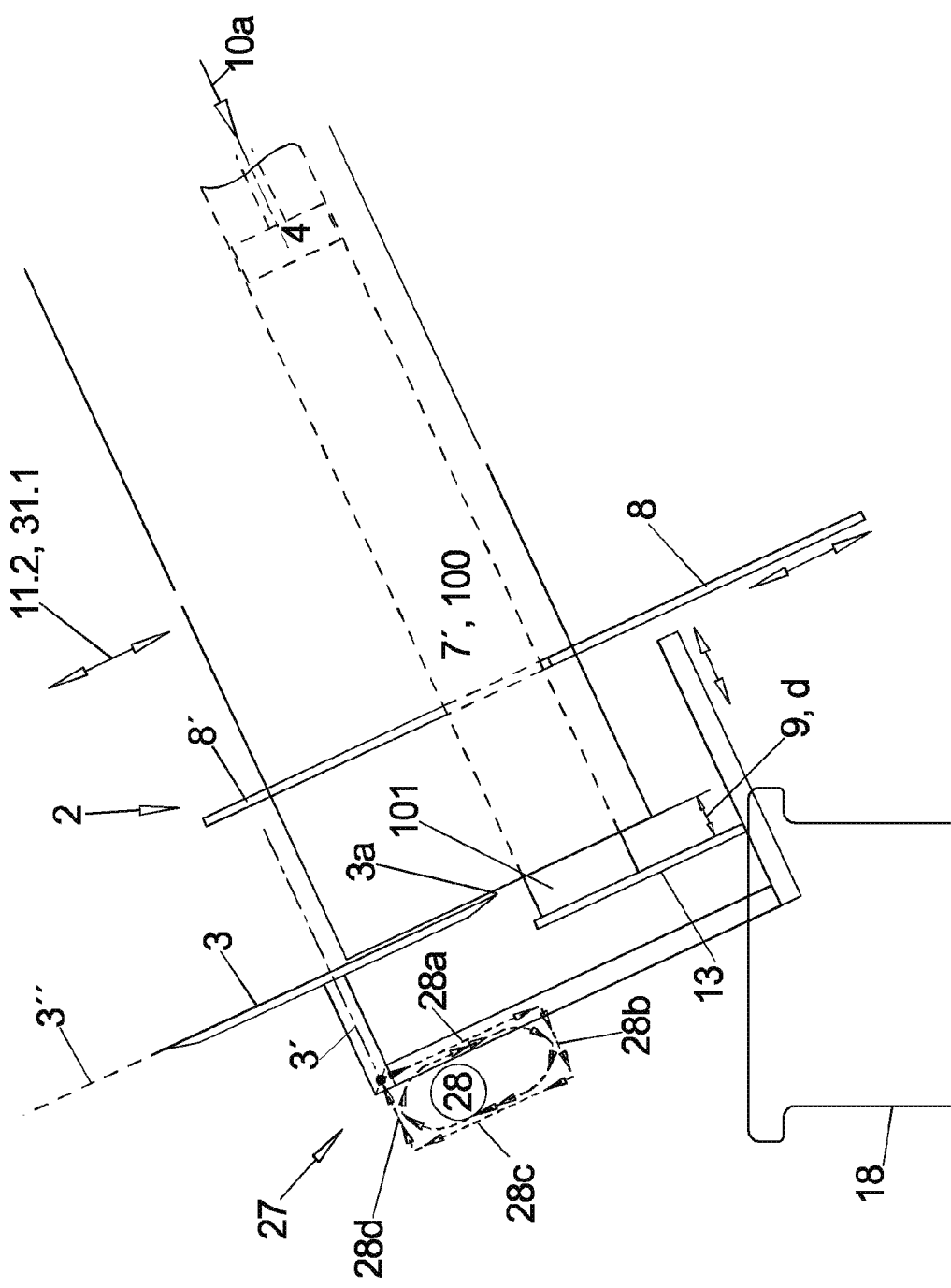
FIG. 4A illustrates an illustration in principle of a first cutting unit in different functional positions.
Figure 4B:
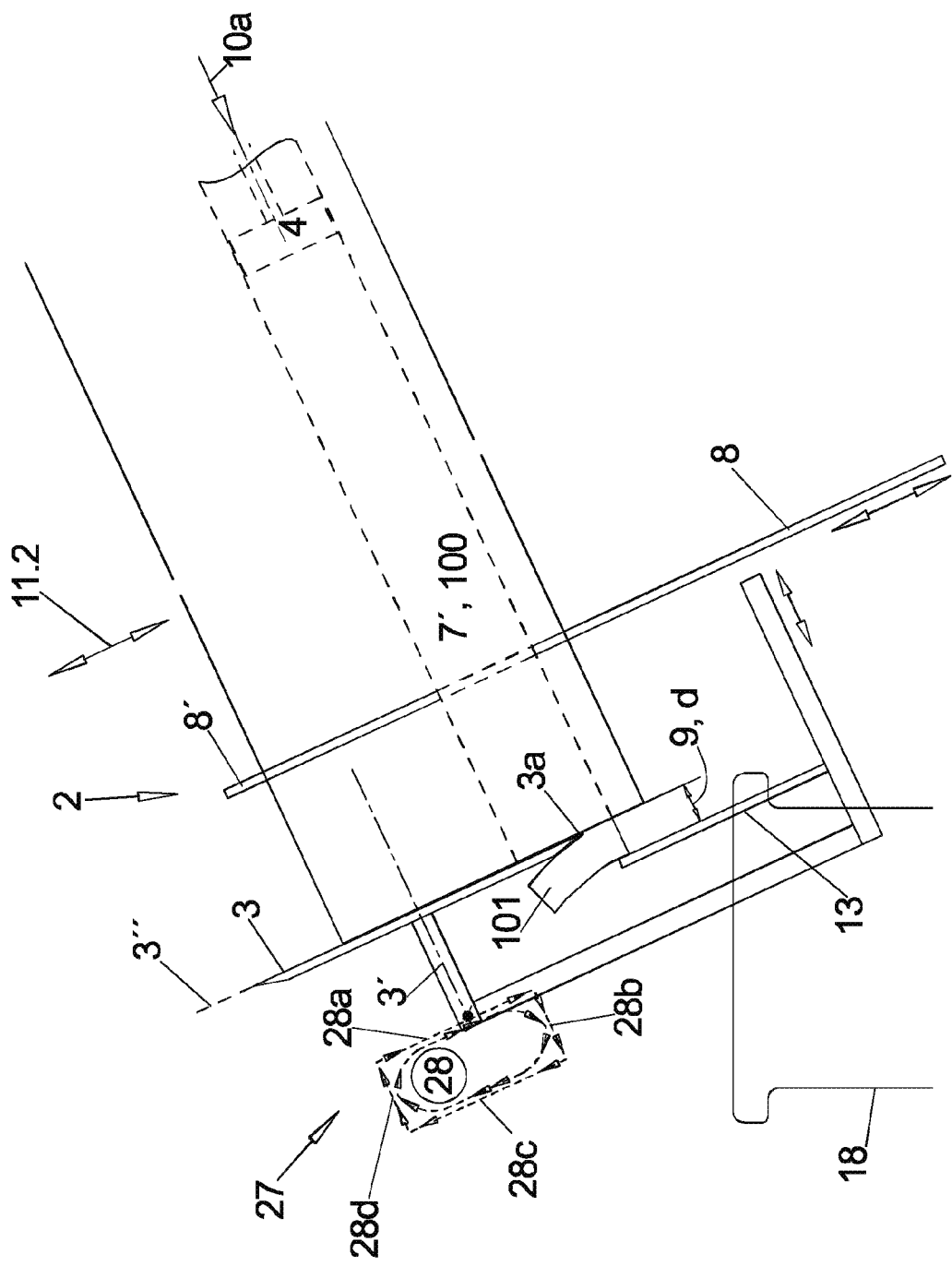
FIG. 4B illustrates an illustration in principle of a first cutting unit in different functional positions.

Each meat strand 100 is respectively pushed beyond a forward lower end of its form tube 2 for slicing into slices 101 until the meat strand contacts with its front face end at a stop plate 13 (FIG. 2D, FIGS. 4A and 4B). Then a blade 3 (FIGS. 4C, 7A, 7C1, 8A and 8B) which is wider than the two form tubes 2 that are arranged adjacent to each other can be used for respectively cutting off a slice 101, 102 from each of the two meat strands 100 in the two form tubes 2 by moving the rotating blade downward in the second transversal direction 1.2 directly before the front end of the two form tubes 2.

Thus, the adjusted distance in the longitudinal pressing direction 10*a* between the stop plate 13 and the blade 3 determines the thickness of the slice 101, 102.

The cut off slices 101, 102 respectively fall onto one of two weighing stations 18 arranged adjacent to the each other and are weighed at this location either individually or when the slices 101, 102 are to be combined into portions, the weight obtained after each new slice of the building portion 110 that remains on the weighing station 18 is weighed.

Subsequently the slice or the generated portion is transferred from the weighing station 18 whose top side is configured as a feeder transporting in the pass through direction 10b to an extraction conveyor arranged adjacent thereto in the downstream direction and extracted wherein these components are also advantageously provided separately for each track of the cutting machine adjacent to the cutting machine.

In order to reduce an idle time between slicing a first meat strand 100 and a second meat strand 100 that is to be cut up subsequently thereto each form tube 2 as recited supra is divided in the longitudinal pressing direction 10a into a front form tube 2.a and a rear form tube 2.2.

Both (FIGS. 3A-3C) viewed in the longitudinal pressing direction 10a include the recited upward open forward or rear U-component 2.1b or 2.2 b and the forward or rear press plunger 2.1a or 2.2a penetrating there in and compressing in the second transversal direction 11. 2.

In the front form tube 2.1 (FIG. 3C) the forward U-element 2.1 b always remains in position unchanged as one of the forward form elements 2.1a, b whereas the forward press plunger 2.1a also forming one of the form elements can move relative thereto in the second transversal direction 11.2.

The latter also applies for the rear form tube 2.2. but here additionally as illustrated in FIGS. 1A and 1B the rear U-element 2.2b as one of the rear form elements 2.2a, 2.2b is additionally remove able downward from the rear transversal press plunger 2.2a far enough so that the 2 components are completely disengaged in the second transversal direction 11.2 which is typically not possible for the front form tube 2.1.

For the first configuration according to FIGS. 1A-1E, 2A-2D, 3A-3C, 4A-4D and 5A-5I and 5K-5N for this purpose the rear U-component 2.2b is pivoted downward about a rear pivot axis 5 extending in the first transversal direction 11.1 so that the rear form tubes 2.2 are now in the circumferentially open loading position as described supra.

Between the rear form tube 2.2 and the front form tube 2.1 an intermediate plate is arranged that is move able into an orthogonal plane to the longitudinal pressing direction 10a, which is best visible in FIG. 2D and which is advantageously arranged at the rear end of the forward U-components 2.1.

As soon as the meat strands 100 arranged in the closed form tubes 2 in the slicing position are mostly sliced up and remaining rear ends of the meat strand 100 are only arranged in the longitudinal portion of the front form tube 2.1 and are moved further forward therein by the longitudinal press plunger 4 and sliced up the rear U-components 2.2b of the rear form tubes 2.2 typically connected with each other by a center wall can be increased in width and pivoted down into the loading position. From the feeders 14a, b the next two meat strands 100 to be sliced can be moved by the insertion device 21 into the rear elements 2.2b pivoted downward into an aligned position relative to the feeders 14a, b in order to reduce a loading time when switching to the next meat strands 100 during slicing.

The goal to cut off slices 101, 102 with a pre-determined target weight from a meat strand 100 with uneven cross section can only be achieved when a volume of the meat slice is controllable.

For this purpose on the one hand side a slice thickness d is adjusted in a defined manner by adjusting a distance 9 of the stop plate 13 relative to the blade 3 during cutting a slice 101.

The side view of FIGS. 4A-4C of a first embodiment of a cutting unit shows, in particular FIG. 4A that the stop plate 13 is adjustable for this purpose in the axial direction 10a and/or in the first transversal direction relative to the blade 3 and the blade plane 3' which is defined by a contact surface of the blade 3 that is oriented towards the cutting material wherein a cutting edge 3a of the blade 3 is in the blade plane 3' when the blade 3 is only ground at a side that is oriented away from the contact surface.

When the blade 3 is moved for cutting off a slice 101 from its starting position according to FIG. 4A in the first blade transversal direction 31.1, herein the second transversal direction 11.2 of the machine in a cutting movement 28a in a downward slanted direction over the free inner cross section 7' of the two form tubes 2. The stop plate 13 which is combined with the blade 3 in a cutting unit 27 moves together with the blade 3 in the first blade transversal direction 31.1, here in the second transversal direction 11.2 so that the increasingly cut off slice 101 can exit through the gap there between according to FIG. 4B and drops after complete cut off onto the weighing station 18 or a extraction conveyor 22 arranged instead at this location.

In order to further reduce charging time the blade 3 additionally after cutting off a respective slice 101 thus running over the inner corresponding section 7' of the at least one form tube 2 lifts off in the feed direction 10a in a lift off movement 28b from the forward face of the front form tube 2.1 where it has moved along for cutting off the slices 101 in a contacting manner or with a very small distance and subsequently or simultaneously with this lift off movement 28b commences a return movement 28c whose end is illustrated in FIG. 4C in the second transversal direction 11.2 against the cutting movement 28a.

Subsequently the blade 3 returns by a reset movement 28d against the feed direction 10a to the starting position of the cut off process as clearly evident from FIGS. 4A-4C based on an orientation point designated at the blade axis 3'.

Viewed in the first transversal direction 11.1 thus the blade 3 caused by an indicated lift off device 28 performs an orbit able movement in a rectangular or lenticular shape.

The stop plate 13 however neither performs the axial lift off movement 28b or the reset movement 28d of the blade 3 but only performs its cutting movement 28a and the return movement 28c thus always remains in the same axial position in the cut off process of a slice. Only between the cut off processes the axial position of the cutting plate 13 will be changed now and then in order to vary the thickness of the slices 101 to be produced.

The cutting unit 27 is prevented so that during the first cutting process the stop plate 13 is only firmly coupled with the blade 3 in the second transversal direction 11.2.

Figure 4D:
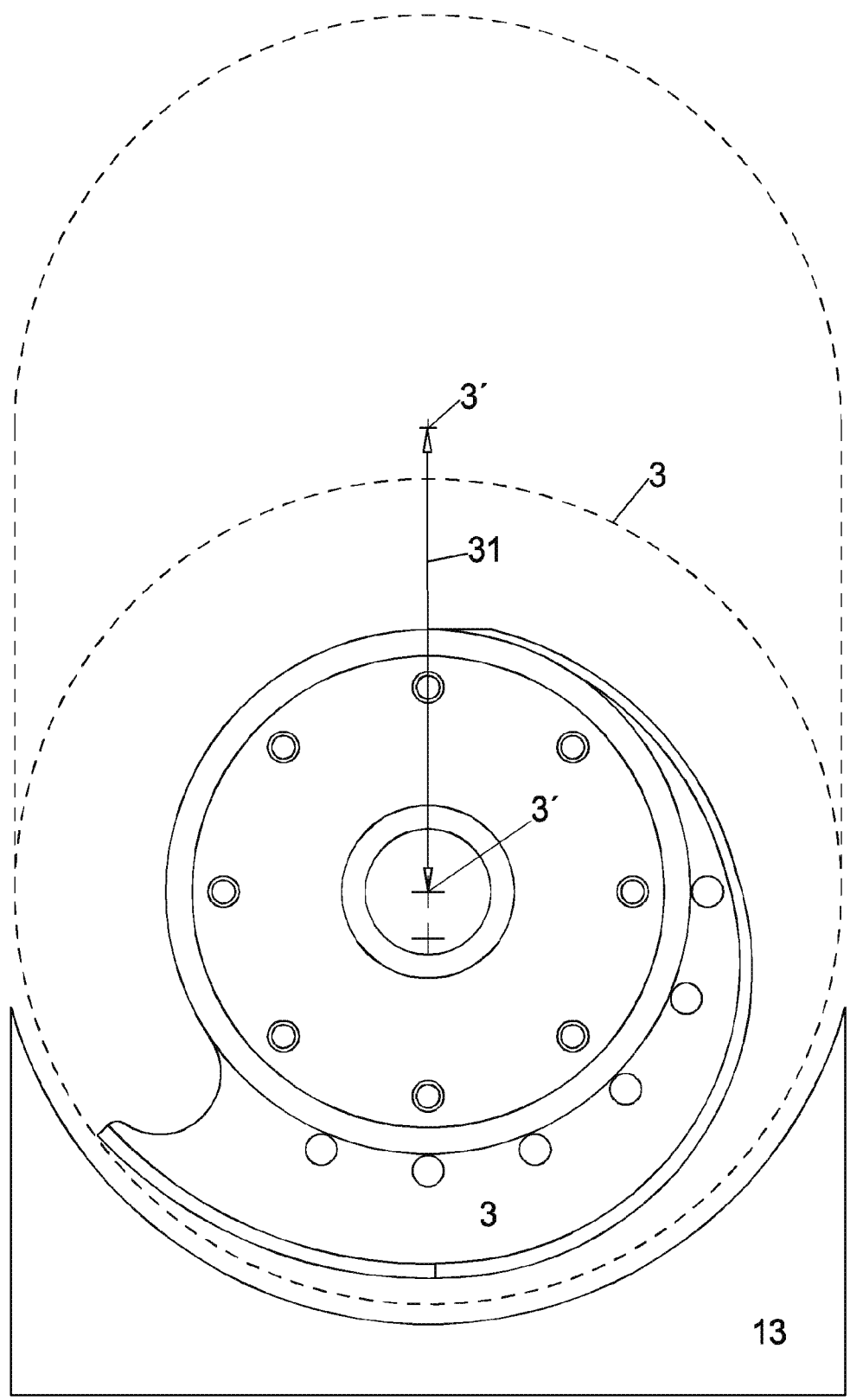
FIG. 4C illustrates an illustration in principle of a first cutting unit in different functional positions.

The contact in this second transversal direction 11. 2 between the blade axis 3' and the stop plate 13 is also adjustable since the gap viewed in the feed direction 10a between the flying circle 3* and the analogously concave forward edge of the contact plate 13 oriented towards the blade 3 as illustrated in FIG. 4D shall be advantageously additionally adjustable at the cutting unit 27 as a function of a thickness of the slices 101 to be produced.

Through this lift off movement 28b directly after cutting off a slice or a pair of slices moving the meat strands 100 forward can already begin even when viewed in the feed direction 10a in the second transversal direction 11.2 the blade 3 has not yet completely left the free inner cross section 7 of the form tubes 2.

In addition to the slice thickness in order to obtain a predetermined nominal weight and thus a nominal volume of the slices 101 also their surface area, thus transversal to the thickness must be known and controllable. For this purpose compressing the elastic meat strand 100 is used in a form tube 2 before slicing the meat strand, wherein the compressing forms a defined cross section.

When the form tube 2 which is defined circumferentially by the form tube components and also in the longitudinal pressing direction 10*a* by intermediate plate 8 on the one hand side and also by the longitudinal press plunger 4 on the other hand side includes a defined inner free space 7 and the inner free space is completely filled by the meat strand 100 the cross section of the meat strand 100 is identical to an inner free cross section 7' of the form tube 2 and thus the surface of the slice 101, 102 to be cut off as well as the volume and thus also the weight of the cut off slice as long as the thickness is known or can be controlled even when the slice contour moves back after the cut off.

In order for a provided inner defined free space to be filled completely in the form tube 2 by the elastic meat strand 100 that is unevenly shaped in the non-compressed condition the meat strand 100 has to be compressed in the form tube 2 so that no unfilled cavities remain in the form tube 2.

For this purpose the instant meat strand 100 is compressed in both transversal directions 11. 1 and 11.2 as well as in the longitudinal pressing direction 10*a*.

According to FIGS. 3A and 3B the meat strand 100 is initially inserted according to FIGS. 1A-1C in the rear U-component 2.2 *b* of the rear form element 2.2 that is pivoted down into the loading position as described supra using the insertion device 21 in the pass through direction 10*b*. For this purpose the inner space of the rear U-shaped component 2.2 *b* has to have a greater width than the greatest occurring width of a still non deformed meat strand 100.

The two rear elements 2.2*b* have a common center wall which is used as a fixed side wall that is oriented towards the other rear form tube 2.2 wherein the fixed side wall is integrally configured together with a respective base of the rear form element 2.2 *b* as an angle element 2.2*b*1. Thus the two angle element 2.2*b*1 through the one piece configuration for both rear form tubes 2.2 jointly form an inverted T-shape component in cross section.

The respectively remaining inner free cross section 7' is approximately rectangular with rounded corners so that the elastic meat strand 100 can also easily apply to the corners which is the easier the more rounded the corners are.

For this purpose inner corners of the cross section of the U-shaped components 2.2 *b* are rounded and the transversal press plungers 2.2*a* have an approximately triangular protrusion at their longitudinal edges of the free face wherein the protrusion protrudes forward and has a hypotenuse that is circular arc shaped concave and oriented towards the inner free cross section 7'.

The outer side wall for each form tube 2 is configured in the first transversal direction 11.1 move able relative to the angular element or T-element 2.2*b*1 as a transversal pressing wall 2.2*b*2 and moveable with its lower narrow side closely along the top side of the horizontal arm of the respective angular element 2.2*b*1 towards the center wall or away from the center wall.

For inserting a new meat strand 100 the transversal pressing wall 2.2*b*2 is moved to a maximum distance from the center wall in outward direction wherein the transversal pressing wall still rests on a top side of the angle element 2.2*b*1 (FIG. 3A).

Thereafter the transversal pressing wall 2.2*b*2 is moved in a direction towards the center wall (FIG. 3*b* left) up to a defined end width of the inner space of the U-component 2.2*b*(FIG. 3B right). Thus the meat strand 100 inserted there in possibly goes through a first transversal compression to a defined width in the first transversal direction 11.1.

The inward movement of the transversal pressing walls 2.2*b*2 to a defined end width of the U-element 2.2*b* is necessary since during subsequent upward pivoting the rear U-elements 2.2*b*, the rear transversal press plungers 2.2*a* always remaining in the slanted position relative to the pass through direction 10*b* have a defined width and thus during penetrating into the U-components 2.2*b* which represents the second transversal compressing in particular when the at least one transversal press plunger 2.2 after penetrating are additionally moved forward against the components 2.2*b* during penetrating shall close their top side.

After pivoting up the rear components 2.2*b* which is possible in this case due to the one piece T-element only for both form tubes 2 together with the rear U-components 2.2*b* that are separately configured for each form tube 2 and angle elements 2.2*b*1 would also be possible separately and independently from each other with the new meat strand 100 respectively inserted therein is certainly only possible after the previously sliced meat strand 100 is sliced completely and the longitudinal press plunger 4 is pulled back against the longitudinal pressing direction 10*a* far enough so that it is arranged behind a rear end of the meat strand 100 when the meat strand 100 arranged in the respective U-element 2.2 during upward pivoting.

Advantageously the position of the rear end is determined in that the end position of the insert slide 21 which then has to be respectively provided and actuated separately for the two tracks, is determined relative to the respective U-component 2.2 *b* at an end of the insertion process of the new meat strand 100 so that the longitudinal press plunger 4 only has to be pulled back slightly behind this position in order to further reduce idle times.

By inserting the rear transversal press plunger 2.2*a* into the rear U-component 2.2*b* to a fixated pre-determined end position so that the free cross section corresponds to the surface of the inserted longitudinal press plunger 4 it is known together with the nominal width, the surface of the free inner cross section 7' of the respective form tube 2 is known and thus the cross section of the meat strand 100 in compressed condition so that slices 101, 102 of a defined and controlled volume can be cut off.

The longitudinal press plunger 4 can thus be replaced for this purpose as a function of a thickness of the meat strands 100 to be processed with another press plunger 4 with another cross section wherein the replacement is performed at the piston rod 12.

In order to facilitate complete filling of the inner free space 7 of each form tube 2 during compressing with the material of the meat strand 100 the free inner cross section 7' in spite of the rectangular shape or trapezoid shape with two opposite parallel extending inner surfaces has rather strongly rounded inner corners.

At the one piece angle element 2.2*b*1 this rounded shape can already be provided during production, the other rounded shape is provided at the free lower downward oriented longitudinal edge of the transversal pressing wall 2.2*b*2 from which a protrusion 17 protrudes in ward from an inward oriented side surface wherein the protrusion is shaped as an advantageously right angle triangle with an hypotenuse that is configured concave as a quarter circle.

The same protrusions 17 are provided at the lower longitudinal edges of the transversal press plunger 2.2*a*.

The described first transversal compression of the meat strand 100 in the first transversal pressing direction 11.1 can also be performed in a transversal pressing tub that is arranged immediately in front of the rear form tube 2.2 in a loading position of the rear form tube 2.2 instead of being directly provided in the rear U-component 2.2b of the rear form tube 2.2.

The transversal pressing tub can either be configured as illustrated in FIGS. 3A and 3B or the base of the U-shaped components 2.2b can be formed by the in feed 14 so that only a fixed stable center wall and two transversal pressing walls can be provided on both sides of the center wall so that they are moveable towards the center wall or away from the center wall in the first transversal direction 11.1, wherein the transversal compressing walls compress the meat strand 100 in the first transversal pressing direction.

Then subsequently supported by the insertion slide 21 the meat strand 100 compressed in the first transversal pressing direction 11.1 is inserted into the U-component 2.2b of the rear form tube 2.2, whose cross sectional width of the u-shaped component then already corresponds to the nominal width. Thus the U-shaped component 2.2b of the rear form tube 2.2 can also be integrally configured in one piece.

In FIG. 1C the transversal supports 23 are visible under the base of the U-shaped component 2.2b along which the transversal pressing walls 2.2b2 are moved in the first transversal pressing direction 11.1.

Advantageously an intermediate plate 8 is arranged at the front end of the longitudinal pressing direction 10a of the rear U-shaped component 2.2b wherein the intermediate plate is moveable in the second transversal direction 11.2 relative to the form tube 2, either separately for each form tube 2 or continuous over the two form tubes 2 in the first transversal direction 11.1 wherein the intermediate plate after folding up the rear U-component 2.2b is then arranged in the longitudinal pressing direction 10a between the front form tube 2.1 and the rear form tube 2.2.

This intermediate plate 8 can be moved back and forth between a closing position closing the inner cross section 7' of the form tube 2 and an open position releasing the inner cross section 7'.

After pivoting the rear U-shaped component 2.2b into the slicing position by a scissor arrangement 19 the intermediate plate 8 is initially still in the closed position thus until the meat strand 100 resting in the rear form tube 2.2. and transversally compressed in the transversal direction 11.1 and 11.2 is then subsequently compressed by the longitudinal press plunger 4 also in the longitudinal pressing direction 10a wherein the intermediate plate 8 is used as a stop in the longitudinal pressing direction 10a. Since the intermediate plate is supported downstream by the front form tube 2.1 it can be configured very thin.

The longitudinal compressing thus forward movement of the longitudinal press plunger 4 by the driven piston rod 12 is performed until a defined pressing force is reached so that determining the end position of the longitudinal press plunger 4 by a non-illustrated position sensor determines a distance of the longitudinal press plunger 4 from the intermediate plate 8 and thus the entire volume of the meat strand 100 so that it can be calculated in advance how many slices of a defined volume thus with a defined thickness can be sliced there from. For, if the actual end position of the longitudinal press plunger does not coincide with a previously expected target position, at least the deviation from the same is known in the form of the reached end position, and it can be taken into account in the calculation. Namely within particular limits also the longitudinal press plunger which can be configured in two pieces in the extension in the longitudinal transversal direction can be configured variable.

Since the two parallel inserted meat strands 100 are never identical with respect to its volume and shape the lengths of the completely compressed meat strands 100 and thus also the number of identical slices (101, 102) that are obtainable there form are different for the two meat strands 100 and for example one of the two meat strands 100 will exit the longitudinal portion of its rear form tube 2.2 earlier during slicing.

When the U-shaped components 2.2 b for the two form tubes 2 are configured separately the U-component 2.2b can be pivoted downward by the scissor arrangement 19 earlier. By the same token the longitudinal press plunger of the meat strand 100 out of the two meat strands that is sliced up completely earlier can be moved back in to its pulled back condition earlier.

Though the stop plates 13 maybe configured separate and independently from each other and their distance also from a common blade 3 thus with respect to the sliced thickness to be obtained are adjustable independently from each other slices 101, 102 with different thickness can be produced on both tracks of the cutting machine 1 thus from the two form tubes 2.

After the longitudinal compression has been performed thus the respective longitudinal press plunger 4 has reached its nominal pressing force the intermediate plate 8 is moved in the transversal direction from the closed position into the open position by an intermediate plate drive.

Depending on the thickness of the intermediate plate 8 thus a gap created in the feed direction 10a between the front form tube 2.1 and the rear form tube 2.2 can be closed by inserting a fill plate 8' according to FIGS. 4A-4C which fill plate has the same axial thickness as the intermediate plate 8 but a pass through opening that is large enough and continuous in the axial direction so that in a completely inserted condition of the fill plate 8' an inner circumferential contour of the fill plate 8' is aligned with the inner circumferential contour of the form tube 2.

The longitudinal press plunger 4 is moved further forward into the rear form tube 2.2 and thus the front end of the meat strand 100 received there in is moved forward into the front form tube 2.1 and through the front form tube until the meat strand 100 contacts the stop plate 13.

In a completely compressed configuration of the meat strand, the compression position of the form tube 2 the front form tube 2.1 has the same free inner cross section 7' as the rear form tube 2.2.

Figure 3C:
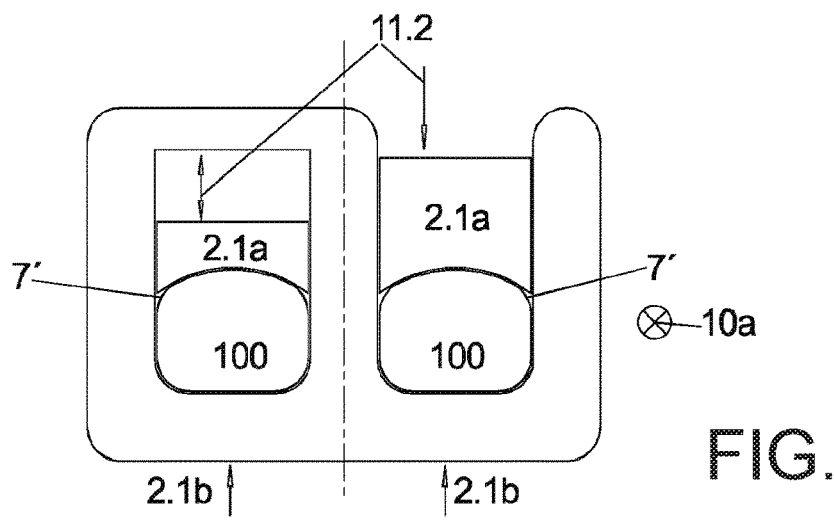
FIG. 3C illustrates a sectional view in a transversal direction through the front form element according to FIG. 2D.

As illustrated in FIG. 3C the first U-component 2.1b from the beginning and without change has a defined width in the transversal direction 11.1 corresponding to the rear U-component 2.2b in the already narrow, possibly compressed condition. Therefore no transversal compression wall is provided for the front form tube 2.1 but
either a one piece U-shaped component in cross section 2.1b per front form tube 2.1 and for the two adjacent front form tubes 2.1 and for the two adjacent front form tubes 2.1 for a common center wall a W-shaped component as illustrated in the right portion of FIG. 3C,
or an annular closed O-shaped component 2.1b for each form tube in which a front transversal press plunger is move ably supported as illustrated in the left portion of FIG. 3C.

Thus, the forward transversal press plunger 2.1a penetrates by the same amount into its forward U-shaped component like the rear press plunger 2.2a into its rear U-shaped component 2.2b. Therefore the forward and the rear transversal press plunger 2.1a and 2.2a can be integrally configured also for each form tube 2 in one piece and also moved together thus even over both form tubes 2 as a common press plunger unit as long as the same longitudinal press plunger 4 is used at both piston rods 12, thus with the same extension at least in the second transversal direction 11.2, advantageously with identical front surface area.

In the same view of FIG. 1D a sectional line along the line D-D of FIG. 1B the slanted circular disc shaped blade 3 is visible with its support plate 24 having a smaller diameter by comparison as well as the two individual weighing stations 18 arranged adjacent to each other.

FIG. 1B illustrates a vertical sectional view along the line B-B of FIG. 1D in the longitudinal direction 10b.

FIG. 1E illustrates in the feed direction 10a a cross section along the line E-E of FIG. 1B thus the cutting blade 3 is visible that is circular in this viewing direction and the front form tube 2.1 looking along its extension, thus the longitudinal pressing direction 10a and in particular the forward transversal press plunger 2.1a which is continuous in this case and which extends over the entire length of the form tube 2 and thus simultaneously also the rear transversal press plunger 2.2a. visible are furthermore the piston rod 12' which drive the two adjacent press plungers 2.1a and 2.2a respectively in the second transversal pressing direction 11.2 and the front ends of the two feed conveyors 14.a and 14.b.

The longitudinal sectional views of FIGS. 1C, 2B and 2D illustrate in particular in the enlarged view of FIG. 2D on the one hand side the cutting unit 27 with the blade 3 which moves directly along the forward face of the front form tube 2.1 in the second transversal direction 11.2 and which covers in the illustrated position the inner free cross section 7' and which is supported on a side oriented away from the form tube 2 by the cone shaped support plate 24 and which driven by a motor 25 to rotate.

The stop plate 13 is adjustable in the longitudinal pressing direction 10a with its axial distance to the blade 3, wherein it is visible that the stop plate 13 and the blade 3 advantageously do not overlap in the longitudinal pressing direction 10a.

Between the front form tube 2.1 and the rear form tube 2.2 in turn the intermediate plate is visible which is in this case attached at a rear face of the front form tube 2.1 including the drive of the intermediate plate 8.

In this embodiment an additional stop element is advantageously provided at the front end of the rear form tube wherein the additional stop element is not illustrated and closes an inner free cross section of the rear U-component 2.2b and is also move able in the transversal direction, for example provided as an end plate and a stop when inserting the meat strand 100 in the loading position.

After folding up the rear U-shaped portion 2.2b and before longitudinal compression the intermediate plate 8 is moved into a closing position closing the inner free cross section 7' and thus moves the end plate that is move able in the same plane and direction and advantageously equally thick out of the free inner cross section 7'.

FIG. 2D furthermore illustrates the adjustment device 26 for adjusting the distance 9 of the stop plate 13 to the blade 3 in the longitudinal pressing direction 10a.

The cutting unit 27 which carries the motor 25 and the support plate 24 with the blade 3 also includes a receiver 26a for the stop plate 13 which is configured along guides 26b which are configured at the receiver 26a to be adjusted in the longitudinal pressing direction 10a within the cutting unit 27 as described based on FIGS. 4A and 4B so that at least the blade 3, in particular the entire cutting unit 27 can perform an orbit able movement during each step in a side view in particular a rectangular movement.

FIGS. 5A-5I and 5K-5N illustrate different operating conditions of the cutting machine in a slightly perspective view with a vertical longitudinal cut along the line B-B of FIG. 1D. The cut is arranged in the viewing direction of FIG. 1B in the forward processing track, for example the feed device 14a but proximal to its rear end in this viewing direction.

Figure 5A:
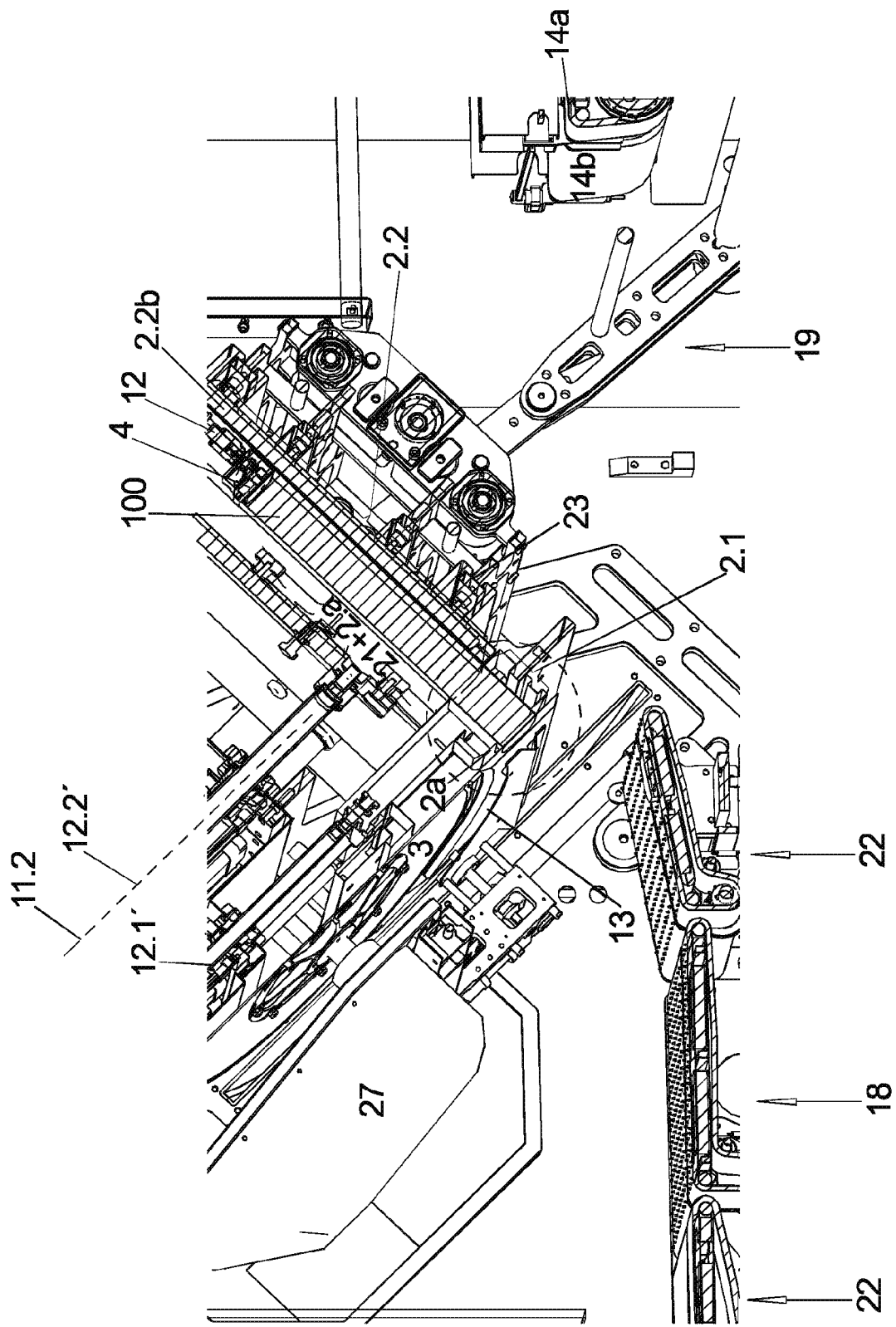
FIG. 5A illustrates different operating condition of the first embodiment respectively in a slightly perspective view.

FIG. 5A shows with respect to the form tube 2 the axial portion of the front form tube 2.1 and the rear form tube 2.2, wherein the transversal press plunger 2.1+2.a is continuous over an entire length of the front form tube and the rear form tube and which is loaded by plural piston rods 12.1', 12.2' in the second transversal direction 11.2. Out of these one piston rod 12.1' is in the portion of the front form tube 2.1.

The slices cut off from the blade 3 at the forward end of the form tube 2 drop onto a weighing station 18 which transfers the slices or also the portions after weighing onto a first extraction conveyor 22. According to FIG. 1B the weighing station 18 is not connected with the frame of the remaining cutting machine but sits on the ground in order to minimize a transmission of vibrations from the cutting machine into the weighing station 18.

FIG. 5A illustrates together with the detail enlargement in FIG. 5B for example a beginning of a cutting process (subsequently only illustrated for the form tube 2 illustrated in the sectional view and the corresponding processing track, parallel thereto the same process can run on the processing track arranged there behind wherein the blade 3 always cuts off a slice simultaneously for both form tubes wherein the meat strand 100 is pressed forward by the longitudinal press plunger 4 over the front end of the from tube 2 until it contacts the stop plate 13.

The blade 3 is still arranged completely above the form tube 2 or the two adjacent form tubes 2.

Figure 5B:
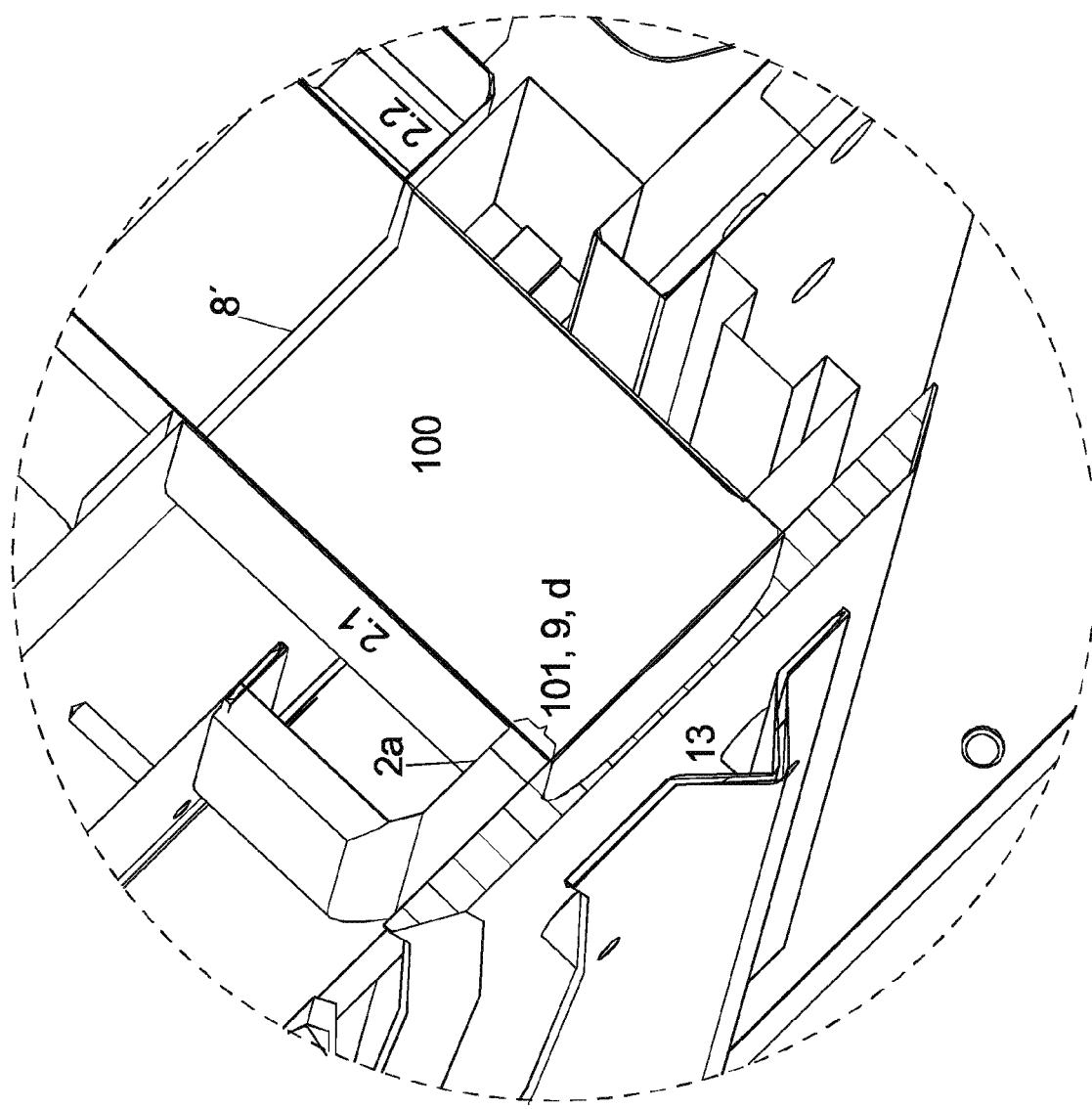
FIG. 5B illustrates different operating condition of the first embodiment respectively in a slightly perspective view.

FIG. 5B illustrates the distance 9 between the forward of the form tube 2 and the stop plate 13 which covers the free inner cross section of the form tubes and which simultaneously represents the distance 9 between the cutting edge of the blade 3 and the cutting plate 13 in turn in the axial direction.

Figure 5C:
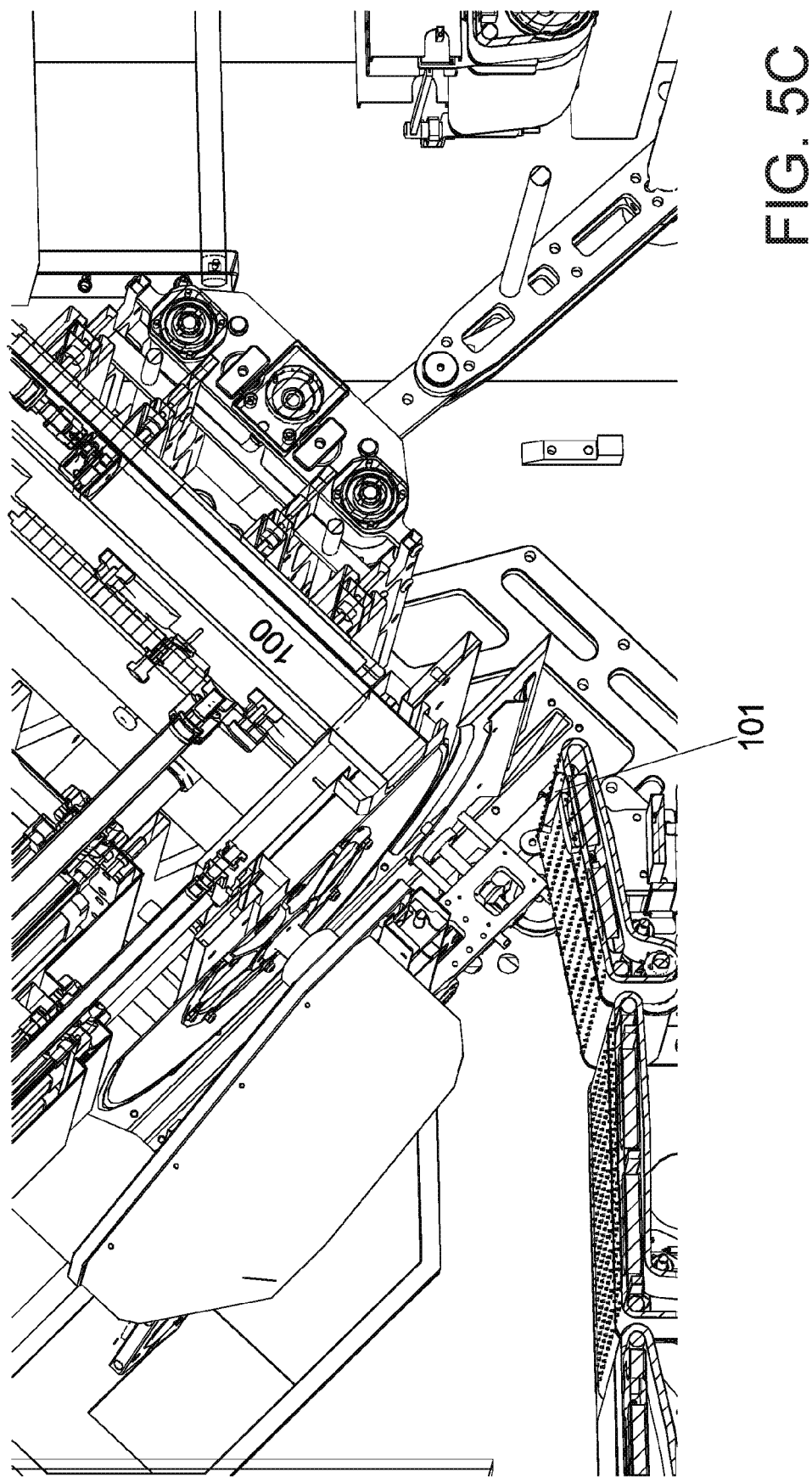
FIG. 5C illustrates different operating condition of the first embodiment respectively in a slightly perspective view.

After lowering the blade 3 the blade covers the free inner cross section of the two form tubes 2 and the cut off slices wherein FIG. 5C only illustrates the slice 101 that is cut off on the rear processing track, the cut off slices drop onto the first extraction conveyor 2 and can be transported and processed further as illustrated in FIG. 5C in a condition a few slices later. Thereafter the longitudinal press plunger 4 moves the meat strand 100 further forward with the stop plate 13 for cutting off the next slice.

FIG. 5D illustrates the condition where the meat strand 100 is cut up far enough so that it is only in the axial portion of the front form tube 2.1 and also the longitudinal press plunger 4 is already in the form tube 2.1.

As soon as this is the case the rear U-shaped component 2.2b of the rear form tube pivots using the scissor arrangement 19 about a pivot axis 5 that is better visible in FIG. 1C with its rear end downward while a rest of the meat strand 100 arranged in the front form tube 2.1 is cut up further until according to FIG. 5E that rear U-shaped portion 2.2b is aligned with respect to the bottom side of its inner space with the top side of the in feed conveyor 14a, b.

The transversal pressing walls 2.2b2 are thus run outward by maximum amount relative to the center wall of the angle element 2.2b1 c.f. FIGS. 3A, 3B, and 3C so that also the meat strands 100 moved up by the in feed conveyors 14a, b in FIG. 5F can be moved up in the pass through direction 10b directly in front of the rear end of the rear U-shaped element 2.2b and can be inserted in this direction by the insertion slide 21 with its two prongs engaging the rear ends of the meat strands 100, wherein the insertion is performed into the rear U-shaped components of the two form tubes 2 as illustrated in FIG. 5G.

In this condition a last left over of the meat strand 100 can be moved forward in the front form tube 2.1 by the longitudinal press plunger 4 and can be cut up further.

Figure 5K:
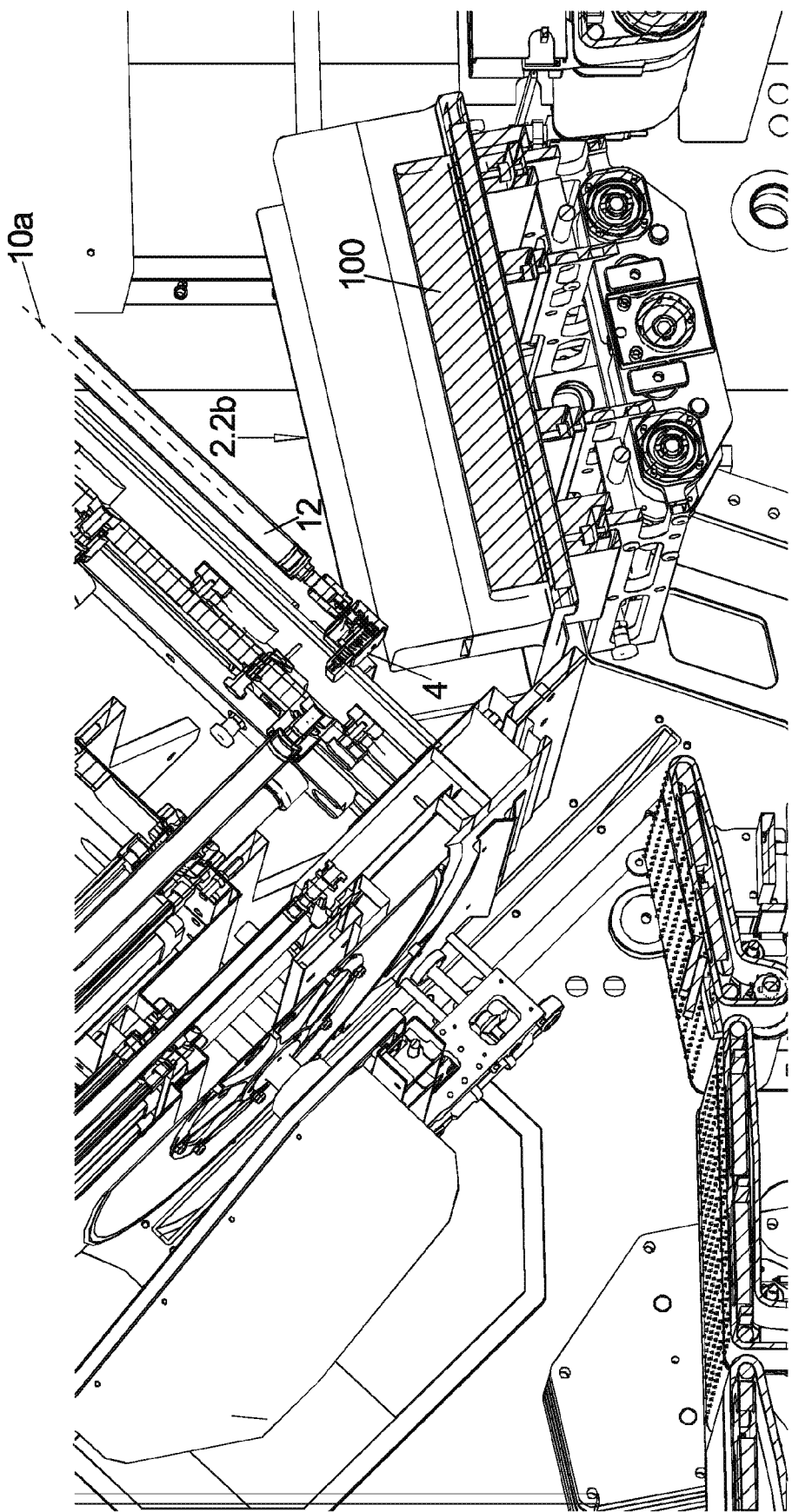
FIG. 5K illustrates different operating condition of the first embodiment respectively in a slightly perspective view.

As soon as the insertion slide 21 have moved out of the rear U-shaped components 2.2b against the feed direction 10b again according to FIG. 5H and in the front form tube 2.1 a lasts left over of the meat strand 100 is used up by slicing according to FIG. 5I, the following can be performed simultaneously:
on the one hand side according to FIGS. 5K, 5I the rear U-shaped components 2.2b can already be pivoted up again after or while the longitudinal press plunger 4 pulls back by the piston rod 12 against the longitudinal pressing direction 10a.

Figure 5M:
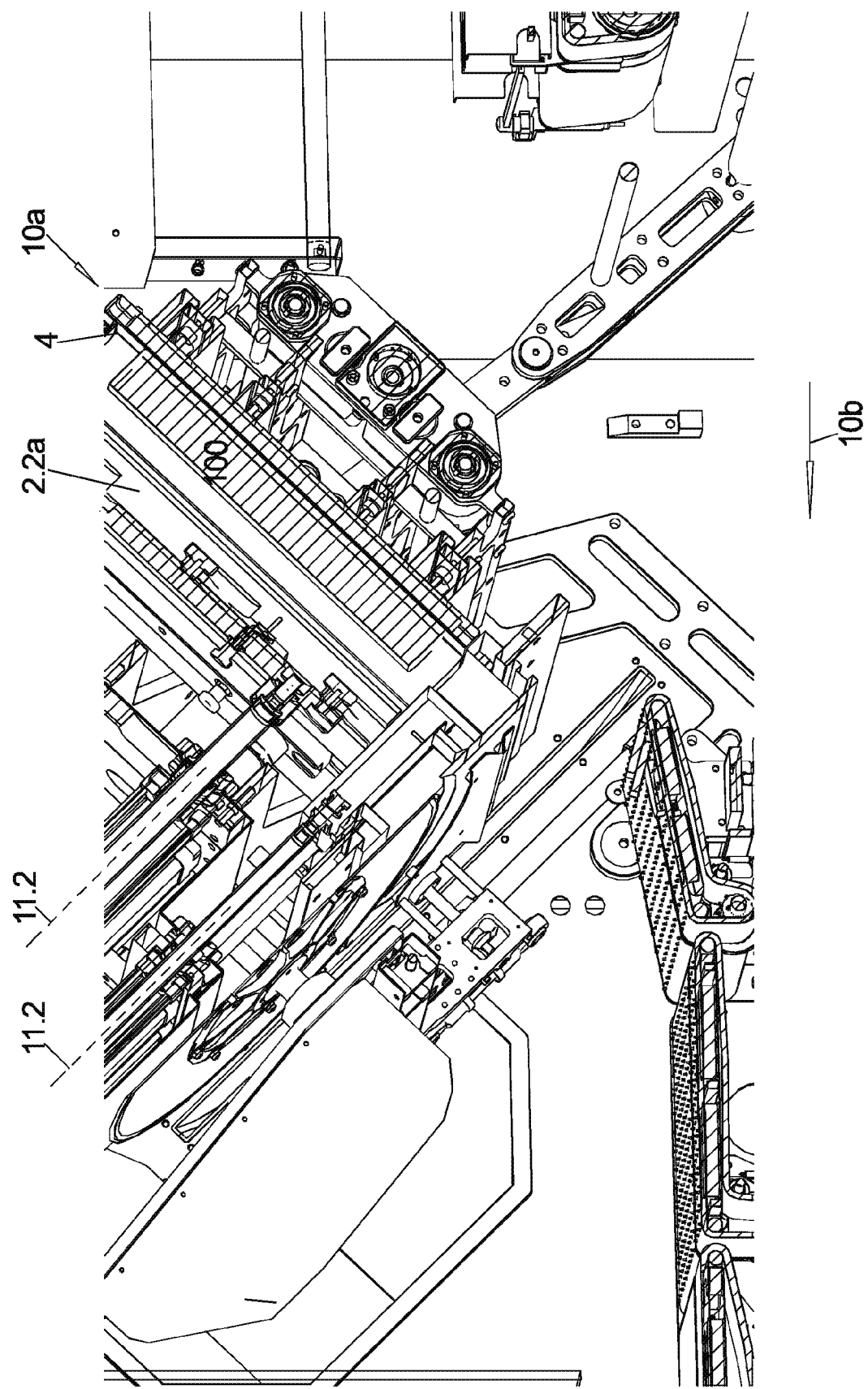
FIG. 5M illustrates different operating condition of the first embodiment respectively in a slightly perspective view.

In order to prevent collisions between the new meat strand 100 and the longitudinal press plunger 4 the longitudinal press plunger 4 has to be behind the rear ends of the meat strands 100 disposed in the rear U-shaped elements 2.2b after reaching the completely raised position as illustrated in FIG. 5M.

On the other hand side according to FIG. 5M also the rear transversal press plunger 2.2.a can be lifted from its pressing position in order to provide enough space and height, so that no transversal compression is performed in the second transversal direction 11.2 by pivoting the rear U-shaped components 2.2b upward.

This is performed after the rear U-shaped components 2.2b have reached their completely upward folded position according to FIG. 5N by moving the rear transversal press plunger 2.2a downward against the new meat strands 100.

After the new meat strands 100 are transversally compressed in the rear form tubes 2.2. in both transversal directions 11.1 and 11.2 and the rear form tubes 2.2 thus have the same free inner cross section has the front form tubes 22.1 can be performed by moving the longitudinal press plunger 4 forward in the longitudinal pressing direction 10a and subsequent slicing with the new meat strand 100 has commenced as described supra.

Figure 6A:
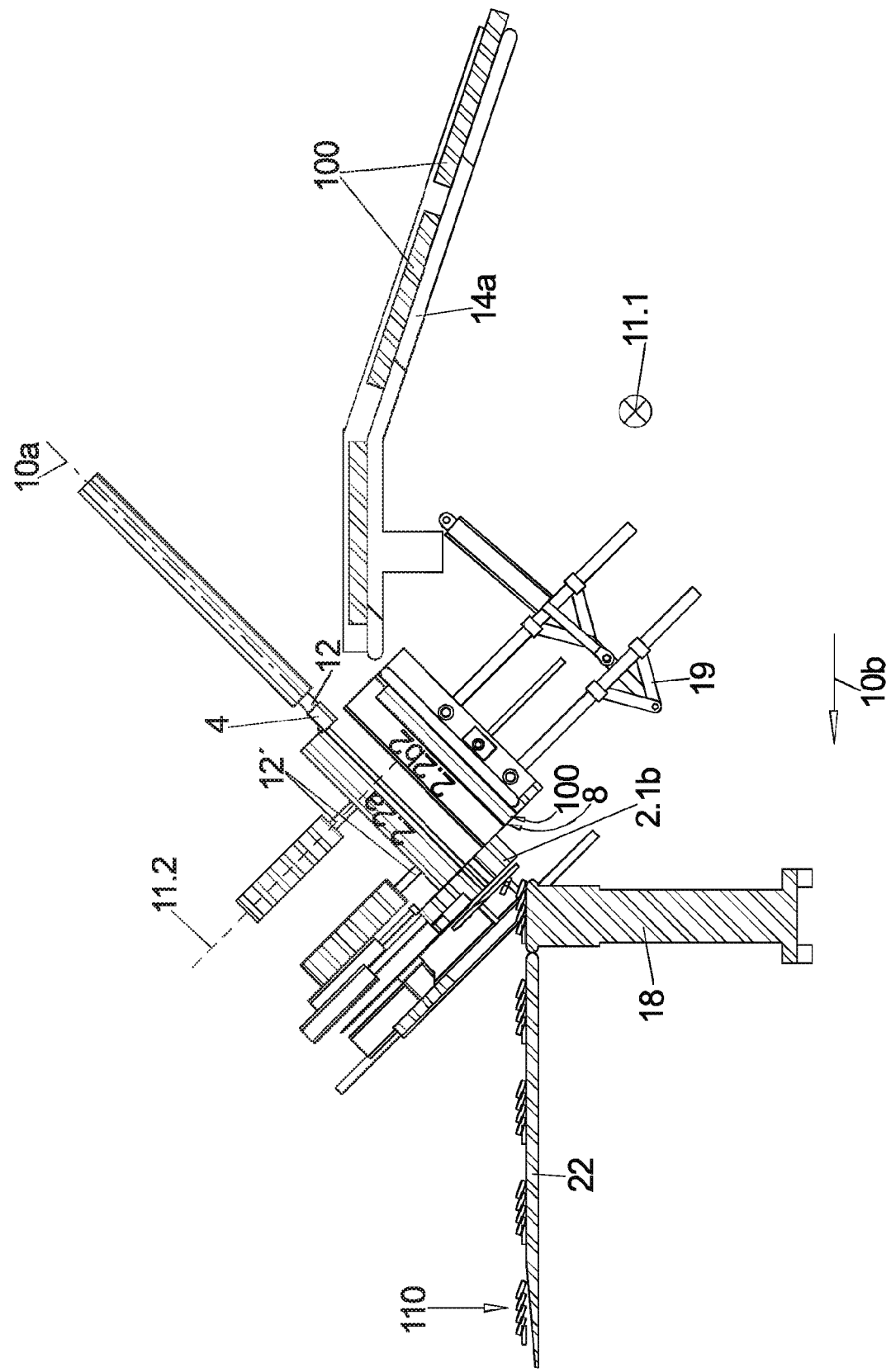
FIG. 6A illustrates a second embodiment of the cutting machine in the loading and slicing position.

A second embodiment of the cutting machine 1 that differs from FIGS. 1A-1E, 2A-2D, 3A-3C, 4A-4D, 5A-5I and 5K-5N is illustrated in FIGS. 6A and 6B with the two form tubes 2 arranged adjacent to each other in FIG. 6A in the loading position and in FIG. 6B in the slicing position. Also this embodiment can simultaneously process two respective meat strands 100 onto adjacent tracks.

The second embodiment differs from the embodiment of FIGS. 1A-1E, 2A-2D, 3A-3C, 4A-4D, 5A-5I and 5K-5N as follows:
On the one hand side in order to perform approaching and off-setting the rear U-shaped components 2.2b relative to the rear transversal press plunger 2.2a or the transversal press plunger 2.1+2.a extending over an entire axial length of the form tubes are moved apart or together. In the first transversal direction 11.1, wherein the two components keep their parallel alignment relative to each other in that in turn using the scissor rod arrangement 19 the rear U-shaped component 2.2b is offset from a remainder of the form tube 2, thus not by pivoting about a pivot axis, Thus each rear U-shaped component 2.2b extends forward downward also in the loading position illustrated in FIG. 6A with the consequence that a meat strand 100 that is moved towards a rear end by the in feed conveyor 14a, b and eventually protrudes beyond the front end of the conveyor 14a, b is tipped into the U-shaped component 2.2b and slides downward therein so that a separate in feed slide can be omitted.

For this purpose the in feed conveyor 14a,b has to move the meat strands 100 to a level of a rear end of the rear U-shaped component 2.2b that is in the loading position and can be configured not only horizontal at its front end but also slightly downward inclined in order to facilitate drop in.

Figure 7A:
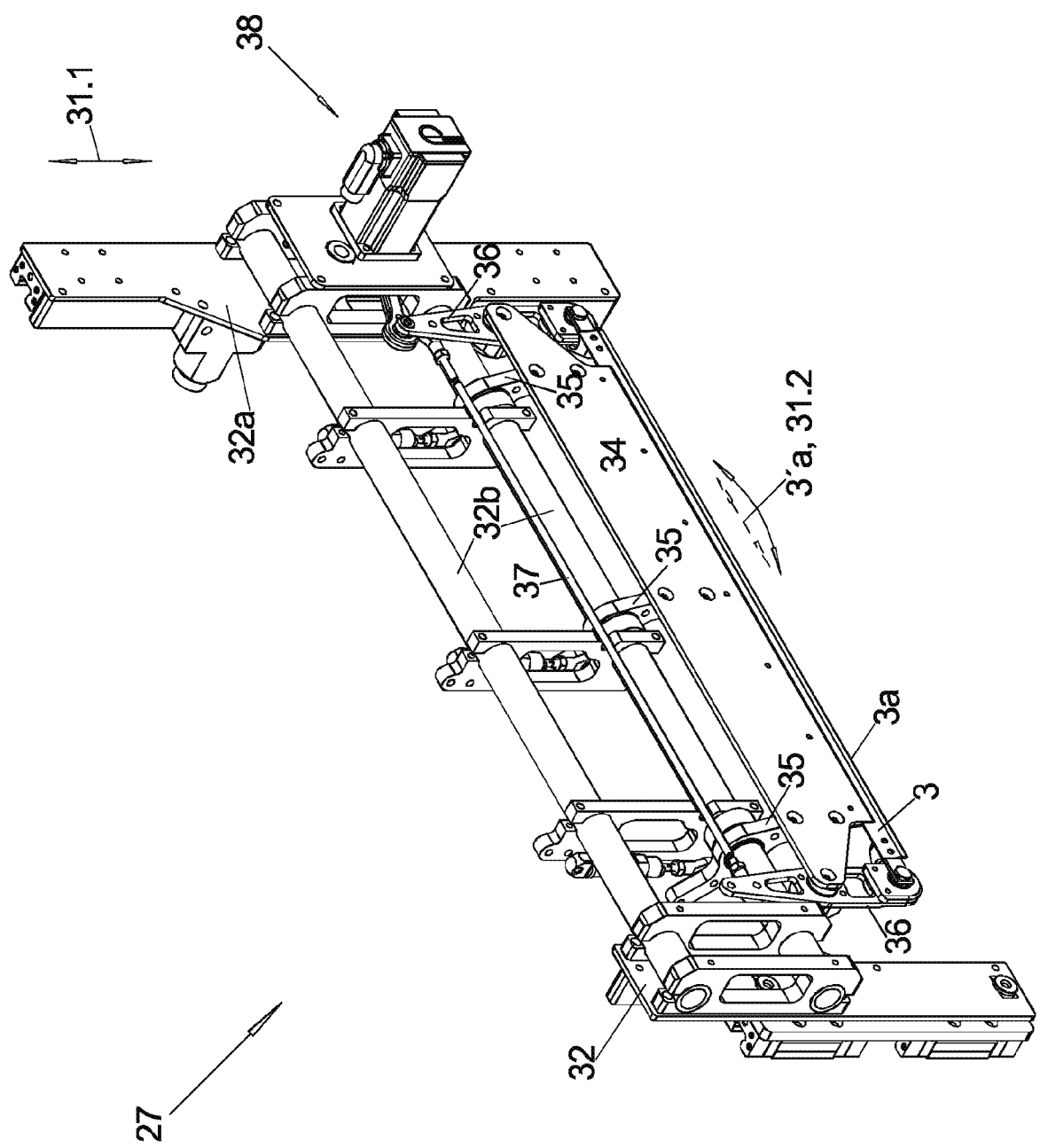
FIG. 7A illustrates a perspective view of a second cutting unit.
Figure 8A:
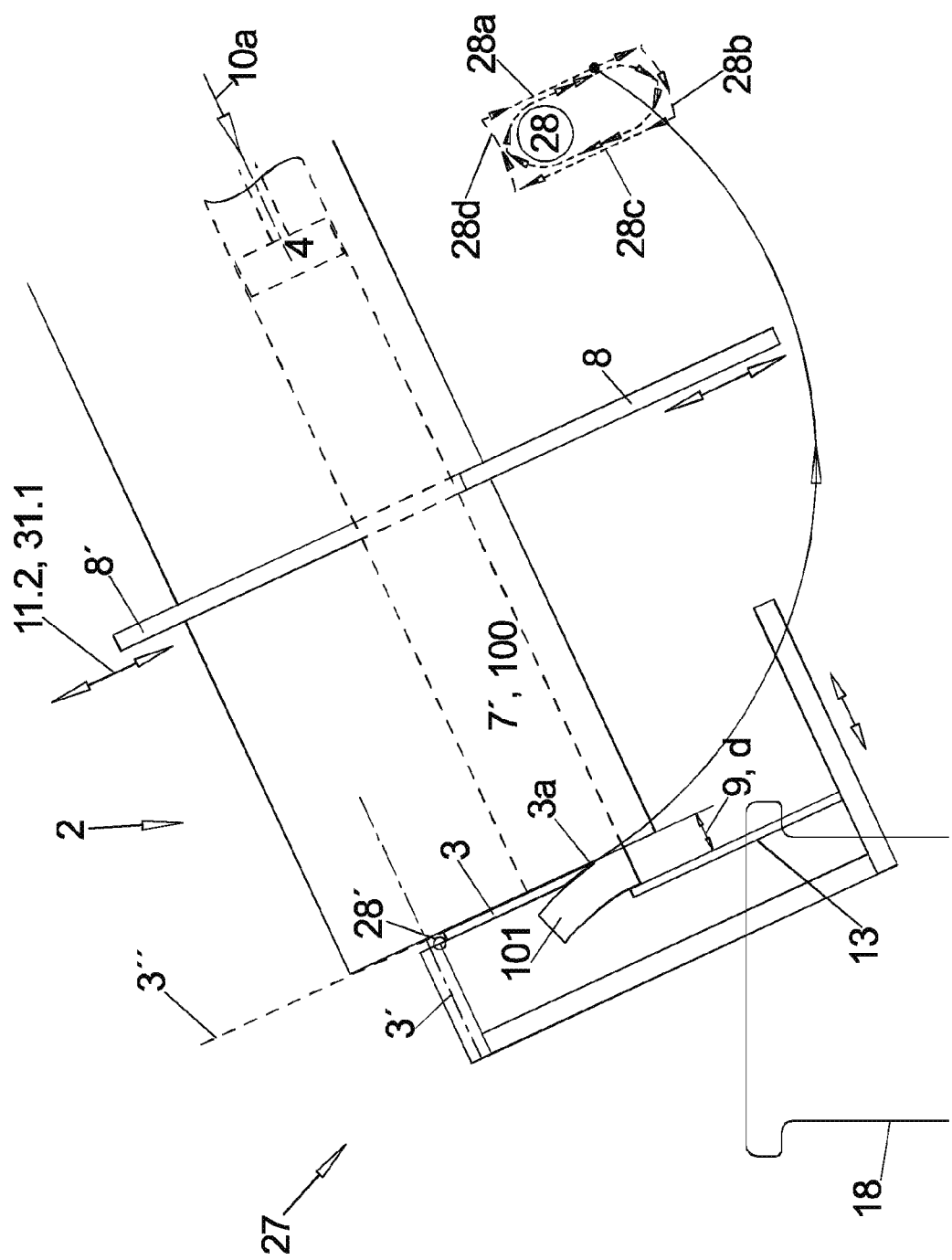
FIG. 8A illustrates a view in principle of the second cutting unit in different functional positions.
Figure 8B:
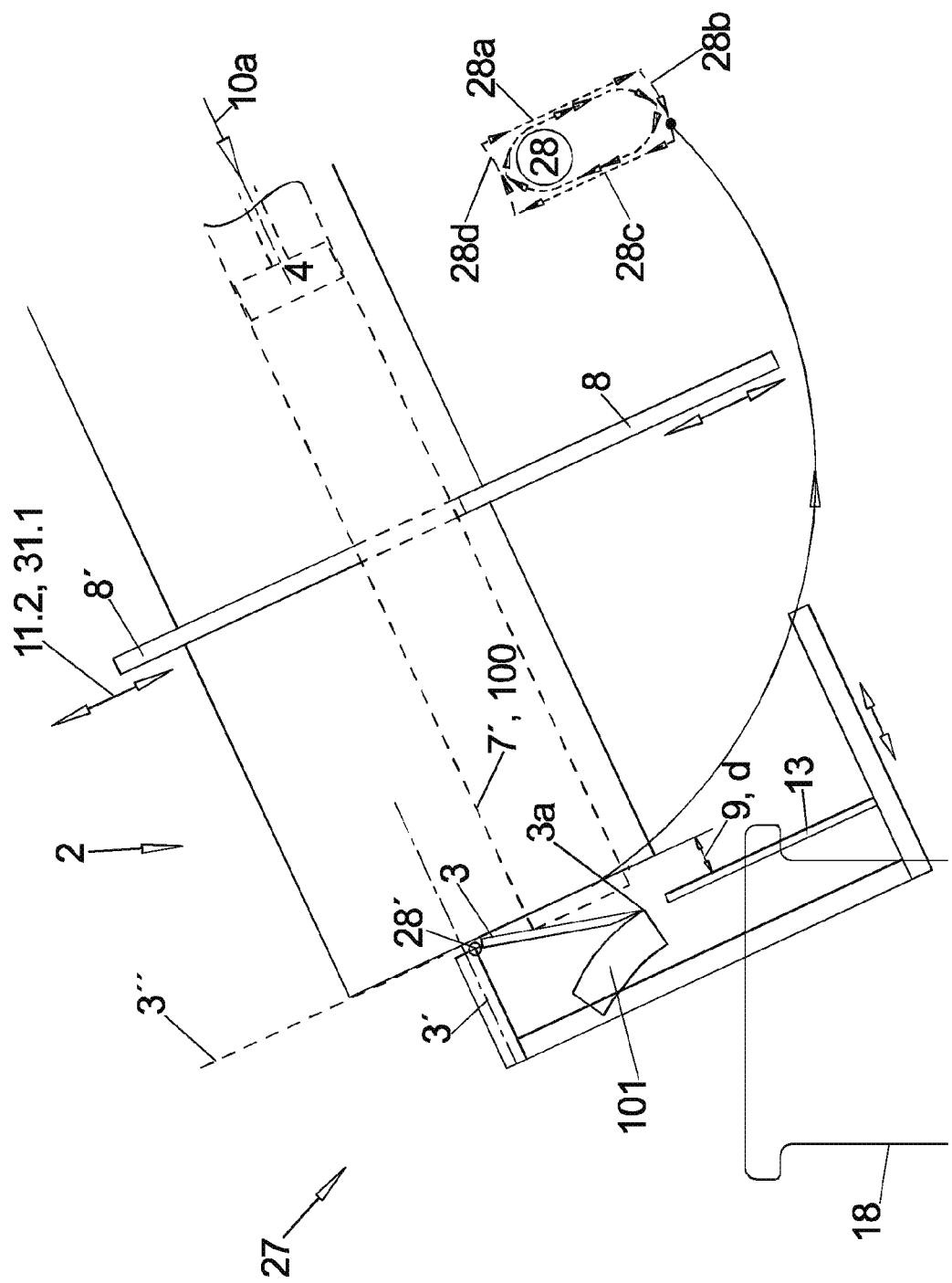
FIG. 8B illustrates a view in principle of the second cutting unit in different functional positions.

FIGS. 7A-7C1 illustrate a second embodiment of a cutting unit 27 whose basic operating motions are illustrated in FIGS. 8A and 8B.

As evident from the configuration in FIGS. 7A-7C1 the cutting unit 27 has a bar shaped blade 3 wherein the bar shaped cross section is thin enough so that the blade 3 is better designated as strip shaped.

The cutting unit 27 includes a base element 32 which is moved far enough downward in the first blade transversal direction 31.1 for cutting off a slice so that the cutting edge 3a of the blade 3 attached therein which is straight in this embodiment and extends through a cross section of the meat strand 100 in its entirety as illustrated in FIG. 7C1.

The base element 32 includes two side carriers 32.a that are offset from each other which are supplemented by two spacer rods 32b offset in parallel to each other and extending transversal to the extension of the lateral beams 32a extending transversal to the first blade transversal direction 31.1 wherein the spacer rod 32b have a circular cross section and supplement the side beams 32a to form a base element frame 32.

The blade unit 33 is attached at a lower spacer rod of the two spacer rods 32b in which the blade 3 is arranged.

The blade unit 33 includes three support struts 35 that are offset from each other in the longitudinal direction of the lower spacer rod 32b wherein the support rods 32 are pivot ably supported at the spacer rod 32b and firmly connected at their free end with a support plate 34 that is continuous over all three support struts 35. The support plate 34 thus extends in the same direction as the spacer rod 32b, thus in the second blade transversal direction 31.2.

Thus, the strip shaped blade 3 is arranged in the feed direction 10a directly behind the back side of the support blade 34 so that it protrudes beyond the support edge 34a of the support plate 34 with its cutting edge arranged at the bottom edge of the blade 3, but move able relative to the support blade 34 in the second blade transversal direction 31.2 the extension of the blade edge 3a.

As illustrated in the enlarged detail view of FIG. 7C1 the blade 4 contacts with a front surface at t shoulder that is machined into a back side of the support plate 34, wherein the shoulder is arranged at a slant angle relative to the front side of the support plate 34.

Thus, the blade 3 is arranged with its cross section is arranged at a slant angle to a cross section of the support blade 34 and the cutting edge 3a of the blade 3 protrudes against the feed direction optionally even slightly beyond the front surface of the support plate 34.

Thus, in this case the blade 3 is arranged on its front surface at a slant angle to form a cutting edge 3a, wherein the bevel of the front surface of the blade 3 defines the blade plane 3' and can as stated supra be oriented against the feed direction 10a slightly in a direction of the form tube in front of the front surface of the support plate 34.

This is achieved in that the blade 3 with each of its ends is attached at the free end of a respective drive lever 36 which is respectively configured as a two arm drive lever and pivot able in its center portion at opposite ends of the support plate 34 that are arranged opposite to each other in the main extension of the blade plate 34, the second blade transversal direction 31.2 about a lever axis 36' arranged transversal to the blade plane 3" and thus also to the support plate plane 34'.

The other two free ends of the drive levers 36 are connected with each other by a coupling rod 37 so that the oscillating back and forth movement caused by a blade motor 38 of the driven pivot lever 36 is not transmitted by the blade 3 itself but also by the coupling rod 37 to the other pivot lever 36 so that the blade 3 can be configured less stable.

It is appreciated that the pivot levers 36 can also be configured as one arm levers and so that the engagement point of the pivot lever driven by the blade motor 38 and operatively connected with the driven pivot lever 36 has to be in an operative connection between the pivot axis 36' and the attachment point of the blade 3 at the pivot lever 36.

Due to the pivot levers 36 pivoting about their lever axis 36' the blade 3 and also its cutting edge 3a does not perform an exact linear oscillating movement of its straight cutting edge 34a but a slightly arcuate movement whose curvature radius corresponds to a distance between the lever axis 36' and the attachment end of the blade 3 for each pivot lever 36. Subsequently and oscillating back and forth movement is described for simplification movement.

Due to the pivotable attachment of the support rods 35 about the lower pacer rod 32b furthermore the entire blade unit 33 including support rod 35, support plate 34, blade 3, drive levers 36 can be pivoted back and forth about the spacer rod 32b using as a pivot axis 28' wherein the lower spacer rod has a circular cross section wherein the pivoting is performed from to cutting position to a lift off position.

In FIG. 7C1 the cutting position is illustrated in which the blade plane 3' is arranged parallel to the first blade transversal direction 31.1 into which the base element 32 is moved along the machine frame in order to cut off slices.

FIG. 7C2 on the other hand side illustrates the lift off position in which the blade unit 33 is pivot able by a small amount about the pivot axis 28', thus about the lower spacer rod 32b in the feed direction 10a thus away from the meat strand.

FIGS. 7D1 and 7D2 illustrate an embodiment which differs only slightly from the embodiment of FIGS. 7C1 and 7C2.

On the one hand side the motor 38 is not arranged forward protruding at the base frame 27 but extending parallel to the base frame 27 at a side of the base frame 27.

The motor 28 drives the blade 3' through a connecting rod 31 directly oscillating along an extension, wherein the blade is operatively connected with the slide 39 which is supported in the and extension direction of the blade 3'.

The motion sequence of the blade 3 resulting therefrom is evident from FIGS. 8A and 8B which are similar to the representations in FIGS. 4A-4C and have the same viewing direction.

FIG. 8A illustrates the condition during cutting off a slice by the cutting movement 28a in the first blade transversal direction 31.1 and the superimposed back and forth movement of the cutting edge 3a in the second blade transversal direction 31.2 wherein the blade which is in the cutting position according to FIG. 7C1 with respect to the cutting unit 27 has just cut the slice 101 off completely.

FIG. 8B illustrates the condition in which after completely cutting off a slice 101 the blade unit 33 with the blade 3 was moved into the lift off condition and thus moves the cut off slice 101 away from the meat strand 100 and thus facilitates dropping the slice onto the weighing station 19 thus in particular immediately, thus before the reversal movement 28c has started in the first blade transversal direction 31.1 already facilitates moving the meat strand 100 forward which also was a goal of the blade movements 28a-d in FIGS. 4A-4C.

Contrary to the solution described herein only the cutting edge 3a of the blade 3 performs the annular orbit able movement including the cutting movement 28a, lift off movement 28b, return movement 28c and the feed movement 28d as described in FIGS. 4A-4C with the difference that the lift off movement 28b in FIGS. 8A and 8B is no straight movement but a slightly arcuate movement in the blade plane 3'.

The pivot movement is also performed by the same cutting unit 33 besides being performed by the cutting edge 3a but lifting off from the face side of the meat strand 100 is accordingly less than the lift off of the cutting edge 3a corresponding to the smaller distance from the pivot axis 28'.

This embodiment of the cutting unit achieves the same advantages with respect to the early onset of feeding of the meat strand 100 for cutting off the new slice 101 but a disadvantage of the solution of a rotating circular disc shaped or cycle shaped blade 3 is prevented which is based on the fact that a blade 3 of this type extending over two or more meat strands 100 adjacent to each other and cutting them simultaneously avoids the large mass of a blade of this type which has to be accelerated and slowed down for each cutting process.

The invention claimed is:

1. A method for producing slices from a meat strand, the method including the steps of:
    arranging a meat strand in a form tube,
    compressing the meat strand in the form tube in at least a transversal direction and in a longitudinal pressing direction of the form tube,
    moving the strand forward in the longitudinal pressing direction beyond a forward cutting end of the form tube,
    cutting a slice off from each strand in front of the front cutting end of the form tube using a blade by moving the blade through the strand from a starting position into a transversal direction to the longitudinal compressing direction,
    axially moving the blade in the longitudinal pressing direction following each cut over a duration of movement, and during the duration of movement, moving the strand to beyond the front end of the form tube, and
    moving the blade backward to the starting position in the transversal direction as well as counter to the longitudinal compressing direction before cutting off the next slice.

2. The method according to claim 1, further comprising the steps of:
    moving the strand forward after the slice has been cut off, and before the blade has moved out of the cross-sectional area of the form tube in the transversal direction as viewed in the longitudinal compressing direction,
    moving the blade forward in the longitudinal compressing direction immediately after the slice has been cut off by at least the thickness of one slice subsequently or simultaneously to the backwards movement of the blade in the transversal direction into the starting position.

3. The method according to claim 1, wherein
    in the longitudinal direction, each form tube is configured in two pieces with a front form tube and a rear form tube, and further comprising the steps of: moving the strand further forward in the feed direction in the front form tube during the cutting the slice off step using a longitudinal press plunger until the strand is completely cut up, beginning to load the rear form tube with a new strand to be cut as soon as the rear end of the strand is located only in the axial area of the front form tube in the corresponding form tube.

4. The method according to claim 1, wherein in the longitudinal direction, each form tube is configured in two pieces with a front form tube and a rear form tube, and further comprising the steps of:

compressing of the strand meat strand in the front form tube in at least a transversal direction;

compressing the meat strand in the rear form tube in at least the transversal direction;

controlling the transversal compression of the strand in the front form tube independently of the transversal compression in the rear form tube, and setting the inner free cross section of the front form tube and the rear form tube in the compressed state to be aligned with each other.

5. The method according to claim 1, further comprising the steps of:

simultaneously processing at least two strands arranged next to each other on multiple processing tracks, cutting off one slice from the at least two strands arranged next to each other in the same processing step by the same blade.

6. The method according to claim 1, further comprising the steps of:

compressing the meat strand in the rear form tube longitudinally against an intermediate plate using the longitudinal press plunger, wherein the intermediate plate is disposed between the front form tube and the rear form tube that is aligned therewith, and perpendicular to the longitudinal compressing direction, moving the intermediate plate in the transversal direction between a closed position in which the inner free space of the form tube is closed and an open position in which the inner free space remains open, and moving the meat strand forward in the longitudinal pressing direction into the front form tube and compressing the meat strand against a stop plate when the intermediate plate is in the open position.

7. The method according to claim 1, further comprising the steps of:

moving the meat strand forward in the rear form tube, by moving at least one opposing wall of the rear form tube in the longitudinal direction together with the meat strand.

* * * * *